(12) United States Patent
Dykes et al.

(10) Patent No.: US 12,379,102 B2
(45) Date of Patent: Aug. 5, 2025

(54) COOKING CHAMBER LIGHTING FOR PELLET GRILLS

(71) Applicant: Weber-Stephen Products LLC, Palatine, IL (US)

(72) Inventors: Gregory James Dykes, Elmhurst, IL (US); Evan Allan Hall, Palatine, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 873 days.

(21) Appl. No.: 17/648,175

(22) Filed: Jan. 17, 2022

(65) Prior Publication Data

US 2022/0307683 A1    Sep. 29, 2022

Related U.S. Application Data

(60) Provisional application No. 63/164,908, filed on Mar. 23, 2021.

(51) Int. Cl.
   *F21V 33/00* (2006.01)
   *A47J 37/07* (2006.01)
   *F21V 23/04* (2006.01)

(52) U.S. Cl.
   CPC ....... *F21V 33/0044* (2013.01); *A47J 37/0786* (2013.01); *F21V 23/0442* (2013.01)

(58) Field of Classification Search
   None
   See application file for complete search history.

(56) References Cited

U.S. PATENT DOCUMENTS

| | | | | |
|---|---|---|---|---|
| 2,479,437 A * | 8/1949 | Vigmostad | ............ | E05F 1/1276 16/289 |
| 3,350,542 A * | 10/1967 | Getman | .............. | F24C 15/2014 219/393 |
| 3,391,682 A * | 7/1968 | King | .................... | A47J 37/0704 126/25 R |
| RE26,944 E * | 8/1970 | Getman | ................ | F24C 15/022 219/397 |

(Continued)

FOREIGN PATENT DOCUMENTS

| | | |
|---|---|---|
| AU | 2005100137 | 5/2005 |
| CA | 2493654 | 7/2006 |

(Continued)

OTHER PUBLICATIONS

International Bureau, "International Preliminary Report on Patentability," issued in connection with International Patent Application No. PCT/US2022/019317, dated Oct. 5, 2023, 6 pages.

(Continued)

*Primary Examiner* — Jorge A Pereiro
(74) *Attorney, Agent, or Firm* — Avantech Law

(57) ABSTRACT

Pellet grills and associated methods of operation are disclosed. An example pellet grill includes an end cap, a liner coupled to the end cap, and a compartment formed between the end cap and the liner. The example pellet grill further includes a lighting module having a light source. The light source is positioned within the compartment. The light source is configured to project light through an opening formed in the liner and into an interior of a cooking chamber of the pellet grill.

22 Claims, 25 Drawing Sheets

(56) References Cited

U.S. PATENT DOCUMENTS

| | | | |
|---|---|---|---|
| 5,122,937 A * | 6/1992 | Stoudemire | H01H 9/025 362/253 |
| 5,429,110 A * | 7/1995 | Burke | A47J 37/0704 110/297 |
| 5,821,490 A * | 10/1998 | Blossfeld | H01H 13/562 200/530 |
| 6,033,084 A * | 3/2000 | Burke | F21V 23/04 362/200 |
| 6,073,623 A | 6/2000 | Maschhoff | |
| 6,079,843 A | 6/2000 | Latella et al. | |
| 6,173,645 B1 * | 1/2001 | Backus | A47J 37/0635 220/326 |
| 6,658,991 B2 | 12/2003 | Backus et al. | |
| 6,851,820 B2 | 2/2005 | Choi et al. | |
| 6,935,327 B1 | 8/2005 | Williams et al. | |
| 7,008,072 B2 | 3/2006 | Witzel et al. | |
| 7,021,204 B2 * | 4/2006 | Backus | A47J 37/041 99/421 H |
| 7,104,667 B2 | 9/2006 | Keller | |
| 7,168,363 B1 * | 1/2007 | Brown | A47J 37/0786 99/357 |
| 7,222,620 B2 | 5/2007 | Wolter et al. | |
| 7,301,127 B1 | 11/2007 | Derridinger, Jr. | |
| 7,325,484 B1 * | 2/2008 | Backus | A47J 37/041 99/421 H |
| 7,536,748 B2 * | 5/2009 | Renke | E05F 1/1276 16/289 |
| 7,559,320 B2 | 7/2009 | Chen | |
| 7,730,584 B2 * | 6/2010 | Duffy | E05D 5/062 16/295 |
| 7,739,948 B2 * | 6/2010 | Backus | A47J 37/041 99/348 |
| 7,931,381 B2 | 4/2011 | Balbinotti et al. | |
| 9,186,020 B1 * | 11/2015 | Phillips | A47J 37/0709 |
| 9,261,281 B2 | 2/2016 | Reinhard-Herrscher et al. | |
| 9,909,754 B1 | 3/2018 | Reiter | |
| D839,047 S * | 1/2019 | Colston | A47J 37/067 D7/402 |
| 10,201,247 B1 * | 2/2019 | Jones | A47J 37/07 |
| 10,271,687 B2 | 4/2019 | Wenzel et al. | |
| 10,455,979 B2 * | 10/2019 | Colston | A47J 37/0786 |
| 10,595,540 B1 * | 3/2020 | Knight | A23B 4/0523 |
| D889,201 S * | 7/2020 | Measom | D7/402 |
| 10,704,311 B1 * | 7/2020 | Collene | E05F 1/1261 |
| 10,917,947 B2 * | 2/2021 | Son | H05B 6/062 |
| 2001/0009128 A1 * | 7/2001 | Backus | A47J 37/0641 99/421 H |
| 2002/0108500 A1 * | 8/2002 | Backus | A47J 37/041 99/421 H |
| 2002/0113062 A1 * | 8/2002 | Cranford | F24C 7/08 219/412 |
| 2004/0032729 A1 | 2/2004 | Choi et al. | |
| 2005/0092188 A1 | 5/2005 | Huegerich et al. | |
| 2005/0247438 A1 * | 11/2005 | Leuschner | G06F 1/206 165/127 |
| 2006/0202848 A1 * | 9/2006 | Volodarsky | G08B 7/06 340/539.1 |
| 2007/0103907 A1 | 5/2007 | Popowich et al. | |
| 2007/0163568 A1 | 7/2007 | Murray et al. | |
| 2008/0196709 A1 | 8/2008 | Davis et al. | |
| 2008/0229937 A1 | 9/2008 | Stephen et al. | |
| 2008/0316731 A1 | 12/2008 | Choi et al. | |
| 2010/0012165 A1 | 1/2010 | Bedard | |
| 2010/0027253 A1 | 2/2010 | Home | |
| 2011/0056477 A1 | 3/2011 | Leavens | |
| 2011/0273887 A1 | 11/2011 | Nilssen, II | |
| 2011/0275023 A1 * | 11/2011 | Knight | F24B 5/021 126/21 A |
| 2012/0073557 A1 * | 3/2012 | Knight | A47J 37/079 126/19 R |
| 2012/0288596 A1 * | 11/2012 | Holdo Baggott | A23L 5/15 426/235 |
| 2013/0298894 A1 * | 11/2013 | Kleinsasser | A47J 37/0704 126/25 R |
| 2014/0090633 A1 | 4/2014 | Gleaton et al. | |
| 2014/0246007 A1 * | 9/2014 | Nguyen | F24C 15/001 126/25 R |
| 2014/0261372 A1 * | 9/2014 | Knight | F24C 15/322 126/21 A |
| 2015/0320259 A1 * | 11/2015 | Tucker | F24B 13/04 126/10 |
| 2016/0073823 A1 * | 3/2016 | Van Gelder | A47J 37/0786 126/25 R |
| 2017/0164783 A1 * | 6/2017 | Sauerwein | A47J 37/0786 |
| 2017/0176018 A1 * | 6/2017 | Traeger | F24B 13/04 |
| 2018/0142925 A1 * | 5/2018 | De Luca | F25B 27/00 |
| 2018/0296031 A1 * | 10/2018 | Terrell, Jr. | A47J 37/0704 |
| 2018/0296032 A1 | 10/2018 | Wenzel et al. | |
| 2018/0368618 A1 * | 12/2018 | Measom | A47J 37/0704 |
| 2019/0277507 A1 * | 9/2019 | Colston | F24B 1/08 |
| 2020/0000277 A1 * | 1/2020 | O'Shaughnessy | B23P 19/12 |
| 2020/0046166 A1 | 2/2020 | Wenzel et al. | |
| 2020/0093145 A1 * | 3/2020 | Powell | A47J 37/0718 |
| 2020/0113382 A1 * | 4/2020 | Ahmed | A47J 37/0704 |
| 2020/0170448 A1 * | 6/2020 | Baker | F24B 1/10 |
| 2020/0214501 A1 * | 7/2020 | Gafford | A47J 37/0754 |
| 2020/0237145 A1 * | 7/2020 | Donnelly | A47J 37/0704 |
| 2020/0237146 A1 * | 7/2020 | Donnelly | A47J 37/0704 |
| 2020/0237147 A1 * | 7/2020 | Donnelly | F24B 15/005 |
| 2020/0237148 A1 * | 7/2020 | Donnelly | A47J 37/0704 |
| 2020/0237149 A1 * | 7/2020 | Donnelly | F23B 60/02 |
| 2020/0237150 A1 * | 7/2020 | Donnelly | G05B 23/0262 |
| 2020/0237153 A1 * | 7/2020 | Donnelly | A47J 37/0709 |
| 2020/0237154 A1 * | 7/2020 | Donnelly | A47J 37/0786 |
| 2020/0240643 A1 * | 7/2020 | Donnelly | F23B 40/08 |
| 2020/0281402 A1 * | 9/2020 | Witzel | F23B 1/36 |
| 2020/0352394 A1 * | 11/2020 | Diekmann | A47J 37/07 |
| 2020/0370752 A1 * | 11/2020 | Ahmed | F24B 13/02 |
| 2020/0378615 A1 * | 12/2020 | Gafford | F24C 7/067 |
| 2021/0196078 A1 * | 7/2021 | Colston | A47J 37/0786 |
| 2022/0046937 A1 * | 2/2022 | Simon | A47J 37/0704 |
| 2022/0279962 A1 * | 9/2022 | Vandyke | A47J 36/32 |
| 2022/0279965 A1 * | 9/2022 | Barry | A47J 37/0786 |
| 2022/0279967 A1 * | 9/2022 | Vandyke | A47J 37/0713 |
| 2022/0287506 A1 * | 9/2022 | Simon | A47J 37/0709 |

FOREIGN PATENT DOCUMENTS

| | | | |
|---|---|---|---|
| CN | 208725545 | | 4/2019 |
| EP | 3680560 | | 7/2020 |
| JP | 2005003292 A | * | 1/2005 |
| TW | M308728 U | * | 4/2007 |
| TW | 202110374 A | * | 3/2021 | A47J 36/321 |

OTHER PUBLICATIONS

Canadian Intellectual Property Office, "Office Action," issued in connection with Canadian Patent Application No. 3,211,200, dated Jan. 13, 2025, 4 pages.

Australian Government, IP Australia, "Notice of Acceptance," issued in connection with Australian Patent Application No. 2022245111, dated Nov. 4, 2024, 3 pages.

European Patent Office, "Extended European Search Report," issued in connection with European Patent Application No. 22776306.7, dated Jul. 26, 2024, 10 pages.

International Searching Authority, "International Search Report and Written Opinion," issued in connection with International Patent Application No. PCT/US2022/019317, dated Jun. 27, 2022, 9 pages.

Australian Government, IP Australia, "Examination Report No. 1," issued in connection with Australian Patent Application No. 2022245111, dated Sep. 18, 2024, 3 pages.

* cited by examiner

SECTION A-A

SECTION B-B

COOKING CHAMBER LIGHTING FOR PELLET GRILLS

RELATED APPLICATIONS

This application claims priority to U.S. Provisional Patent Application No. 63/164,908, filed Mar. 23, 2021. The entirety of U.S. Provisional Patent Application No. 63/164,908 is hereby incorporated by reference herein.

FIELD OF THE DISCLOSURE

This disclosure relates generally to grills and, more specifically, to cooking chamber lighting for pellet grills.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper that is mounted and/or coupled to the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an electronic starter of the pellet grill. Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber.

Pellet grills are routinely used during hours of the day where daylight is lacking. In the absence of adequate daylight, some form of auxiliary and/or supplemental lighting may be required for a user of the pellet grill to visually monitor a cooking surface located within the cooking chamber, including but not limited to visual monitoring of one or more food item(s) being cooked on the cooking surface.

In some instances, such auxiliary and/or supplemental cooking surface lighting can be provided via an overhead hardwired light source (e.g., a patio, deck, or garage light). Such overhead hardwired light sources are not always available however, and, even when available, often have shortcomings with regard to adequately directing and/or focusing light onto the cooking surface and/or into the cooking chamber of the pellet grill.

In other instances, such auxiliary and/or supplemental cooking surface lighting can be provided via a user-controlled lighting instrument (e.g., a flashlight, a flash module of a smartphone, etc.). While such user-controlled lighting instruments have become relatively commonplace in terms of user availability, the use thereof disadvantageously occupies at least one hand of the user, which may in turn hamper the user's ability to perform one or more desired cooking operation(s) in connection with the food item(s) being cooked on the cooking surface and/or within the cooking chamber of the pellet grill.

In still other instances, such auxiliary and/or supplemental cooking surface lighting can be provided via a handle-mountable lighting module and/or lamp that is removably couplable to a handle of a lid that selectively covers the cooking chamber of the pellet grill. Such handle-mountable lighting modules and/or lamps can often be cumbersome to the user, and can interfere with the user's ability to interact in an unimpeded manner with food item(s) being cooked on the cooking surface and/or within the cooking chamber of the pellet grill.

Figure 1:
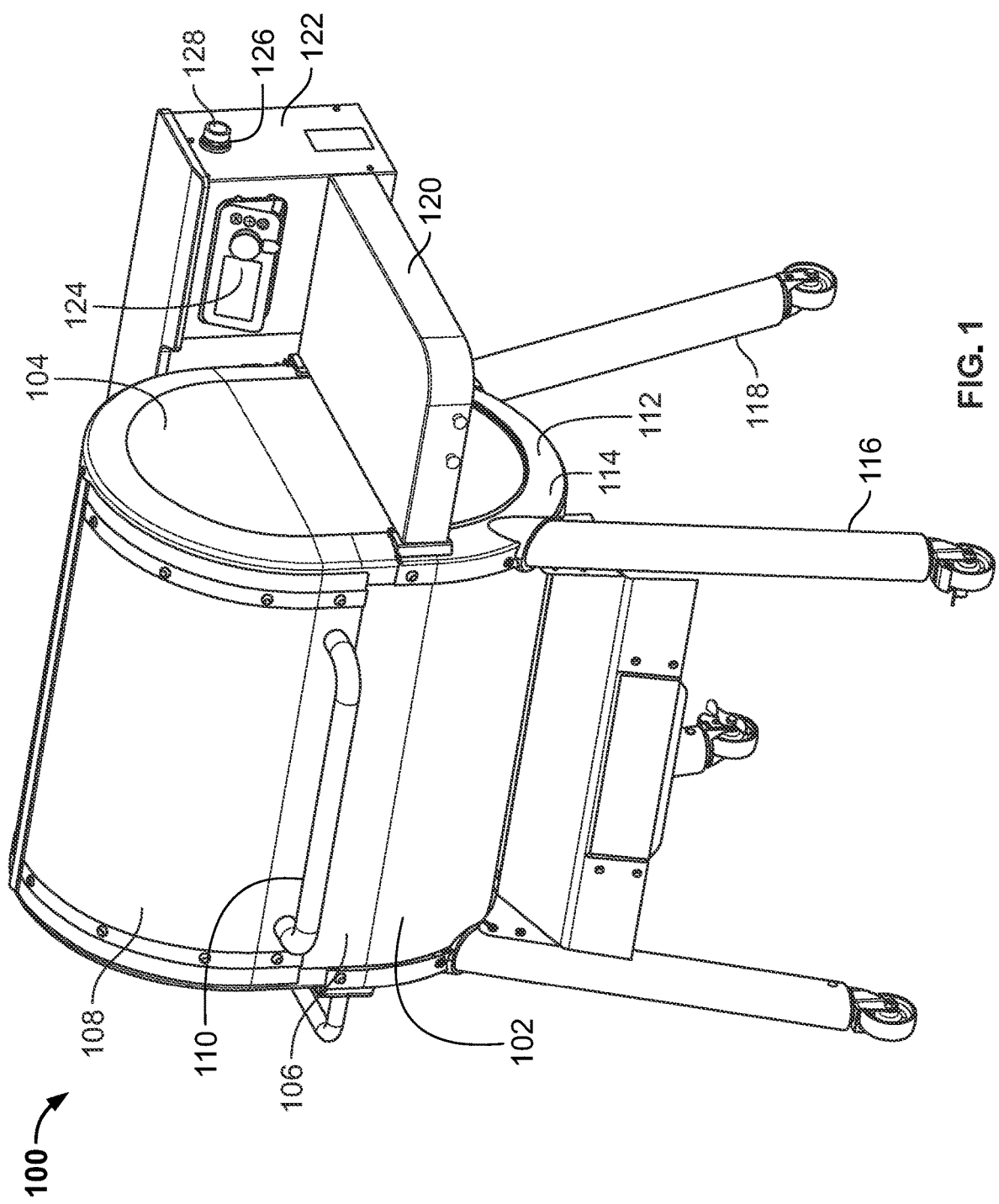
FIG. 1 is a first perspective view of an example pellet grill constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example pellet grills disclosed herein include lighting systems configured to illuminate an interior of a cooking chamber of the pellet grill. In some disclosed examples, the lighting system includes a lighting module having a light source positioned within a compartment formed between an end cap and a liner of the pellet grill. The light source is configured to project light through an opening formed in the liner and into the interior of the cooking chamber of the pellet grill.

In some disclosed examples, the lighting system includes a switch configured to cause the light source to be powered on when the switch is in an ON state, and/or to be powered off when the switch is in an OFF state. In some disclosed examples, the switch includes an actuatable button configured to transition the switch between the ON state and the OFF state.

In some disclosed examples, the lighting system includes a controller configured to cause the light source to be powered on in response to an activation request received at the controller, and/or to cause the light source to be powered off in response to a deactivation request received at the controller. In some disclosed examples, the activation request and/or the deactivation request is received at the controller via an input device of a user interface of the pellet grill, or via a receiver of a network interface of the pellet grill.

In some disclosed examples, the lighting system includes a lid position sensor configured to sense a position of a lid of the pellet grill. In some disclosed examples, the lighting system further includes a controller configured to detect a lid opening movement based on lid position data obtained from the lid position sensor, and/or to detect a lid closing movement based on lid position data obtained from the lid position sensor. In some disclosed examples, the controller is further configured to cause the light source to be powered on in response to detecting the lid opening movement, and/or to cause the light source to be powered off in response to detecting the lid closing movement.

In some disclosed examples, the lighting system includes a temperature sensor configured to sense a temperature of the interior of the cooking chamber. In some disclosed examples, the lighting system further includes a controller configured to detect a threshold decrease in the temperature of the interior of the cooking chamber based on temperature data obtained from the temperature sensor, and/or to detect an initial recovery in the temperature of the interior of the cooking chamber based on temperature data obtained from the temperature sensor. In some disclosed examples, the controller is further configured to cause the light source to be powered on in response to detecting the threshold decrease in the temperature of the interior of the cooking chamber, and/or to cause the light source to be powered off in response to detecting the initial recovery in the temperature of the interior of the cooking chamber.

In some disclosed examples, the lighting system includes a tachometer configured to sense a speed of a fan of the pellet grill. In some disclosed examples, the lighting system further includes a controller configured to detect a threshold increase in the speed of the fan based on fan speed data obtained from the tachometer, and/or to detect a threshold decrease in the speed of the fan based on fan speed data obtained from the tachometer. In some disclosed examples, the controller is further configured to cause the light source to be powered on in response to detecting the threshold increase in the speed of the fan, and/or to cause the light source to be powered off in response to detecting the threshold decrease in the speed of the fan.

In some disclosed examples, the lighting system includes a current sensor configured to detect an operational state of an ignitor of the pellet grill. In some disclosed examples, the lighting system further includes a controller configured to detect that the ignitor is powered on based on electrical current data obtained from the current sensor, and/or to detect that the ignitor is powered off based on electrical current data obtained from the current sensor. In some disclosed examples, the controller is further configured to prevent the light source from being powered on in response to detecting that the ignitor is powered on, and/or to enable the light source to be powered on in response to detecting that the ignitor is powered off.

In some disclosed examples, the light source of the lighting system is powered via AC power received from an AC line power source to which the pellet grill is connected. In other disclosed examples, the light source of the lighting system is instead powered via DC power supplied by a DC power supply of the pellet grill. For example, the pellet grill can include a DC power supply that produces DC power based on AC power received at the pellet grill from an AC line power source to which the pellet grill is connected. As another example, the pellet grill can include a DC power supply implemented as a battery.

In some disclosed examples, the pellet grill includes a hinge that rotatably couples a lid of the pellet grill to a main body of the pellet grill. In some disclosed examples, a shield is coupled to a hinge arm of a hinge. The shield is configured to overlap a cover of the lighting module when the lid is in the closed position, thereby advantageously preventing ash and/or other cooking byproducts present within the cooking chamber of the pellet grill from accumulating on and/or otherwise occluding the cover of the lighting module. The shield is further configured to not overlap the cover of the lighting module when the lid is in the open position, thereby advantageously enabling light to be projected from the lighting module in an unobstructed manner.

The above-identified features as well as other advantageous features of the disclosed pellet grills are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
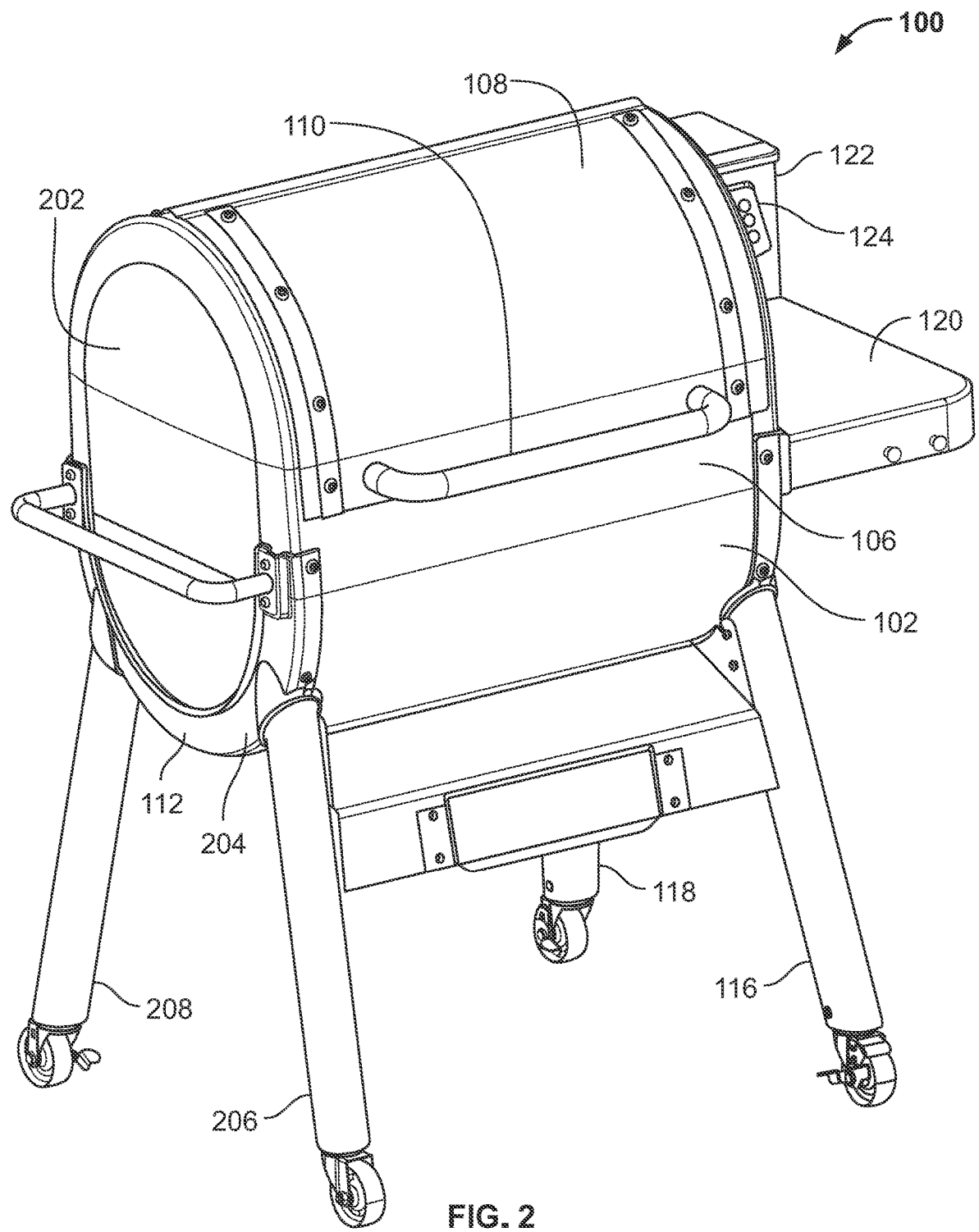
FIG. 2 is a second perspective view of the pellet grill of FIG. 1.
Figure 3:
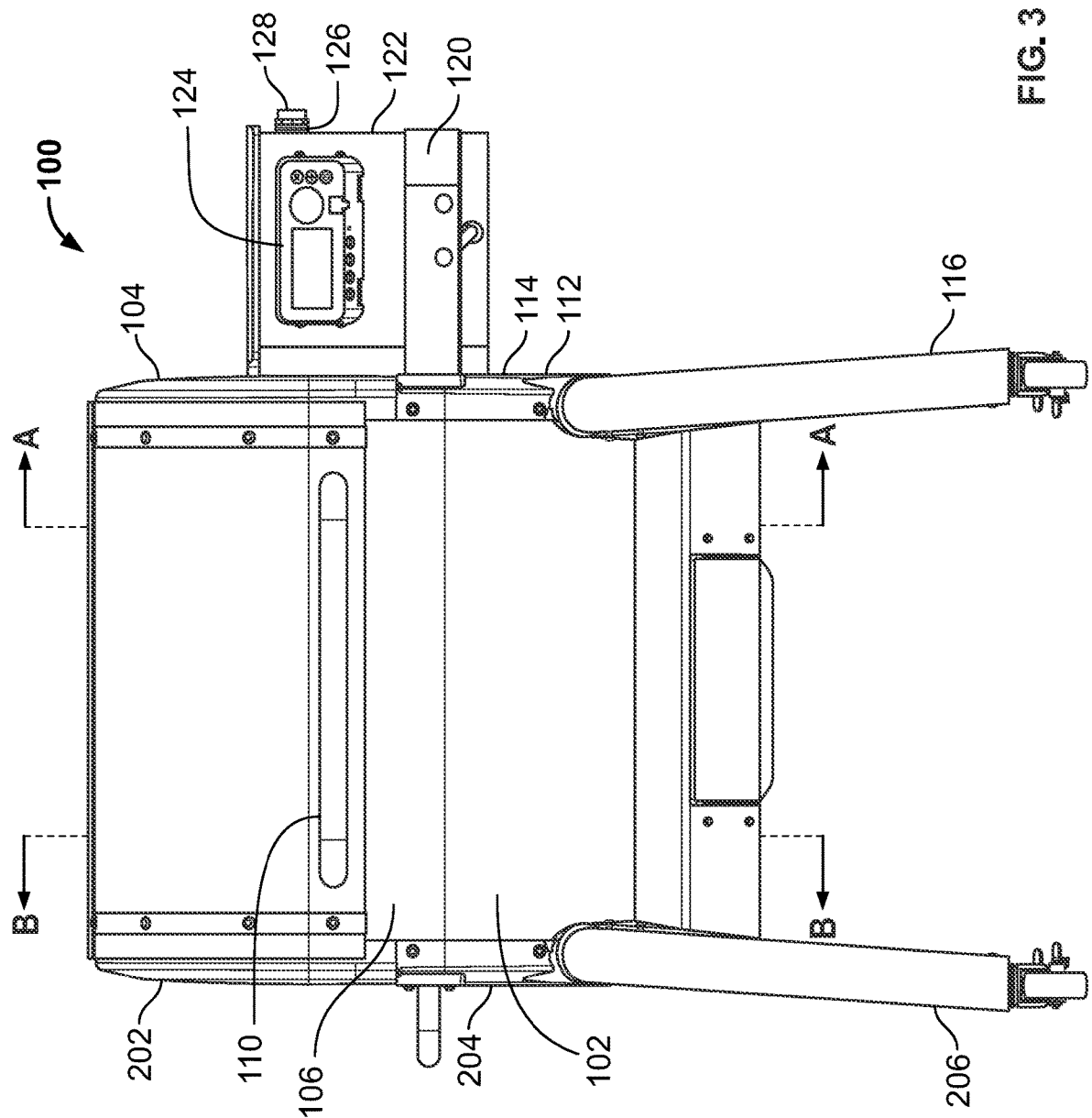
FIG. 3 is a front view of the pellet grill of FIGS. 1 and 2.
Figure 4:
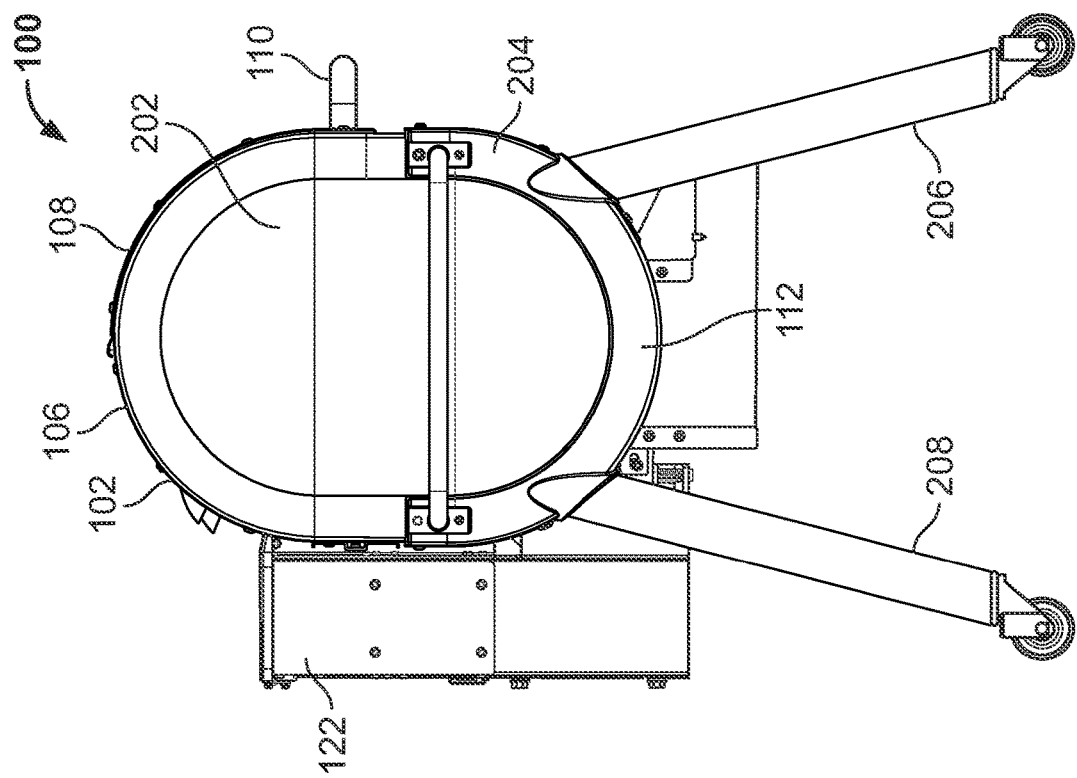
FIG. 4 is a first side view of the pellet grill of FIGS. 1-3.
Figure 5:
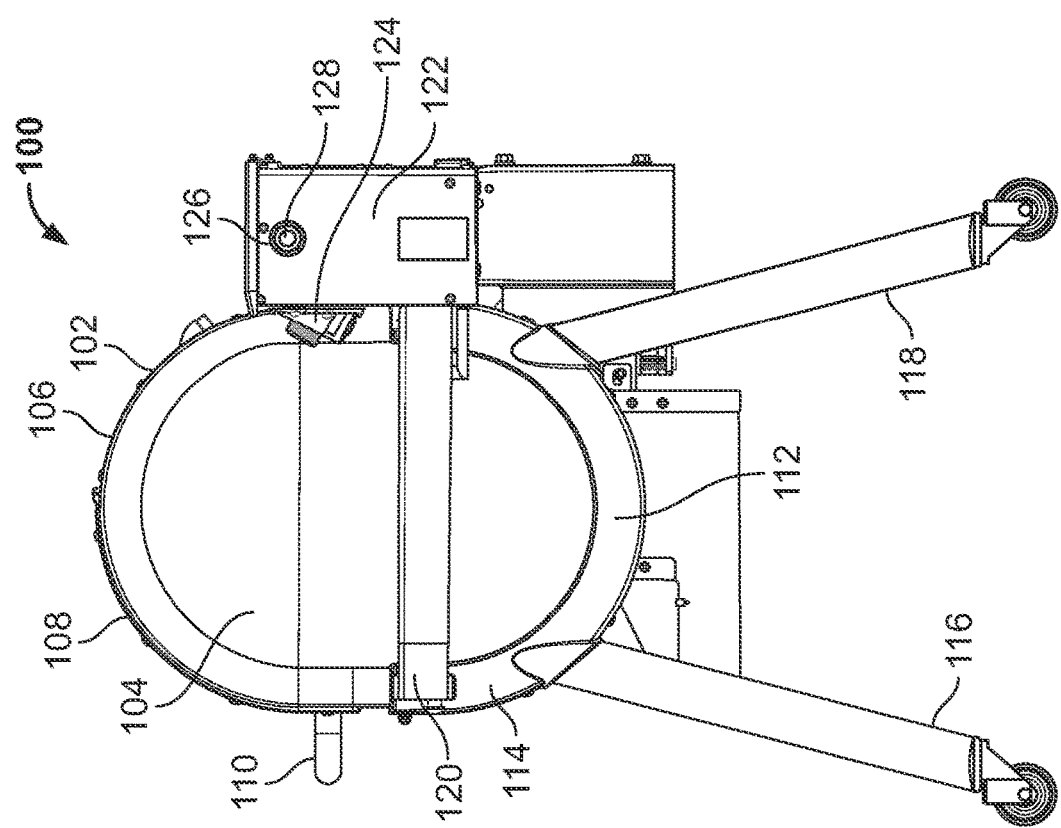
FIG. 5 is a second side view of the pellet grill of FIGS. 1-4.
Figure 6:
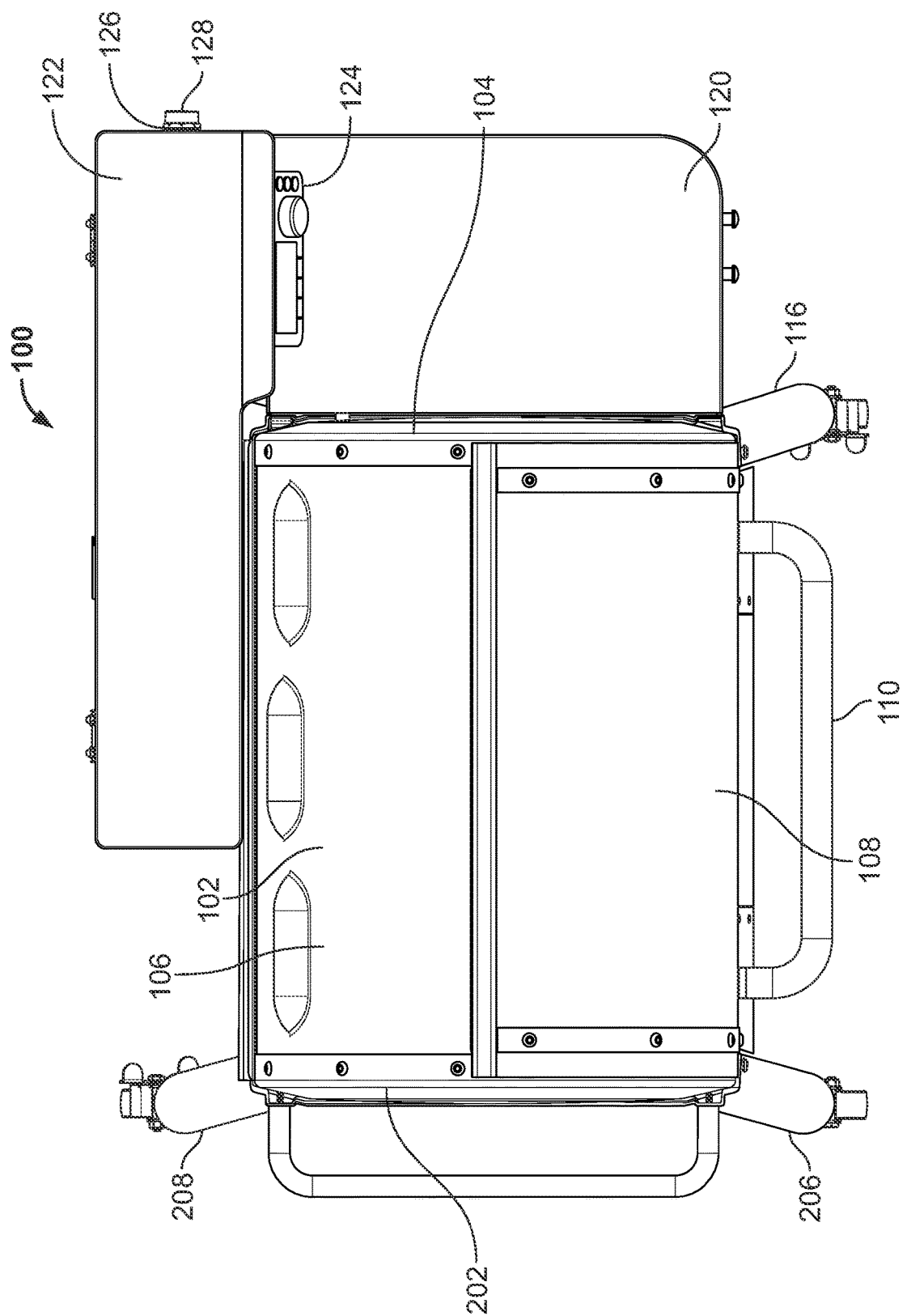
FIG. 6 is a top view of the pellet grill of FIGS. 1-5.
Figure 7:
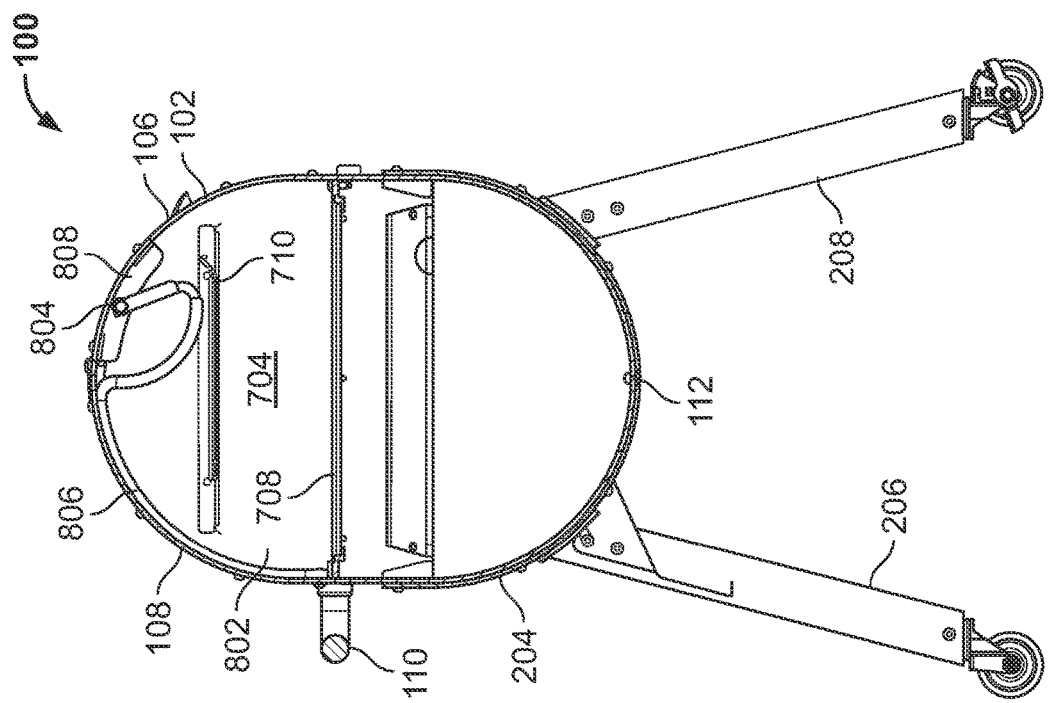
FIG. 7 is a cross-sectional view of the pellet grill of FIGS. 1-6 taken along section A-A of FIG. 3.
Figure 8:
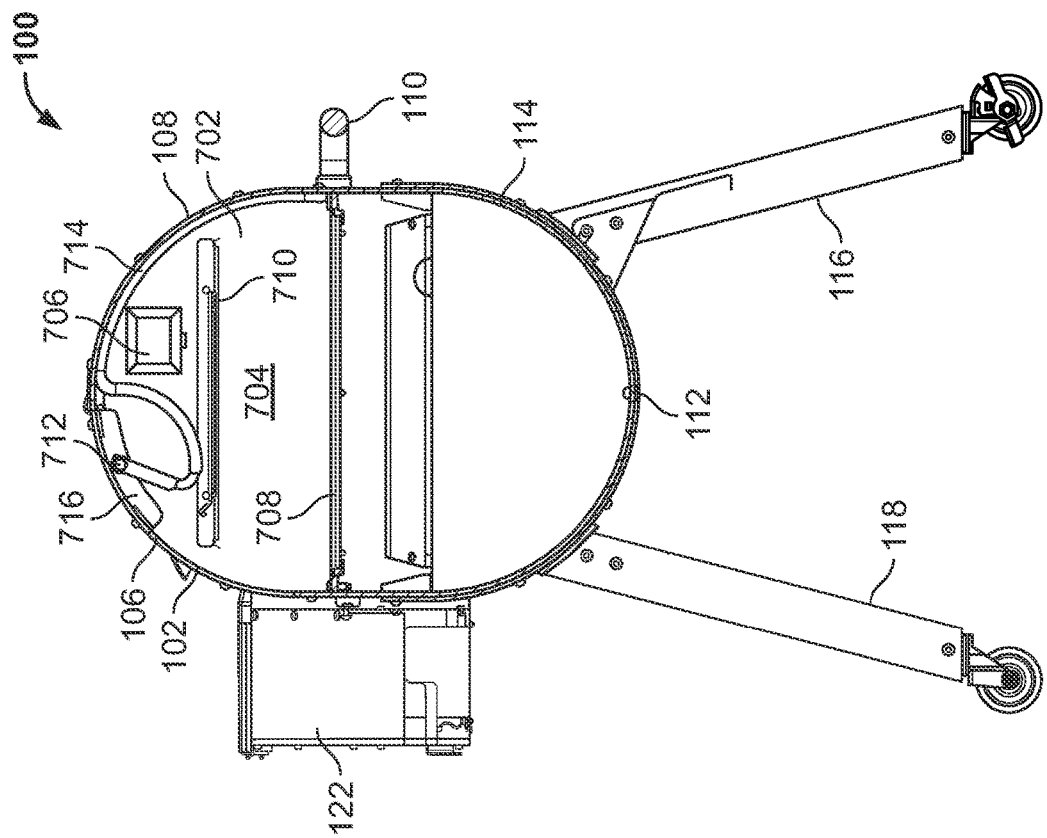
FIG. 8 is a cross-sectional view of the pellet grill of FIGS. 1-7 taken along section B-B of FIG. 3.
Figure 9:
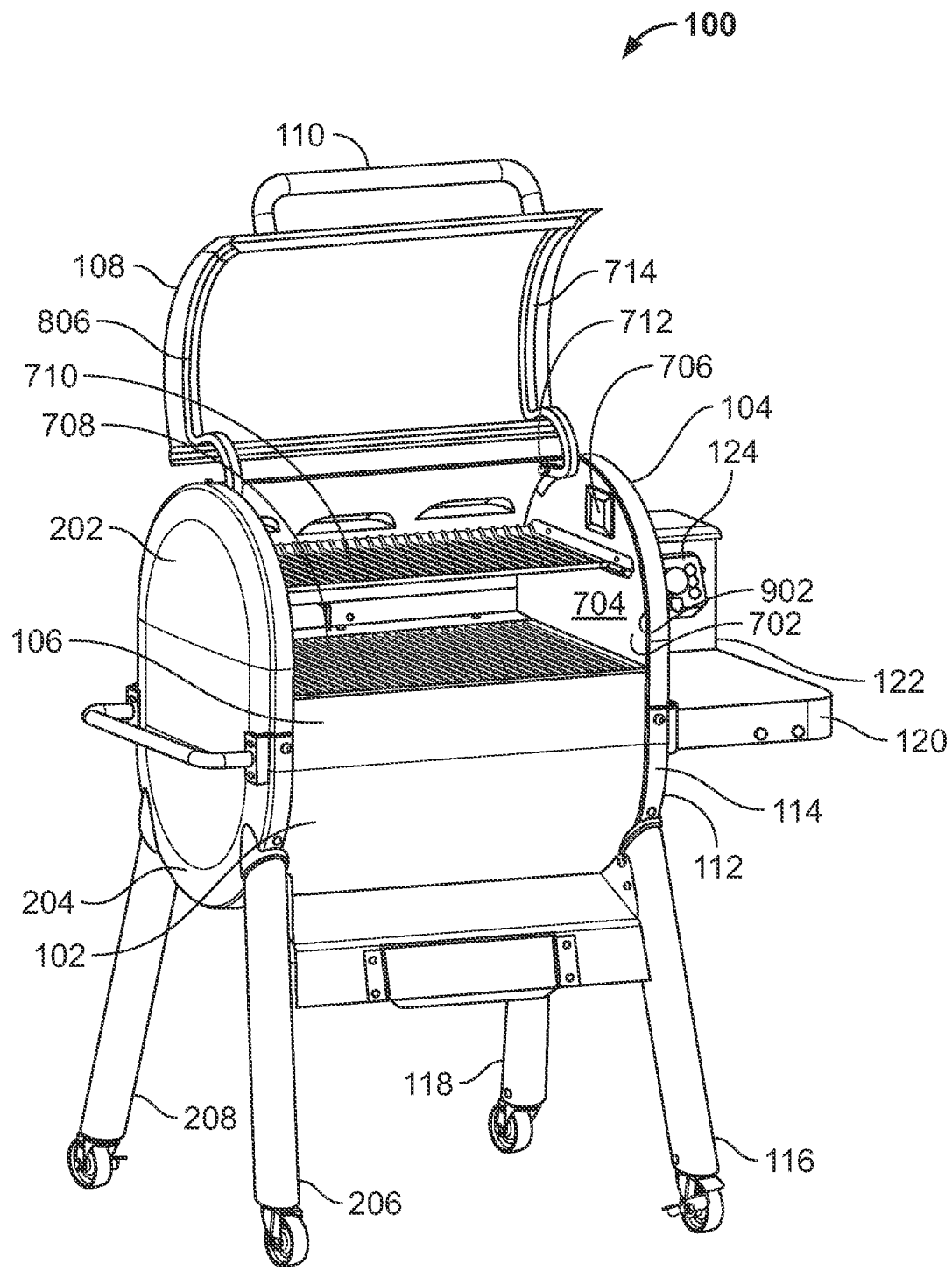
FIG. 9 is a first perspective view of the pellet grill of FIGS. 1-8 with the lid of the pellet grill in an example open position.
Figure 10:
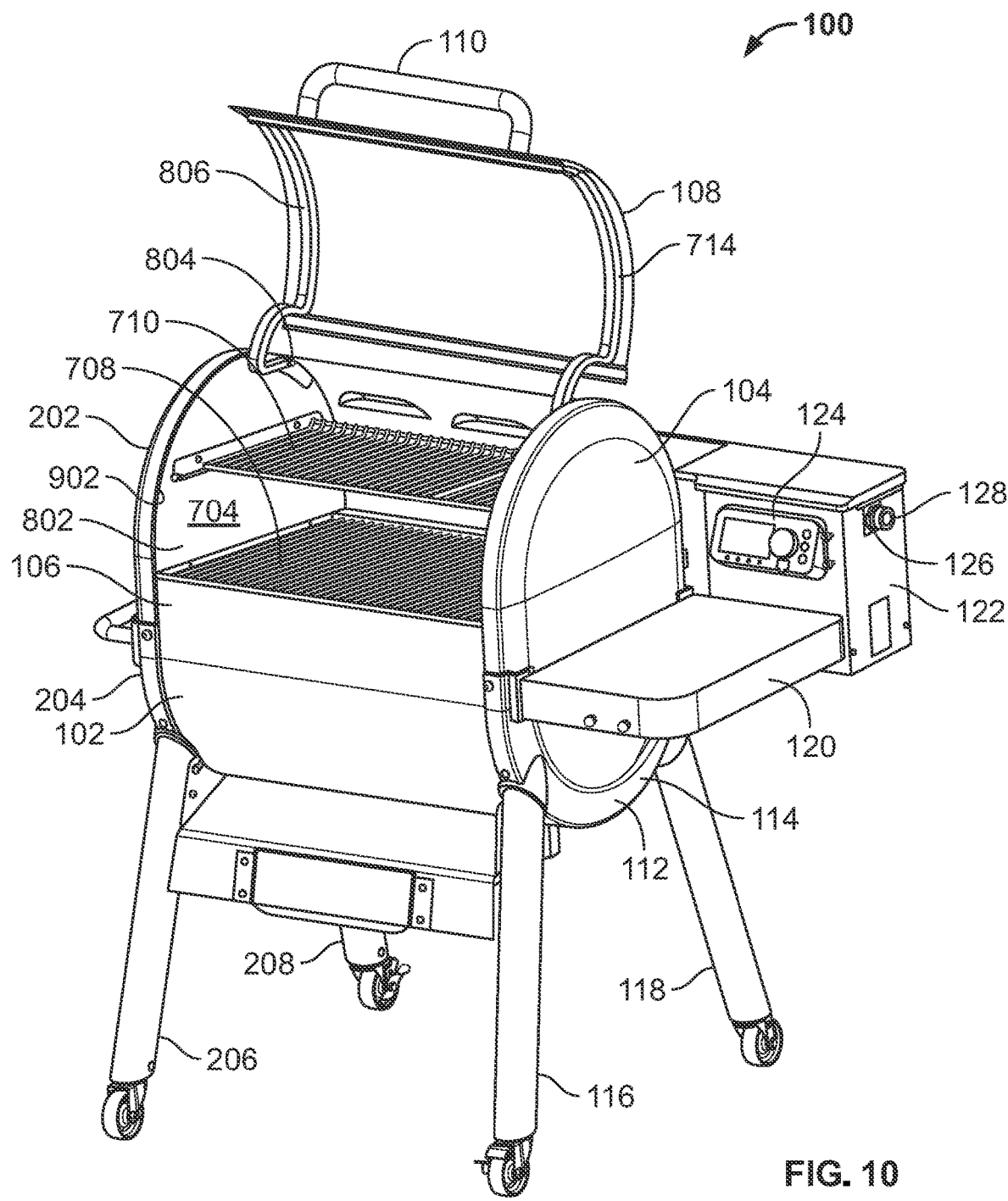
FIG. 10 is a second perspective view of the pellet grill of FIGS. 1-9 with the lid of the pellet grill in the open position.
Figure 11:
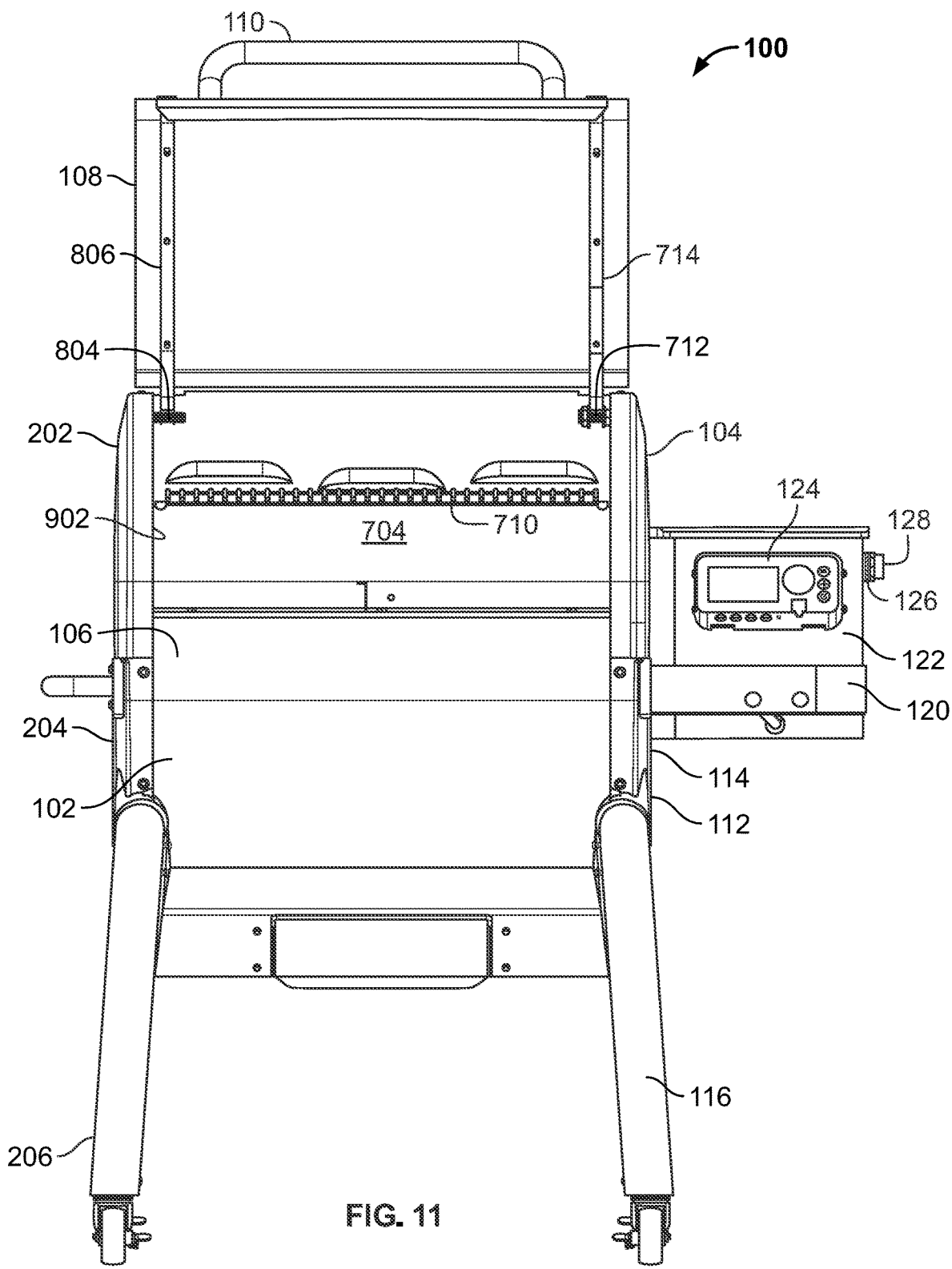
FIG. 11 is a front view of the pellet grill of FIGS. 1-10 with the lid of the pellet grill in the open position.

FIG. 1 is a first perspective view of an example pellet grill 100 constructed in accordance with teachings of this disclosure. FIG. 2 is a second perspective view of the pellet grill 100 of FIG. 1. FIG. 3 is a front view of the pellet grill 100 of FIGS. 1 and 2. FIG. 4 is a first side view of the pellet grill 100 of FIGS. 1-3. FIG. 5 is a second side view of the pellet grill of FIGS. 1-4. FIG. 6 is a top view of the pellet grill 100 of FIGS. 1-5. FIG. 7 is a cross-sectional view of the pellet grill 100 of FIGS. 1-6 taken along section A-A of FIG. 3. FIG. 8 is a cross-sectional view of the pellet grill 100 of FIGS. 1-7 taken along section B-B of FIG. 3. FIG. 9 is a first perspective view of the pellet grill 100 of FIGS. 1-8 with the lid of the pellet grill 100 in an example open position. FIG. 10 is a second perspective view of the pellet grill 100 of FIGS. 1-9 with the lid of the pellet grill 100 in the open position. FIG. 11 is a front view of the pellet grill 100 of FIGS. 1-10 with the lid of the pellet grill 100 in the open position.

In the illustrated example of FIGS. 1-11, the pellet grill 100 includes an example main body 102. The main body 102 of the pellet grill 100 is formed and/or defined via an example first end cap 104 (e.g., a right end cap), an example second end cap 202 (e.g., a left end cap) located opposite the first end cap 104, and an example outer wall 106 that extends between the first end cap 104 and the second end cap 202. As shown in FIGS. 1-11, the first end cap 104 and the second end cap 202 of the main body 102 respectively have an oval and/or pill-shaped profile. The outer wall 106 of the main body 102 has an oval and/or pill-shaped cross-sectional structure that generally corresponds to the oval and/or pill-shaped profile of the first end cap 104 and/or the second end cap 202. The first end cap 104 of the main body 102 is further described below in connection with FIGS. 12-13 and 16-18. The second end cap 202 of the main body 102 is further described below in connection with FIGS. 19-20 and 23-25.

As shown in FIGS. 7-11, the main body 102 of the pellet grill 100 of FIGS. 1-11 includes an example first liner 702 (e.g., a right liner) coupled to the first end cap 104 and/or the outer wall 106, and an example second liner 802 (e.g., a left liner) coupled to the second end cap 202 and/or the outer wall 106. The first liner 702 has an oval and/or pill-shaped profile that generally complements and/or matches the oval and/or pill-shaped profile of the first end cap 104, and the second liner 802 has a an oval and/or pill-shaped profile that generally complements and/or matches the oval and/or pill-shaped profile of the second end cap 202. The first liner 702 and the second liner 802 are respectively located inwardly (e.g., centrally) relative to corresponding ones of the first end cap 104 and the second end cap 202. The first liner 702 of the main body 102 is further described below in connection with FIGS. 14-18. The second liner 802 of the main body 102 is further described below in connection with FIGS. 21-25.

As further shown in FIGS. 7-11, the first end cap 104, the second end cap 202, the outer wall 106, the first liner 702, the second liner 802, and/or, more generally, the main body 102 of the pellet grill 100 define(s) an example cooking chamber 704 of the pellet grill 100. In this regard, the first end cap 104, the second end cap 202, and the outer wall 106 define an exterior of the cooking chamber 704, and the first liner 702, the second liner 802, and the outer wall 106 define an interior of the cooking chamber 704. The pellet grill 100 of FIGS. 1-11 includes a lighting system implemented in part via an example lighting module 706 coupled to the first liner 702 of the main body 102, with the lighting module 706 being configured to project light into and/or otherwise illuminate the interior of the cooking chamber 704. In other examples, the lighting system of the pellet grill 100 can additionally or alternatively include a separate lighting module (e.g., structured substantially the same as the lighting module 706) coupled to the second liner 802 of the main body 102, and similarly configured to project light into and/or otherwise illuminate the interior of the cooking chamber 704. The lighting module 706 of the pellet grill 100 is further described below in connection with FIGS. 16-18, 26, and 30.

The cooking chamber 704 of the pellet grill 100 of FIGS. 1-11 further includes an example first cooking grate 708 and an example second cooking grate 710 that respectively support food items that are cooked, cooking, and/or to be cooked within the cooking chamber 704. In some examples, the first cooking grate 708 can be implemented as a modular cooking surface that includes two or more cooking surface components. For example, the first cooking grate 708 can include a first cooking surface component (e.g., a right grate) and a second cooking surface component (e.g., a left grate) that, when placed side-by-side, form a continuous cooking surface. In some such examples, the first cooking grate 708 can further include a third (e.g., centrally located) cooking surface that can be implemented as a sear grate, a pizza stone, a griddle, a wok, etc.

In the illustrated example of FIGS. 1-11, the outer wall 106 of the main body 102 of the pellet grill 100 includes and/or defines an example opening 902 that is configured to be selectively covered or uncovered by an example lid 108 of the pellet grill 100. FIGS. 1-8 show the lid 108 of the pellet grill 100 in an example closed position, thereby concealing the opening 902 formed in the main body 102 of the pellet grill 100. FIGS. 9-11 show the lid 108 of the pellet grill 100 in an example open position, thereby revealing the opening 902 formed in the main body 102 of the pellet grill 100. Placement of the lid 108 in the open position shown in FIGS. 9-11 enables a user to access the interior of the cooking chamber 704 via the opening 902, as may be required to load, unload, and/or otherwise access food items that are cooked, cooking, and/or to be cooked within the cooking chamber 704. Movement of the lid between the closed position (e.g., as shown in FIGS. 1-8) and the open position (e.g., as shown in FIGS. 9-11) can be facilitated via an example handle 110 that is coupled to the lid 108. As shown in FIGS. 1-11, the lid 108 has a curved shape and/or profile that complements and/or matches a curved portion of the oval and/or pill-shaped cross-sectional structure of the outer wall 106 and/or the oval and/or pill-shaped profiles of the first end cap 104 and the second end cap 202. The shape of the lid 108 is configured to reduce (e.g., minimize) heat lost through the opening 902 while the lid 108 is in a closed position.

The lid 108 of the pellet grill 100 of FIGS. 1-11 is rotatably coupled to the main body 102 of the pellet grill 100 via an example first hinge 712 (e.g., a right hinge) located proximate the first liner 702 and via an example second hinge 804 (e.g., a left hinge) located proximate the second liner 802. The first hinge 712 includes an example hinge arm 714 and an example hinge bracket 716. The hinge arm 714 of the first hinge 712 is rigidly coupled to the lid 108, and rotatably coupled to the hinge bracket 716 of the first hinge 712. The hinge bracket 716 of the first hinge 712 is rigidly coupled to the outer wall 106 of the main body 102, to an encircling wall of the first end cap 104 of the main body 102, and to flanges of the first liner 702 of the main body 102. The second hinge 804 includes an example hinge arm 806 and an example hinge bracket 808. The hinge arm 806 of the second hinge 804 is rigidly coupled to the lid 108, and rotatably coupled to the hinge bracket 808 of the second hinge 804. The hinge bracket 808 of the second hinge 804 is rigidly coupled to the outer wall 106 of the main body 102, to an encircling wall of the second end cap 202 of the main body 102, and to flanges of the second liner 802 of the main body 102. The hinge arm 714 of the first hinge 712 and the hinge arm 806 of the second hinge 804 respectively have a curved shape and/or profile that complements and/or matches the curved shape and/or profile of the lid 108.

The pellet grill 100 of FIGS. 1-11 further includes an example base 112 configured to support the main body 102 of the pellet grill 100 at a height (e.g., approximately 18 inches) above an underlying ground surface, and/or to support the first cooking grate 708 of the pellet grill 100 at a height (e.g., approximately 32 inches) above an underlying ground surface. The base 112 includes an example first support 114 (e.g., a right support) coupled to the first end cap 104, and an example second support 204 (e.g., a left support) coupled to the second end cap 202. The first support 114 includes an example first leg 116 (e.g., a forwardly positioned leg) and an example second leg 118 (e.g., a rearwardly positioned leg) that respectively extend away (e.g., downwardly) from the main body 102 of the pellet grill 100. The second support 204 similarly includes an example first leg 206 (e.g., a forwardly positioned leg) and an example second leg 208 (e.g., a rearwardly positioned leg) that respectively extend away (e.g., downwardly) from the main body 102 of the pellet grill 100. One or more of the leg(s) 116, 118, 206, 208 of the first support 114 and/or the second support 204 include one or more wheel(s) and/or caster(s) to facilitate moving the pellet grill 100 from one location to another.

The pellet grill 100 of FIGS. 1-11 further includes an example side table 120 coupled to the first support 114 of the base 112. In other examples, the side table 120 can alternatively be coupled to the second support 204 of the base 112. The side table 120 provides an elevated support surface onto and/or from which food items, food preparation items, cooking utensils, and/or other objects can be positioned, located and/or suspended.

The pellet grill 100 of FIGS. 1-11 further includes an example hopper 122. The hopper 122 holds a volume of pellet fuel to be fed and/or supplied (e.g., via gravity) to an engine of the pellet grill 100. In the illustrated example of FIGS. 1-11, the hopper 132 is coupled to the rear of the main body 102 of the pellet grill 100, and is generally oriented toward the first end cap 104 of the main body 102. The hopper 122 extends laterally past the first end cap 104, thereby facilitating loading and/or filling of the hopper 122 from a front and/or side area of the pellet grill 100 proximate the side table 120. In other examples, the hopper 122 can be coupled to the rear of the main body 102 of the pellet grill 100, but alternatively be oriented toward and extend laterally past the second end cap 202 of the main body 102. In still other examples, the hopper 122 can alternatively be coupled to the right side or the left side of the main body 102 of the pellet grill 100.

The pellet grill 100 of FIGS. 1-11 further includes an example user interface 124 that is operatively coupled to a controller and/or, more generally, a control system of the pellet grill 100. The user interface 124 includes one or more input device(s) (e.g., buttons, switches, knobs, touchscreens, etc.) and/or one or more output device(s) (e.g., liquid crystal displays, light emitting diodes, speakers, etc.) that enable a user of the pellet grill 100 to interact with a controller and/or a control system of the pellet grill 100. In the illustrated example of FIGS. 1-11, the user interface 124 is mounted on and/or to the front of the hopper 122. In other examples, the user interface 124 can be mounted on and/or to a different surface of the hopper 122. In still other examples, the user interface 124 can be mounted on and/or to a different component of the pellet grill 100, such as the side table 120 of the pellet grill 100.

The pellet grill 100 of FIGS. 1-11 further includes an example switch 126 that is operable by a user of the pellet grill 100 to control the lighting system of the pellet grill 100. In the illustrated example of FIGS. 1-11, the switch 126 is mounted on and/or to the right side of the hopper 122. In other examples, the switch 126 can be mounted on and/or to a different surface of the hopper 122. In still other examples, the switch 126 can be mounted on and/or to a different component of the pellet grill 100, such as the side table 120 of the pellet grill 100. In still other examples, the switch 126 can be fully integrated as part of the user interface 124, such that the user interface 124 of the pellet grill 100 enables a user to interact with both a control system and the lighting system of the pellet grill 100.

In the illustrated example of FIGS. 1-11, the switch 126 includes an example button 128 that is actuatable by a user of the pellet grill 100 to selectively cause the switch 126 to close a circuit of the lighting system of the pellet grill 100. When the switch 126 closes the circuit (e.g., in response to a user actuating the button 128), power is transmitted from a power source (e.g., a power supply, a battery, etc.) to the lighting module 706 of the lighting system, thereby causing light to be generated by and/or projected from the lighting module 706 into the cooking chamber 704 of the pellet grill 100. When the switch 126 opens the circuit (e.g., in response to a user releasing the button 128, or actuating the button 128 a second time), power is no longer transmitted from the power source to the lighting module 706 of the lighting system, and light is therefore no longer generated by and/or projected from the lighting module 706 into the cooking chamber 704 of the pellet grill 100.

In some examples, the switch 126 of FIGS. 1-11 is configured as an on/off switch. In such examples, a user must press and/or actuate the button 128 of the switch 126 two successive times to cycle the switch 126 and/or the circuit from an OFF state to an ON state and back to an OFF state. In other examples, the switch 126 of FIGS. 1-11 can instead be configured as a momentary switch. In such examples, a user must press and hold the button 128 of the switch 126 to transition the switch 126 and/or the circuit from an OFF state to an ON state. The user can thereafter release the button 128 of the switch 126 to transition the switch 126 and/or the circuit from the ON state back to the OFF state. Implementing the switch 126 as a momentary switch (e.g., as opposed to an on/off switch) can be advantageous with regard to preserving the remaining amount of energy associated with the power source, and/or preventing instances in which a user might otherwise inadvertently leave the switch 126 and/or, more generally, the lighting system of the pellet grill 100 in a powered (e.g., light generating) state.

Figure 13:
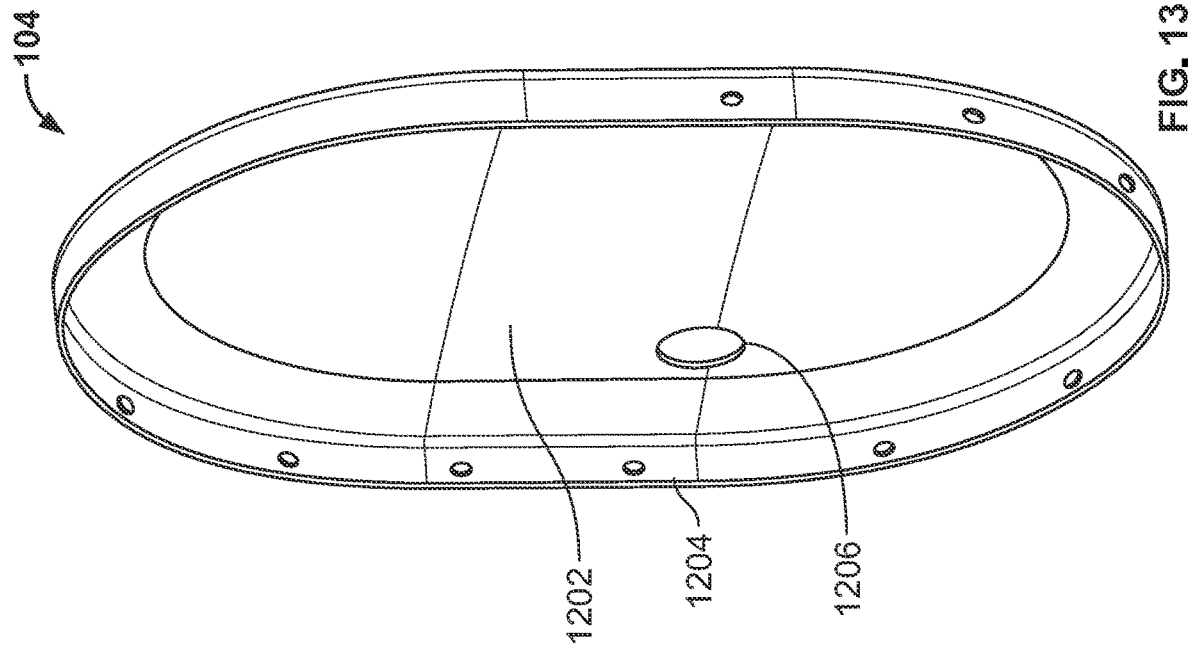
FIG. 13 is a second isolated perspective view of the first end cap of the pellet grill of FIGS. 1-11.
Figure 12:
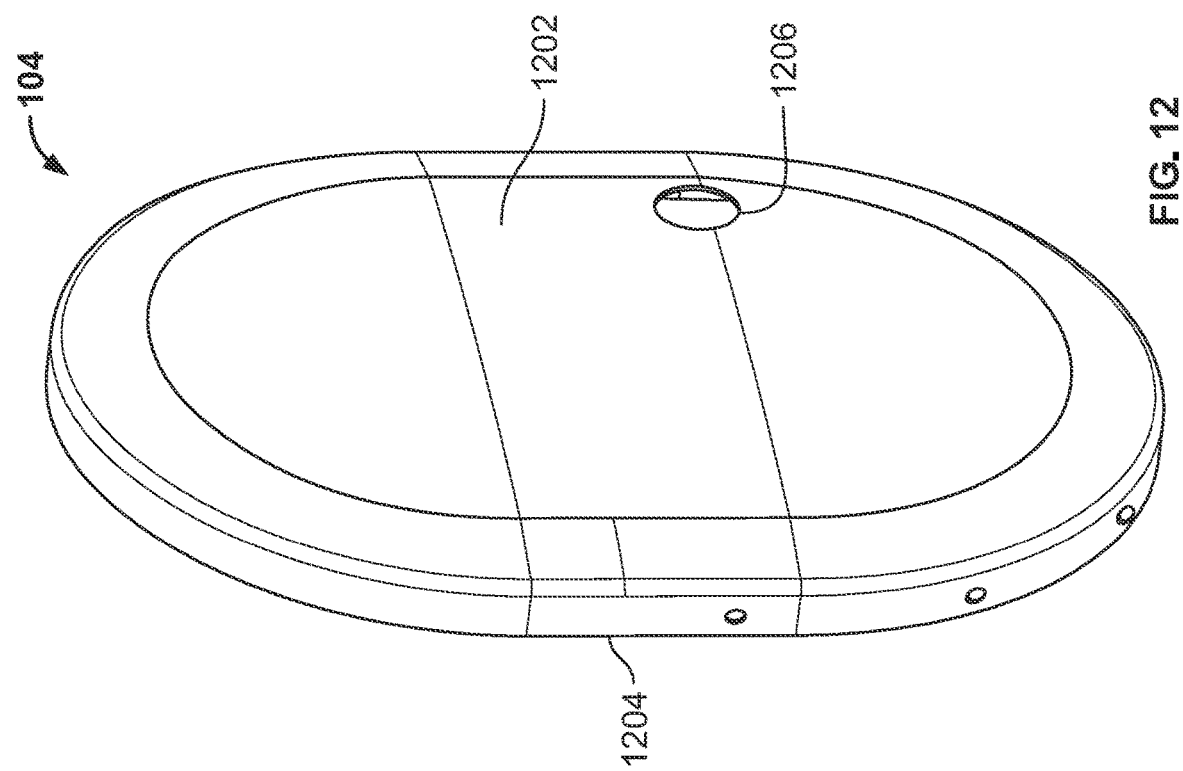
FIG. 12 is a first isolated perspective view of the first end cap of the pellet grill of FIGS. 1-11.

FIG. 12 is a first isolated perspective view of the first end cap 104 of the pellet grill 100 of FIGS. 1-11. FIG. 13 is a second isolated perspective view of the first end cap 104 of the pellet grill 100 of FIGS. 1-11. As shown in FIGS. 12-13, the first end cap 104 includes an example vertically-oriented sidewall 1202, and further includes an example transversely-oriented encircling wall 1204 that extends inwardly (e.g., toward the center of the cooking chamber 704 of FIGS. 7-11) from the sidewall 1202 of the first end cap 104. An example opening 1206 is formed in the sidewall 1202 of the first end cap 104. The opening 1206 is configured to receive a power cable and/or wiring used to route power to the lighting module 706 of the lighting system of the pellet grill 100, as further described herein. In some examples, a grommet is inserted into and/or located within the opening 1206. In such examples, the grommet prevents tearing and/or abrasion of, and/or otherwise reduces wear on, the power cable and/or wiring that passes through the opening 1206. In some such examples, the grommet additionally prevents heat loss through the opening 1206, and/or assists with wire management (e.g., wire retention).

Figure 14:
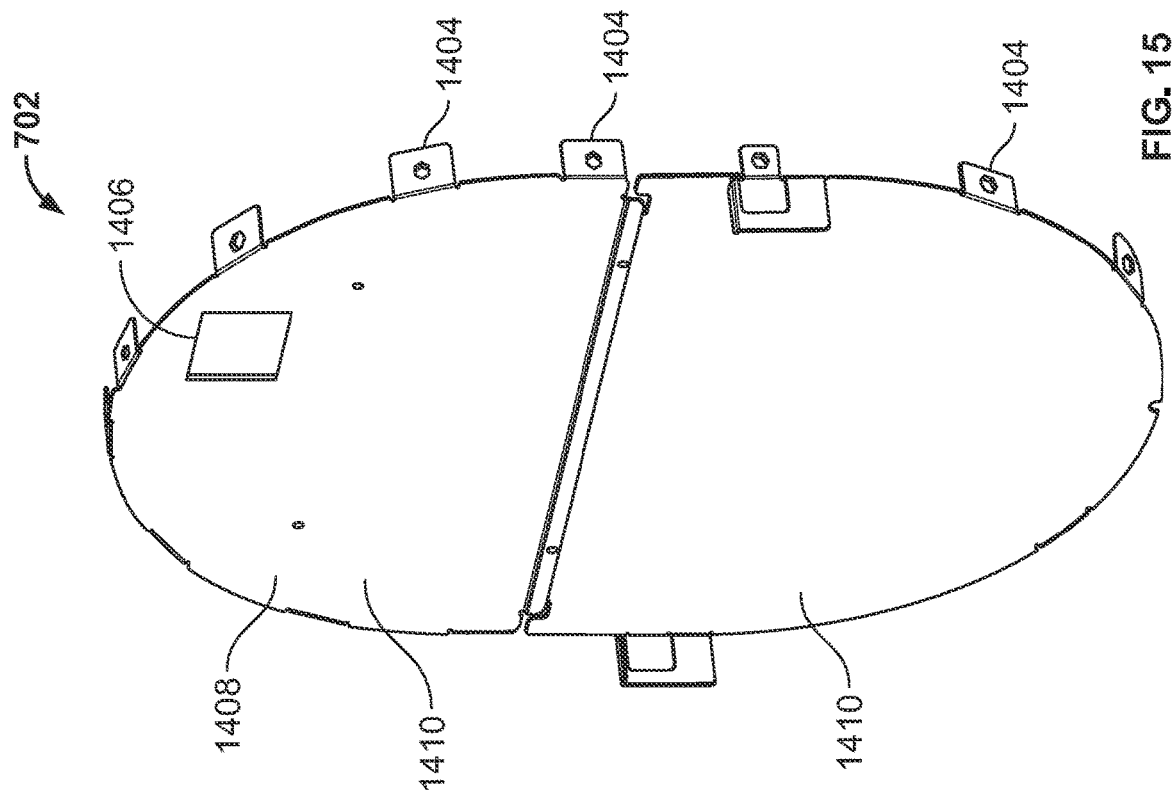
FIG. 14 is a first isolated perspective view of the first liner of the pellet grill of FIGS. 1-11.
Figure 15:
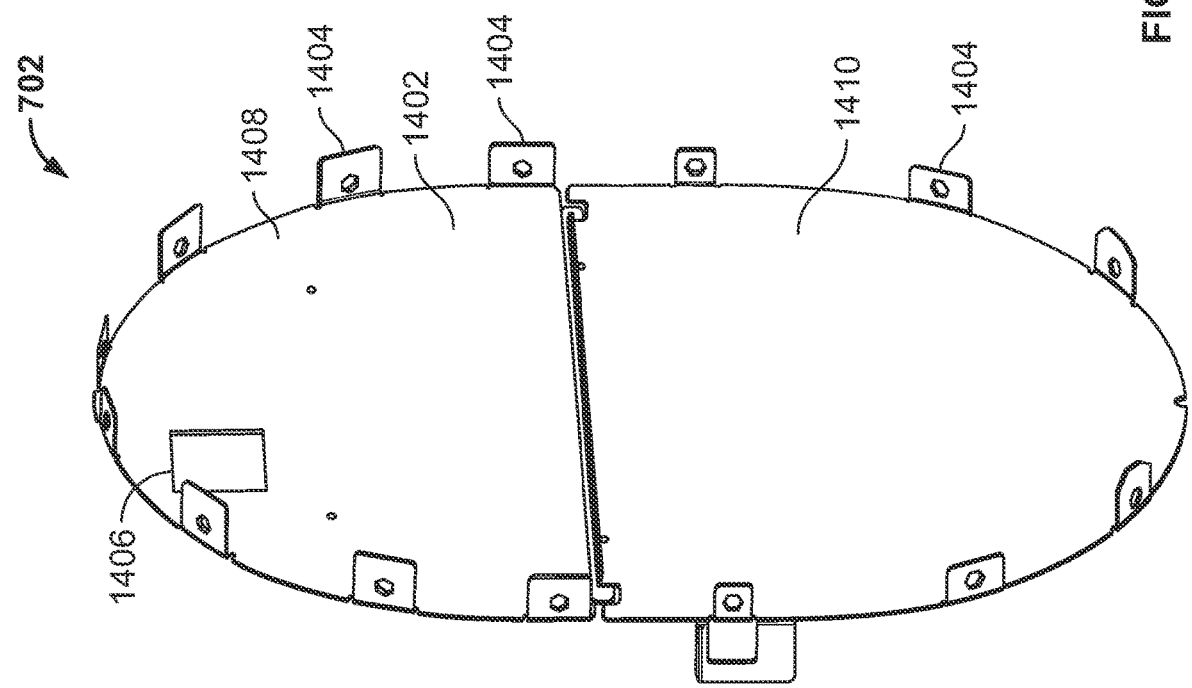
FIG. 15 is a second isolated perspective view of the first liner of the pellet grill of FIGS. 1-11.

FIG. 14 is a first isolated perspective view of the first liner 702 of the pellet grill 100 of FIGS. 1-11. FIG. 15 is a second isolated perspective view of the first liner 702 of the pellet grill 100 of FIGS. 1-11. As shown in FIGS. 14-15, the first liner 702 includes an example vertically-oriented sidewall 1402, and further includes example transversely-oriented flanges 1404 that extend outwardly (e.g., away from the center of the cooking chamber 704 of FIGS. 7-11) from the sidewall 1402 of the first liner 702. An example opening 1406 is formed in the sidewall 1402 of the first liner 702. The opening 1406 is configured to receive a portion of the lighting module 706 of the lighting system of the pellet grill 100, as further described herein.

In the illustrated example of FIGS. 14 and 15, the first liner 702 is formed via an example upper liner portion 1408 and an example lower liner portion 1410, with the upper liner portion 1408 and the lower liner portion 1410 being coupled to and generally aligned with one another. In other examples, the first liner 702 can alternatively be formed from a different number and/or orientation of liner portions. For example, the first liner 702 can alternatively be formed via a single liner portion. As another example, the first liner 702 can alternatively be formed via a forward liner portion and a rearward liner portion. As still another example, the first liner 702 can alternatively be formed via an upper liner portion, a lower liner portion, and a middle liner portion located between the upper and lower liner portions.

Figure 18:
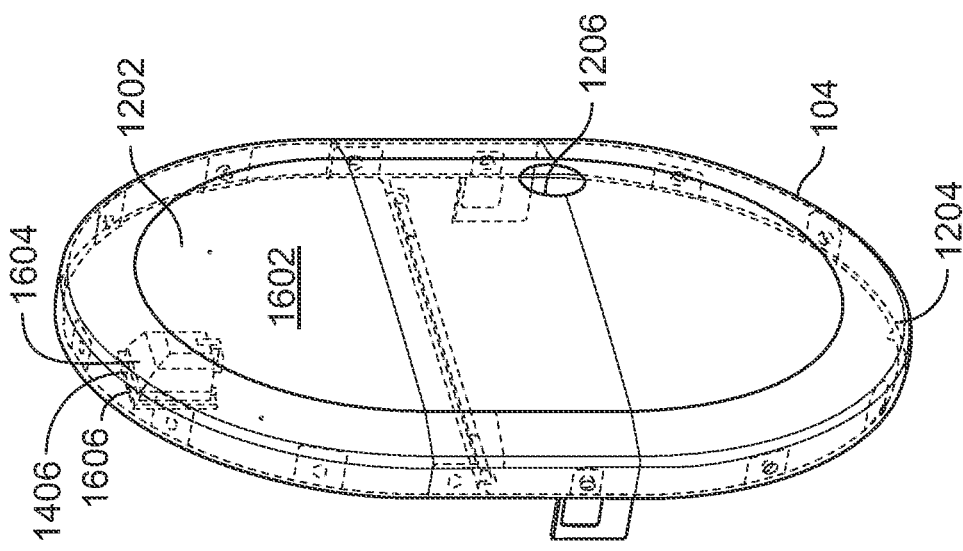
FIG. 18 is a second isolated perspective view of the first end cap and the first liner of the pellet grill of FIGS. 1-11 with the first end cap and the first liner shown in phantom, and with the lighting module of the pellet grill shown positioned between the first end cap and the first liner.
Figure 17:
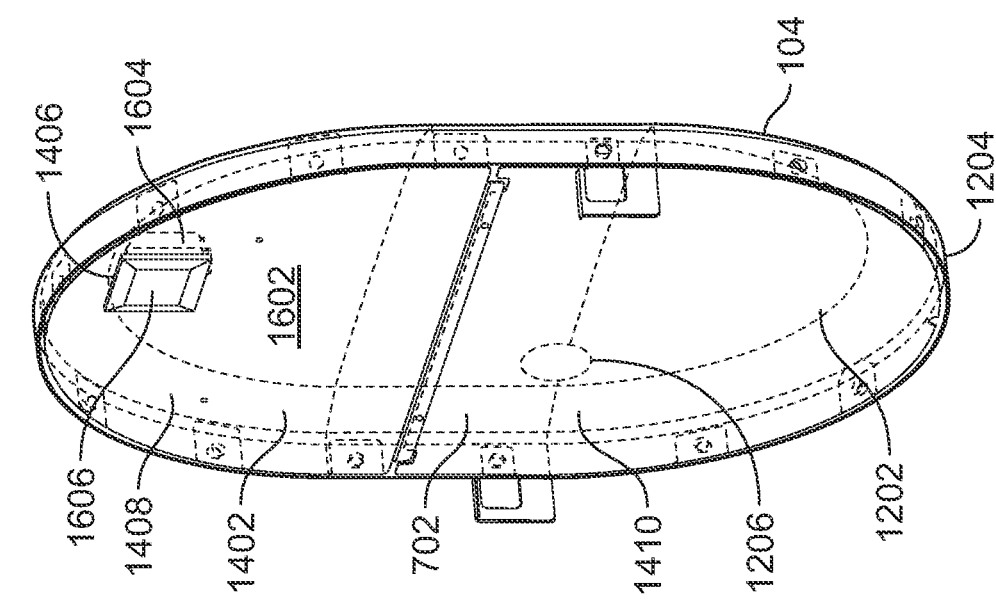
FIG. 17 is a first isolated perspective view of the first end cap and the first liner of the pellet grill of FIGS. 1-11 with the first end cap and the first liner shown in phantom, and with the lighting module of the pellet grill shown positioned between the first end cap and the first liner.
Figure 16:
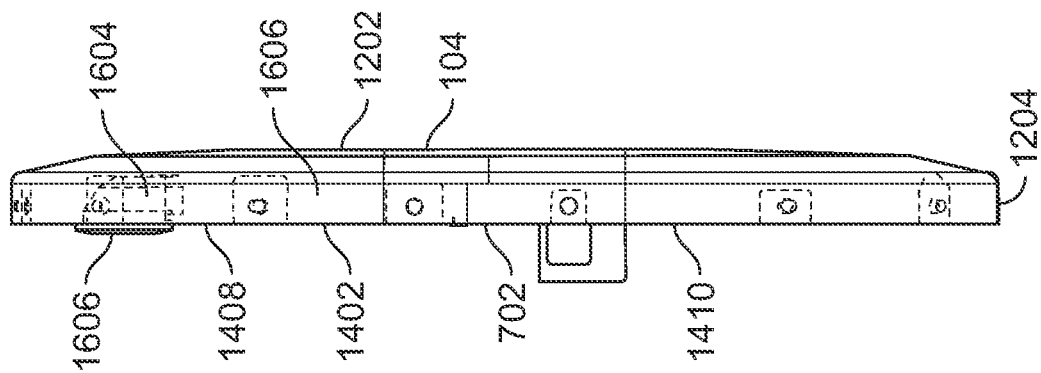
FIG. 16 is an isolated front view of the first end cap and the first liner of the pellet grill of FIGS. 1-11 with the first end cap and the first liner shown in phantom, and with the lighting module of the pellet grill shown positioned between the first end cap and the first liner.

FIG. 16 is an isolated front view of the first end cap 104 and the first liner 702 of the pellet grill 100 of FIGS. 1-11 with the first end cap 104 and the first liner 702 shown in phantom, and with the lighting module 706 of the pellet grill 100 shown positioned between the first end cap 104 and the first liner 702. FIG. 17 is a first isolated perspective view of the first end cap 104 and the first liner 702 of the pellet grill 100 of FIGS. 1-11 with the first end cap 104 and the first liner 702 shown in phantom, and with the lighting module 706 of the pellet grill 100 shown positioned between the first end cap 104 and the first liner 702. FIG. 18 is a second isolated perspective view of the first end cap 104 and the first liner 702 of the pellet grill 100 of FIGS. 1-11 with the first end cap 104 and the first liner 702 shown in phantom, and with the lighting module 706 of the pellet grill 100 shown positioned between the first end cap 104 and the first liner 702.

As shown in FIGS. 16-18, the encircling wall 1204 of the first end cap 104 circumscribes the flanges 1404 of the first liner 702. The encircling wall 1204 of the first end cap 104 extends transversely from the sidewall 1202 of the first end cap 104 toward the sidewall 1402 of the first liner 702. The flanges 1404 of the first liner 702 extend transversely from the sidewall 1402 of the first liner 702 toward the sidewall 1202 of the first end cap 104. The sidewall 1402 of the first liner 702 is spaced apart from (e.g., spaced inwardly from) the sidewall 1202 of the first end cap 104, with the spacing between the sidewall 1402 of the first liner 702 and the sidewall 1202 of the first end cap 104 defining an example compartment 1602. The compartment 1602 is configured to contain a portion (e.g., the majority) of the lighting module 706 of the lighting system of the pellet grill 100, as further described herein.

As further shown in FIGS. 16-18, the lighting module 706 of the lighting system of the pellet grill includes an example housing 1604. The housing 1604 and/or the compartment 1602 is/are configured such that the majority (e.g., the entirety) of the housing 1604 is disposed within the compartment 1602. In some examples a portion of the housing 1604 of the lighting module 706 extends to, into, or through the opening 1406 formed in the sidewall 1402 of the first liner 702. The housing 1604 is configured to house, carry, and/or contain a light source of the lighting module 706. In some examples, the light source is implemented via one or more halogen bulb(s). In other examples, the light source can instead be implemented by an alternative light source, such as one or more fluorescent bulb(s), or one or more light-emitting diode(s) (LED(s)).

The lighting module 706 of the lighting system of the pellet grill further includes an example cover 1606 that is removably coupled to the housing 1604 of the lighting module 706 and/or to the opening 1406 formed in the sidewall 1402 of the first liner 702. In the illustrated example of FIGS. 16-18, the face of the cover 1606 is disposed inwardly from the sidewall 1402 of the first liner 702 (e.g., toward the center of the cooking chamber 704) when the cover 1606 is coupled to the housing 1604 of the lighting module 706 and/or to the opening 1406 formed in the sidewall 1402 of the first liner 702. In other examples, the face of the cover 1606 is flush with the sidewall 1402 of the first liner 702 when the cover 1606 is coupled to the housing 1604 of the lighting module 706 and/or to the opening 1406 formed in the sidewall 1402 of the first liner 702.

The cover 1606 of the lighting module 706 can be configured to converge, diverge, diffuse, focus, filter, and/or otherwise direct light generated by and/or projected from the light source of the lighting module 706 to one or more intended area(s) within the interior of the cooking chamber 704. The cover 1606 is preferably manufactured from a dishwasher-safe material such that the cover 1606 can be easily cleaned upon the cover 1606 being removed from the housing 1604 of the lighting module 706 and/or from the opening 1406 formed in the sidewall 1402 of the first liner 702. The cover 1606 is configured to be removed via the opening 902 of the pellet grill 100 that becomes accessible when the lid 108 of the pellet grill 100 is in the open position. A user can accordingly access and/or replace the light source of the lighting module 706 without the user having to disassemble the first end cap 104 and/or the first liner 702 of the pellet grill 100.

In the illustrated example of FIGS. 16-18, the compartment 1602 is further configured to contain a power cable and/or wiring extending from the lighting module 706 to the opening 1206 formed in the first end cap 104. A power cable and/or wiring disposed within the compartment 1602 can be used to route and/or deliver power from a power supply of the pellet grill 100 to the lighting module 706 of the lighting system of the pellet grill 100. The compartment 1602 is still further configured to contain insulation (e.g., one or more insulating sheet(s) or insulating liner(s)) that reduce the temperature associated with the first liner 702 and/or the first end cap 104 in connection with use of the lighting module 706 of the lighting system of the pellet grill 100.

Figure 20:
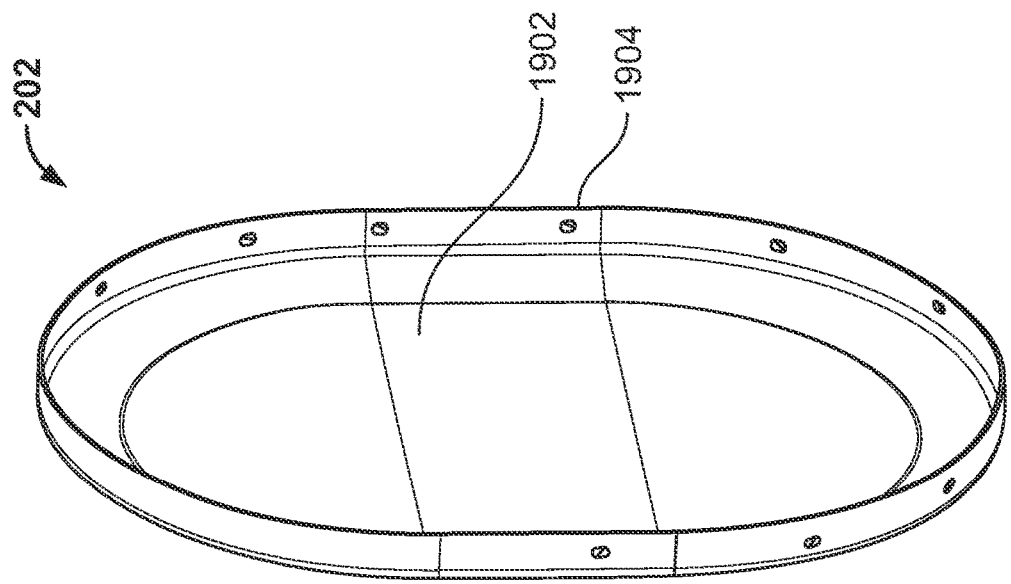
FIG. 20 is a second isolated perspective view of the second end cap of the pellet grill of FIGS. 1-11.
Figure 19:
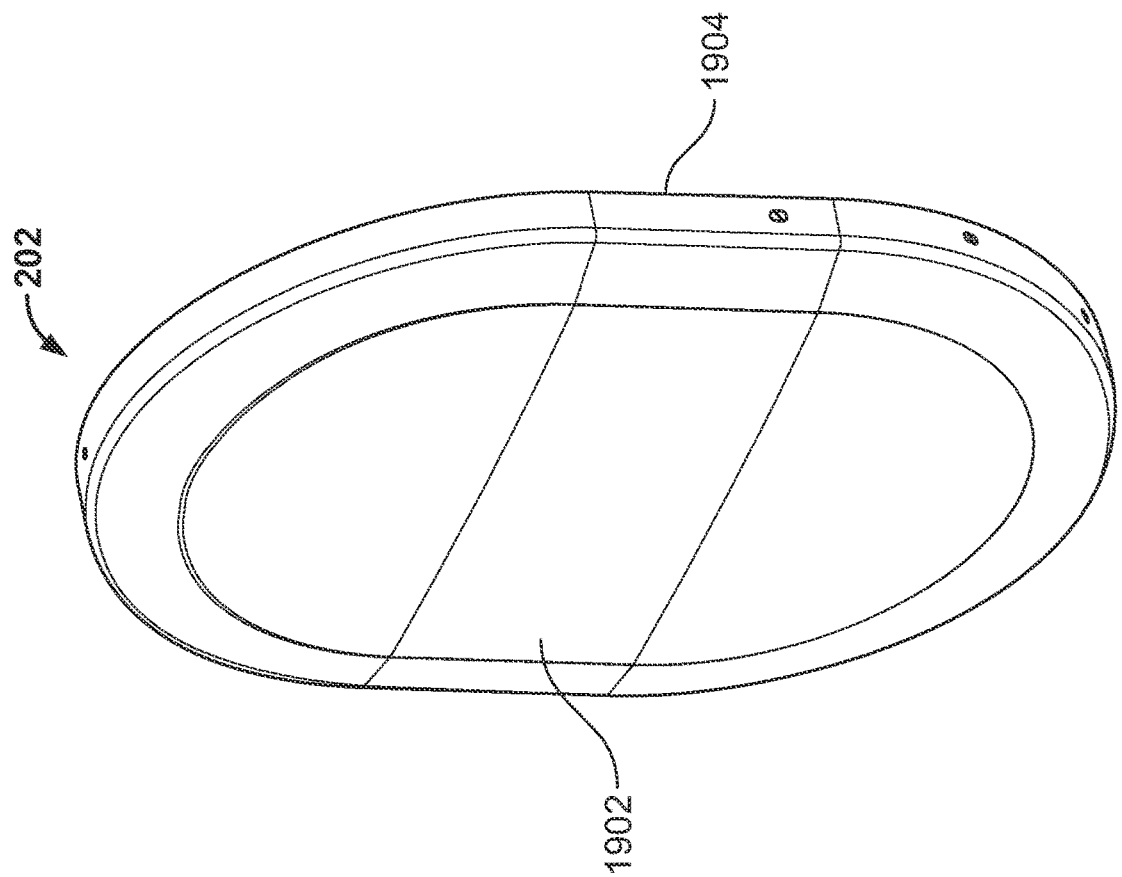
FIG. 19 is a first isolated perspective view of the second end cap of the pellet grill of FIGS. 1-11.

FIG. 19 is a first isolated perspective view of the second end cap 202 of the pellet grill 100 of FIGS. 1-11. FIG. 20 is a second isolated perspective view of the second end cap 202 of the pellet grill 100 of FIGS. 1-11. As shown in FIGS. 19-20, the second end cap 202 includes an example vertically-oriented sidewall 1902, and further includes an example transversely-oriented encircling wall 1904 that extends inwardly (e.g., toward the center of the cooking chamber 704 of FIGS. 7-11) from the sidewall 1902 of the second end cap 202. The sidewall 1902 of the second end cap 202 differs from the sidewall 1202 of the first end cap 104 in that the sidewall 1902 of the second end cap 202 does not include an opening corresponding to the above-described opening 1206 formed in the sidewall 1202 of the first end cap 104.

Figure 22:
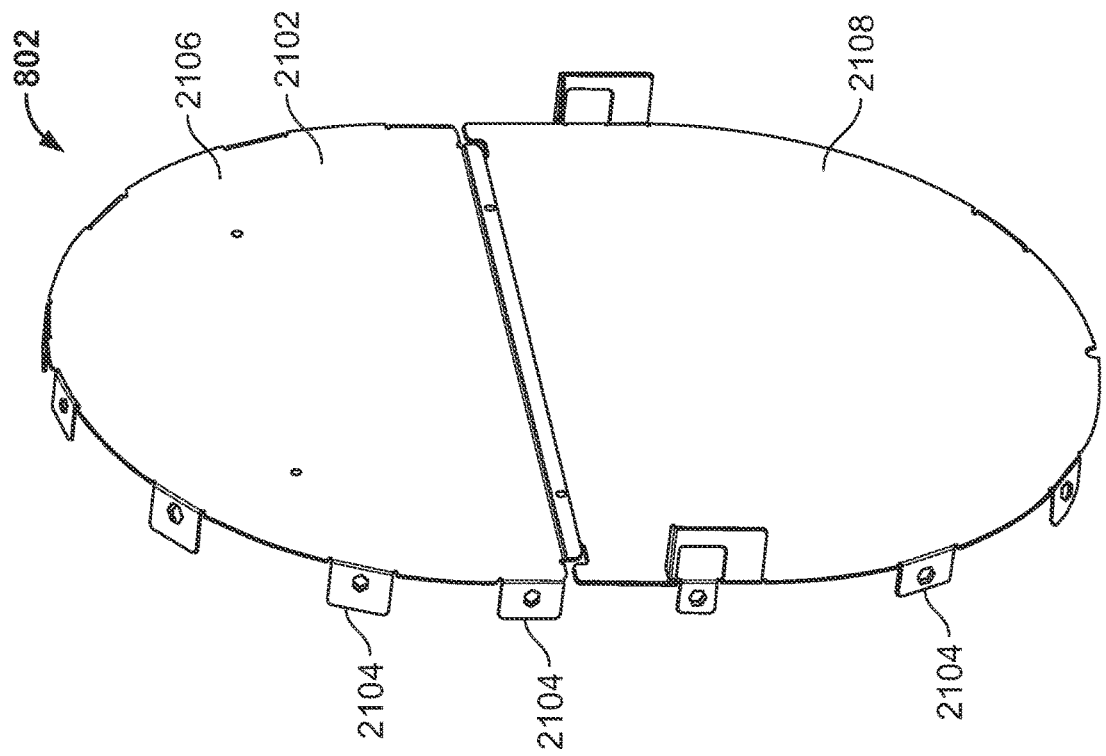
FIG. 22 is a second isolated perspective view of the second liner of the pellet grill of FIGS. 1-11.
Figure 21:
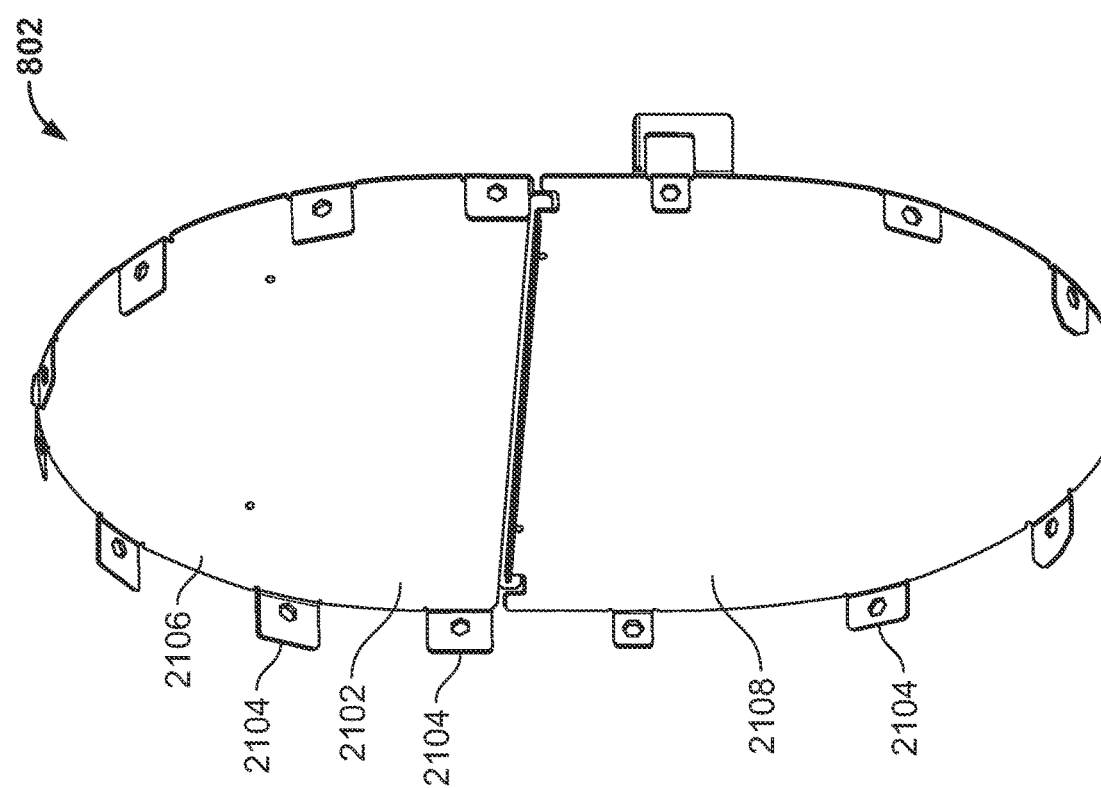
FIG. 21 is a first isolated perspective view of the second liner of the pellet grill of FIGS. 1-11.

FIG. 21 is a first isolated perspective view of the second liner 802 of the pellet grill 100 of FIGS. 1-11. FIG. 22 is a second isolated perspective view of the second liner 802 of the pellet grill 100 of FIGS. 1-11. As shown in FIGS. 21-22, the second liner 802 includes an example vertically-oriented sidewall 2102, and further includes example transversely-oriented flanges 2104 that extend outwardly (e.g., away from the center of the cooking chamber 704 of FIGS. 7-11) from the sidewall 2102 of the second liner 802. The sidewall 2102 of the second liner 802 differs from the sidewall 1402 of the first liner 702 in that the sidewall 2102 of the second liner 802 does not include an opening corresponding to the above-described opening 1406 formed in the sidewall 1402 of the first liner 702.

In the illustrated example of FIGS. 21 and 22, the second liner 802 is formed via an example upper liner portion 2106 and an example lower liner portion 2108, with the upper liner portion 2106 and the lower liner portion 2108 being coupled to and generally aligned with one another. In other examples, the second liner 802 can alternatively be formed from a different number and/or orientation of liner portions. For example, the second liner 802 can alternatively be formed via a single liner portion. As another example, the second liner 802 can alternatively be formed via a forward liner portion and a rearward liner portion. As still another example, the second liner 802 can alternatively be formed via an upper liner portion, a lower liner portion, and a middle liner portion located between the upper and lower liner portions.

Figure 25:
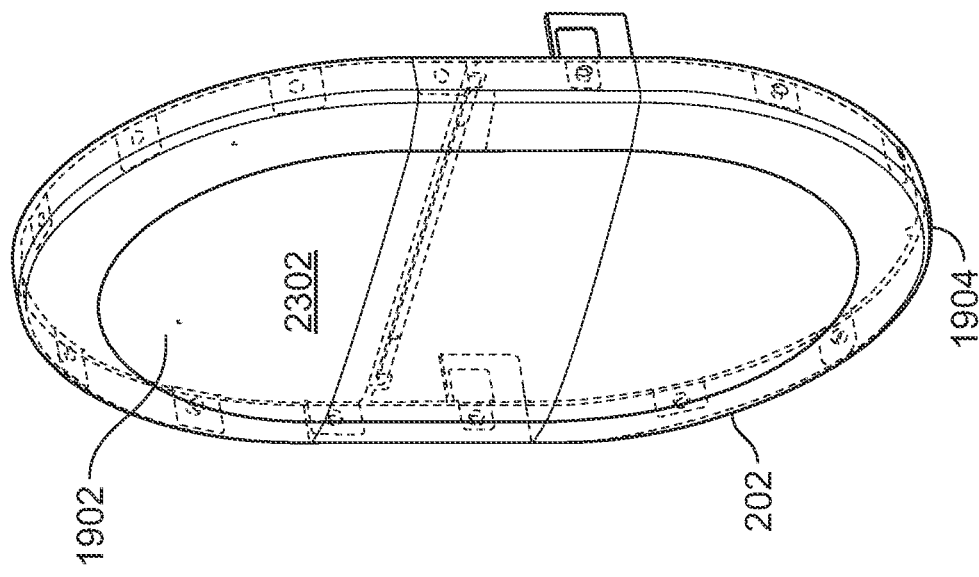
FIG. 25 is a second isolated perspective view of the second end cap and the second liner of the pellet grill of FIGS. 1-11 with the second end cap and the second liner shown in phantom.
Figure 24:
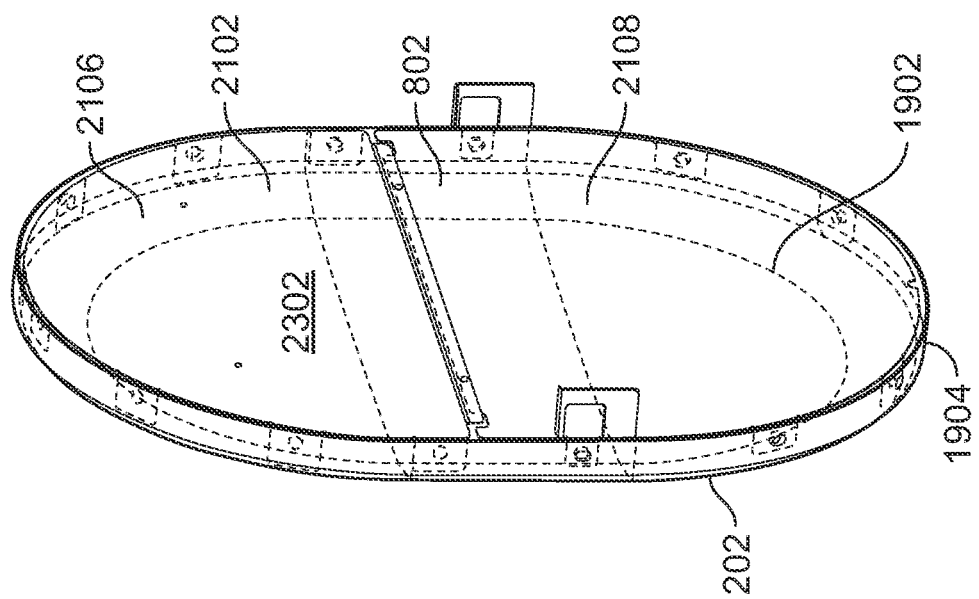
FIG. 24 is a first isolated perspective view of the second end cap and the second liner of the pellet grill of FIGS. 1-11 with the second end cap and the second liner shown in phantom.
Figure 23:
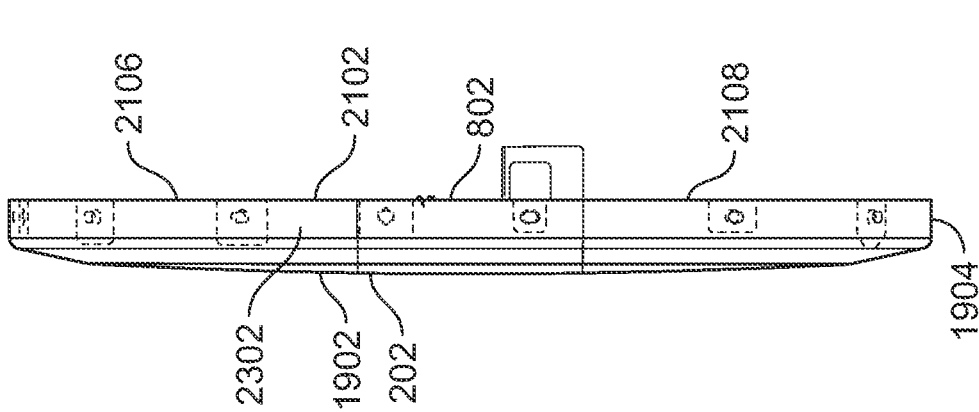
FIG. 23 is an isolated front view of the second end cap and the second liner of the pellet grill of FIGS. 1-11 with the second end cap and the second liner shown in phantom.

FIG. 23 is an isolated front view of the second end cap 202 and the second liner 802 of the pellet grill 100 of FIGS. 1-11 with the second end cap 202 and the second liner 802 shown in phantom. FIG. 24 is a first isolated perspective view of the second end cap 202 and the second liner 802 of the pellet grill 100 of FIGS. 1-11 with the second end cap 202 and the second liner 802 shown in phantom. FIG. 25 is a second isolated perspective view of the second end cap 202 and the second liner 802 of the pellet grill 100 of FIGS. 1-11 with the second end cap 202 and the second liner 802 shown in phantom.

As shown in FIGS. 23-25, the encircling wall 1904 of the second end cap 202 circumscribes the flanges 2104 of the second liner 802. The encircling wall 1904 of the second end cap 202 extends transversely from the sidewall 1902 of the second end cap 202 toward the sidewall 2102 of the second liner 802. The flanges 2104 of the second liner 802 extend transversely from the sidewall 2102 of the second liner 802 toward the sidewall 1902 of the second end cap 202. The sidewall 2102 of the second liner 802 is spaced apart from (e.g., spaced inwardly from) the sidewall 1902 of the second end cap 202, with the spacing between the sidewall 2102 of the second liner 802 and the sidewall 1902 of the second end cap 202 defining an example compartment 2302.

The compartment 2302 shown in FIGS. 23-25 differs from the above-described compartment 1602 shown in FIGS. 16-18 only in the second end cap 202 and the second liner 802 that define the compartment 2302 of FIGS. 23-25 are missing sidewall openings corresponding to the above-described opening 1206 formed in the sidewall 1202 of the first end cap 104 and the above-described opening 1406 formed in the sidewall 1402 of the first liner 702. In instances where another lighting module (e.g., in addition to or as an alternative to the lighting module 706) is to be included as part of the lighting system of the pellet grill 100, the second end cap 202 and the second liner 802 that define the compartment 2302 of FIGS. 23-25 can be modified to include sidewall openings corresponding to the above-described opening 1206 formed in the sidewall 1202 of the first end cap 104 and the above-described opening 1406 formed in the sidewall 1402 of the first liner 702.

Figure 26:
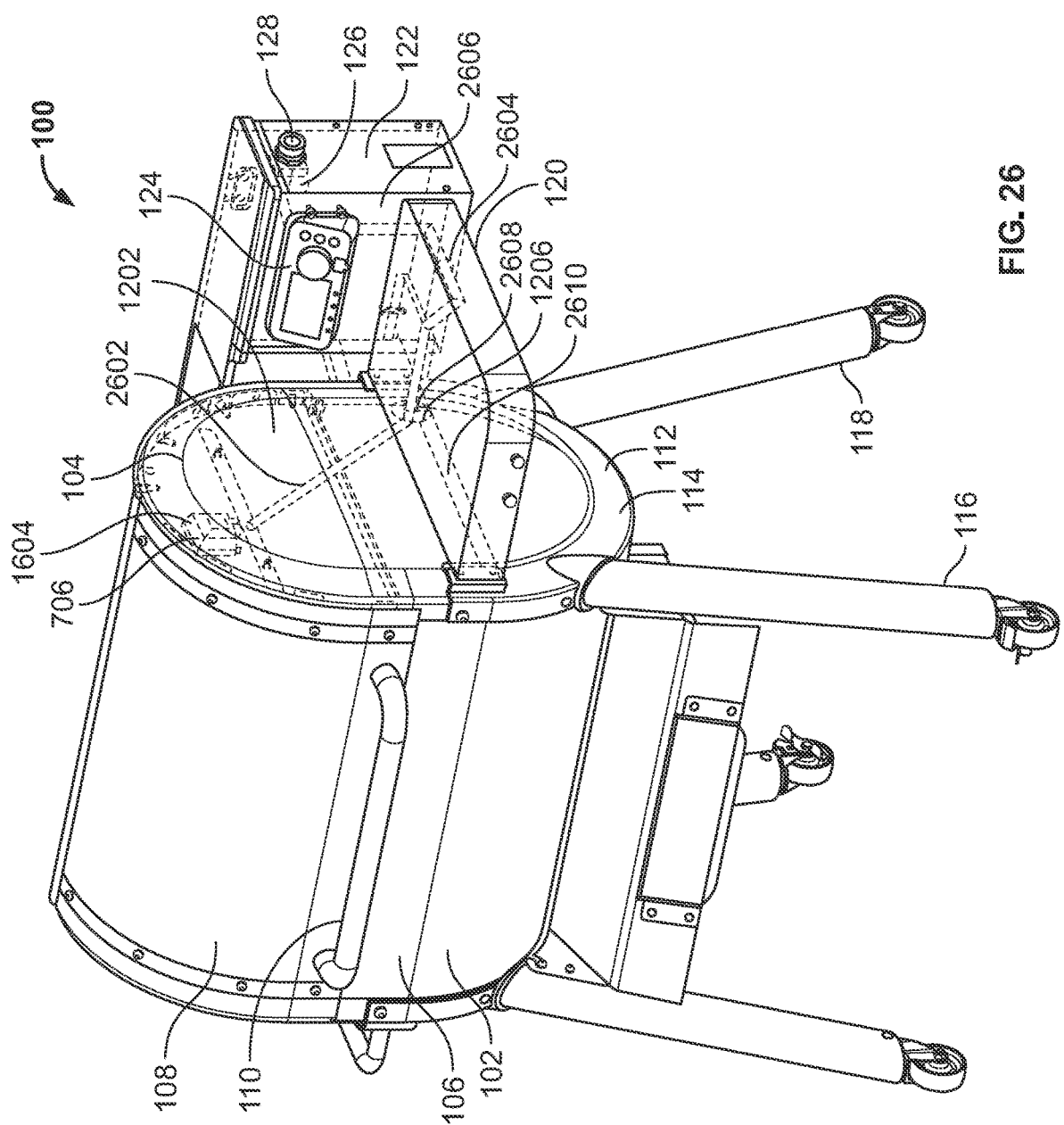
FIG. 26 is a perspective view of the pellet grill of FIGS. 1-11 with the first end cap, the side table, and the hopper of the pellet grill shown in phantom.

FIG. 26 is a perspective view of the pellet grill 100 of FIGS. 1-11 with the first end cap 104, the side table 120, and the hopper 122 of the pellet grill 100 shown in phantom. As shown in FIG. 26, the lighting system of the pellet grill 100 includes an example power cable 2602 (e.g., wiring) that extends along a route from the switch 126 to the lighting module 706 of the pellet grill 100. The power cable 2602 routes and/or delivers power from a power supply of the pellet grill 100 to the lighting module 706 of the pellet grill 100. In the illustrated example of FIG. 26, the power cable 2602 extends from the switch 126 through an interior portion of the hopper 122 to an example opening 2604 formed in an example front surface 2606 of the hopper 122. After passing through the opening 2604 formed in the front surface 2606 of the hopper 122, the power cable 2602 thereafter extends along an underside of the side table 120 to an example notch 2608 formed in an example vertically-oriented sidewall 2610 of the side table 120. As shown in FIG. 26, the notch 2608 formed in the sidewall 2610 of the side table 120 is aligned with the opening 1206 formed in the sidewall 1202 of the first end cap 104. After passing through the notch 2608 formed in the sidewall 2610 of the side table 120 as well as the opening 1206 formed in the sidewall 1202 of the first end cap 104, the power cable 2602 thereafter extends within the compartment 1602 (e.g., between the first end cap 104 and the first liner 702) to the lighting module 706 of the lighting system of the pellet grill 100.

In other examples, the power cable 2602 can be routed from the switch 126 to the lighting module 706 along a pathway that differs from that shown in FIG. 26 and described above. For example, the power cable 2602 can alternatively be routed along and/or through the outer wall 106 of the main body 102 of the pellet grill 100, particularly in instances where another lighting module (e.g., in addition to or as an alternative to the illustrated lighting module 706) is to be located in the compartment 2302 formed between the second end cap 202 and the second liner 802 of the pellet grill 100.

Figure 27:
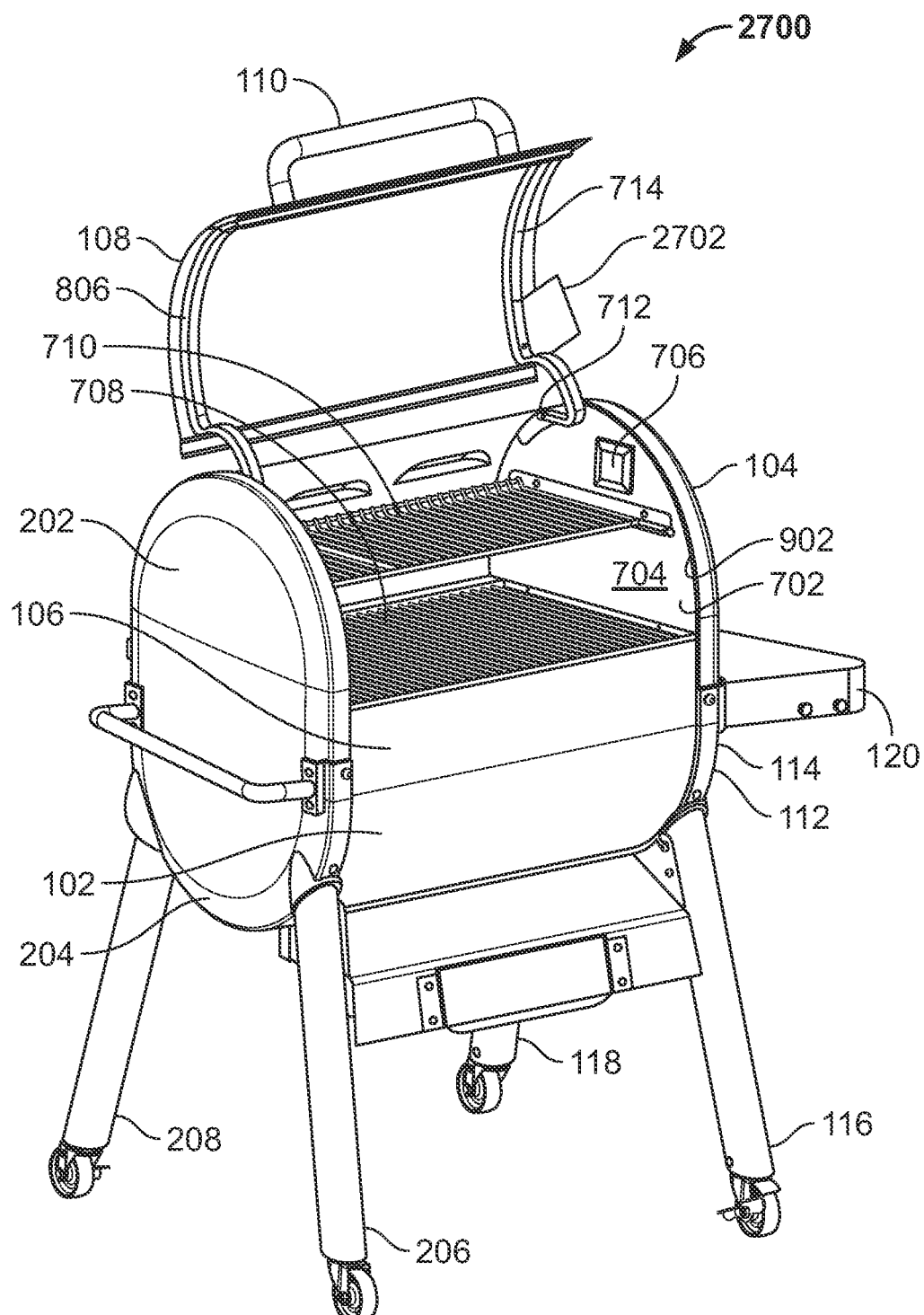
FIG. 27 is a perspective view of an alternative example pellet grill constructed in accordance with teachings of this disclosure, with the lid of the pellet grill in the open position.
Figure 29:
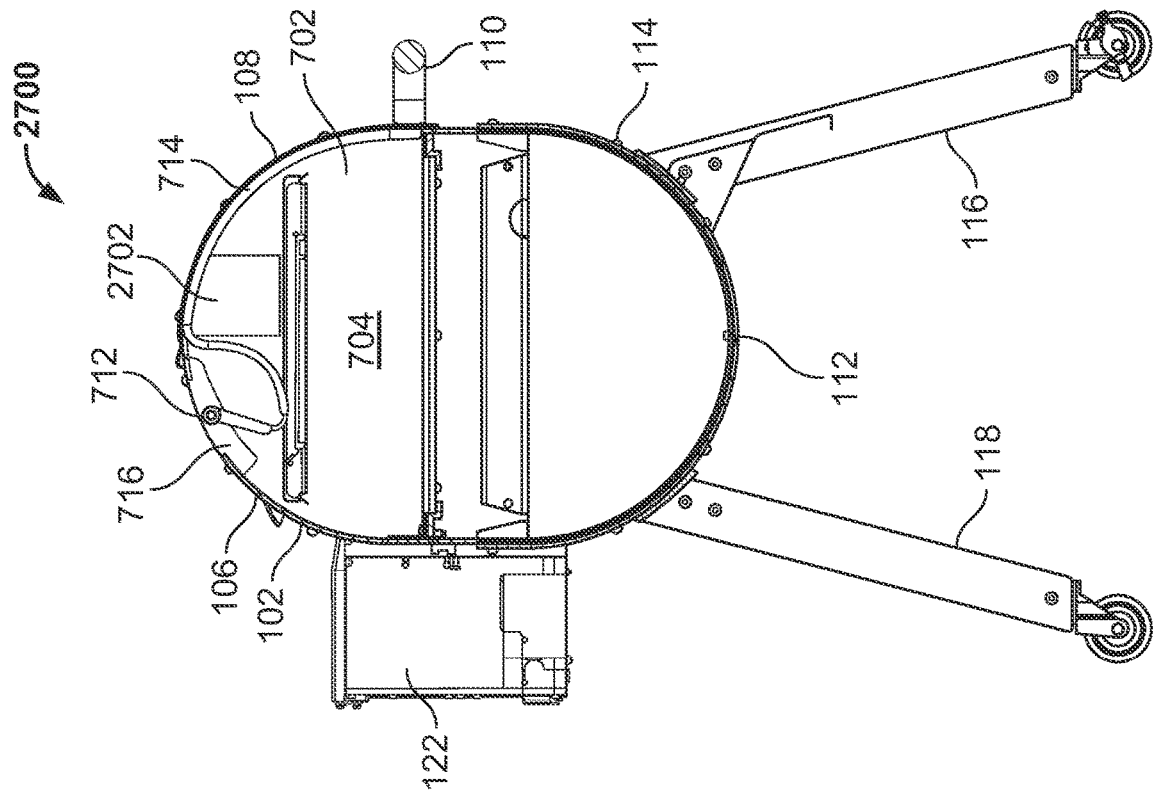
FIG. 29 is a cross-sectional view of the pellet grill of FIGS. 27 and 28 taken from the vantage point of section A-A of FIG. 3, with the lid of the pellet grill in the closed position.
Figure 28:
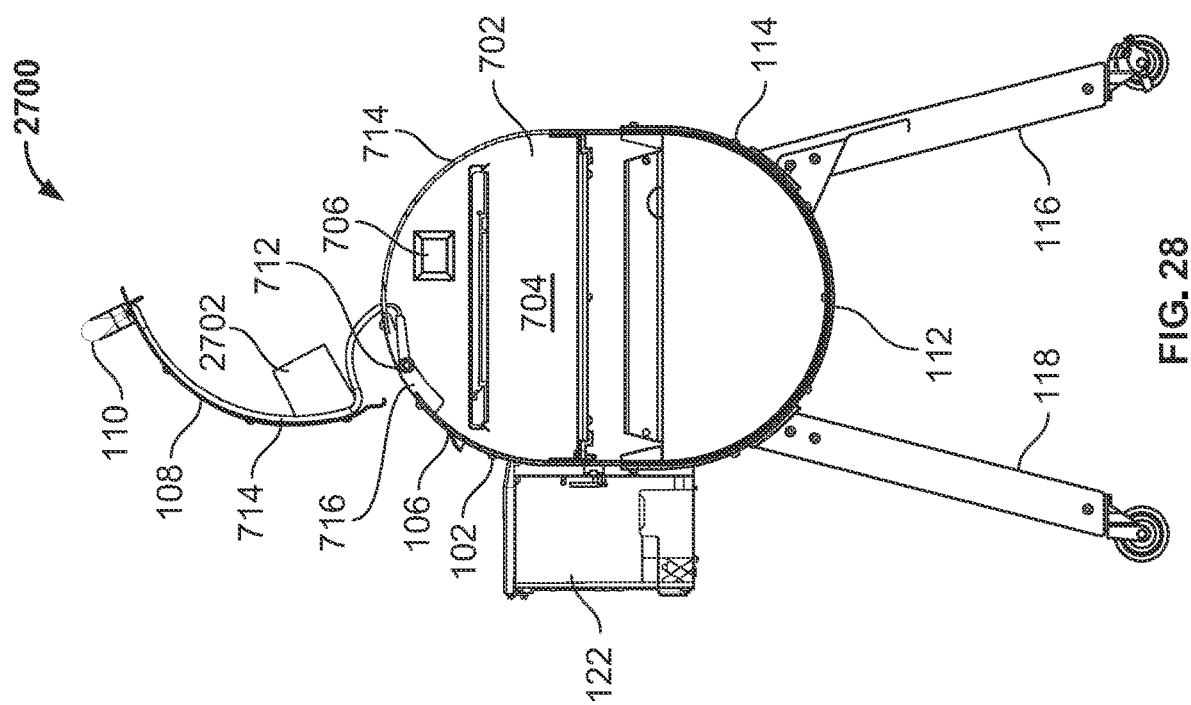
FIG. 28 is a cross-sectional view of the pellet grill of FIG. 27 taken from the vantage point of section A-A of FIG. 3, with the lid of the pellet grill in the open position.

FIG. 27 is a perspective view of an alternative example pellet grill 2700 constructed in accordance with teachings of this disclosure, with the lid 108 of the pellet grill 2700 in the open position. FIG. 28 is a cross-sectional view of the pellet grill 2700 of FIG. 27 taken from the vantage point of section A-A of FIG. 3, with the lid 108 of the pellet grill 2700 in the open position. FIG. 29 is a cross-sectional view of the pellet grill 2700 of FIGS. 27 and 28 taken from the vantage point of section A-A of FIG. 3, with the lid 108 of the pellet grill 2700 in the closed position. The pellet grill 2700 of FIGS. 27-29 is constructed in a manner that is substantially identical to the above-described construction of the pellet grill 100 of FIGS. 1-11 and 26, the only difference being that the pellet grill 2700 of FIGS. 27-29 additionally includes an example shield 2702 configured to prevent ash and/or other cooking byproducts present within the cooking chamber 704 from accumulating on and/or otherwise occluding the face of the cover 1606 of the lighting module 706.

In the illustrated example of FIGS. 27-29, the shield 2702 is configured as a plate and/or flange that is coupled to the hinge arm 714 of the first hinge 712 of the pellet grill 2700. In other examples, the shield 2702 can alternatively be coupled to the underside of the lid 108 of the pellet grill 2700. When the lid 108 of the pellet grill 2700 is in the open position shown in FIGS. 27 and 28, the shield 2702 does not cover, block, overlap, and/or otherwise obstruct the face of the cover 1606 of the lighting module 706, thereby advantageously enabling light to be projected from the lighting module 706 in an unobstructed manner. When the lid 108 of the pellet grill 2700 is in the closed position shown in FIG. 29, the shield 2702 covers, blocks, overlaps, and/or otherwise obstructs the cover 1606 of the lighting module 706, thereby advantageously preventing ash and/or other cooking byproducts present within the cooking chamber 704 from accumulating on and/or otherwise occluding the cover 1606 of the lighting module 706. In the illustrated example of FIGS. 27-29, the shield 2702 extends downwardly from the hinge arm 714 of the first hinge 712 of the pellet grill 2700 when the lid 108 of the pellet grill 2700 is in the closed position shown in FIG. 29. In other examples, the shield 2702 can alternatively extend in a different direction (e.g., upwardly, forwardly, rearwardly, etc.) from the hinge arm 714 of the first hinge 712 of the pellet grill 2700 when the lid 108 of the pellet grill is in the closed position shown in FIG. 29. In examples where another lighting module (e.g., in addition to or as an alternative to the illustrated lighting module 706) is to be located in the compartment 2302 formed between the second end cap 202 and the second liner 802 of the pellet grill 2700, another shield (e.g., in addition to or as an alternative to the illustrated shield 2702) can be coupled to and extend downward from the hinge arm 806 of the second hinge 804 of the pellet grill 2700.

Figure 30:
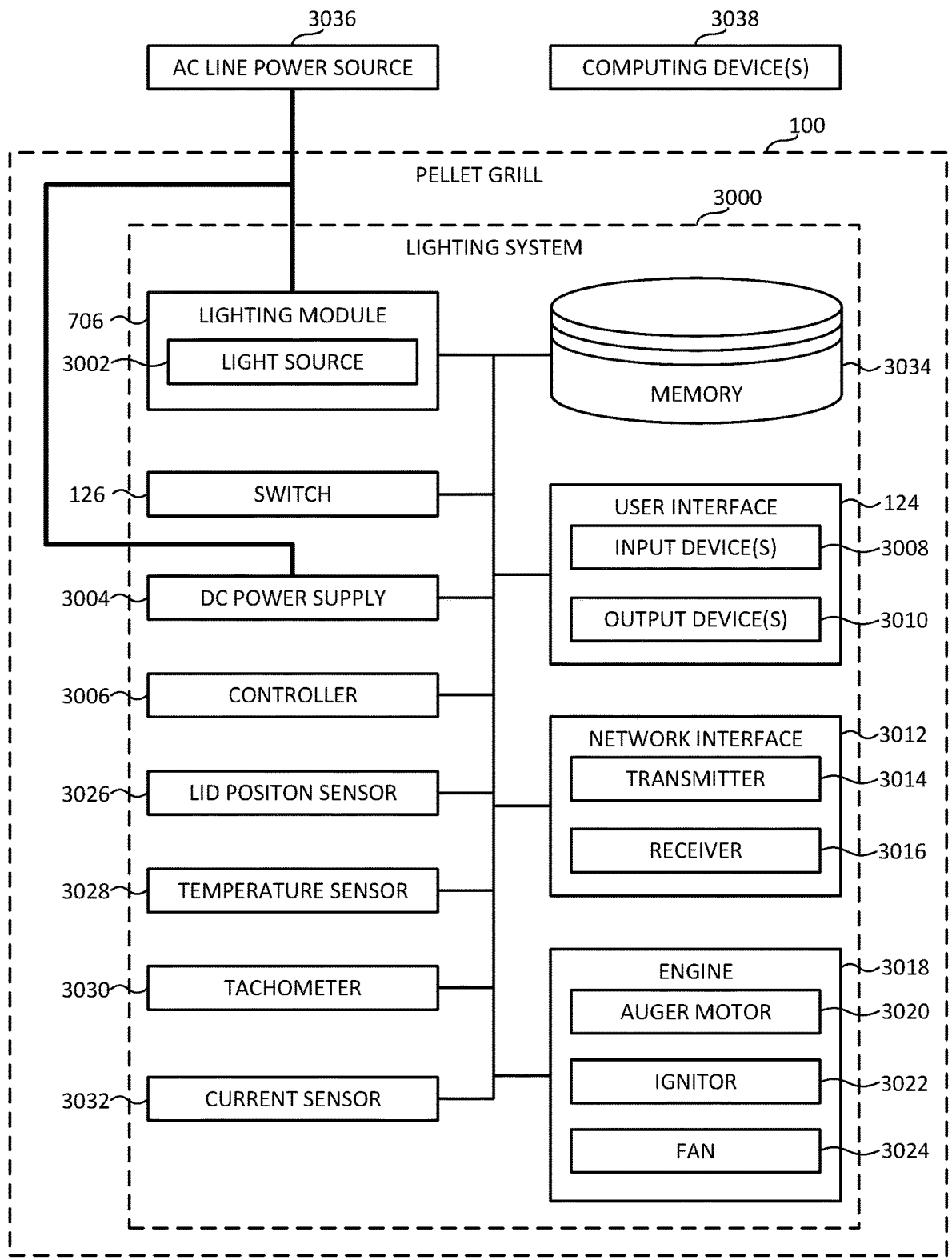
FIG. 30 is a block diagram of an example lighting system to be implemented in connection with the pellet grill of FIGS. 1-11 and 26, and/or to be implemented in connection with the pellet grill of FIGS. 27-29.

FIG. 30 is a block diagram of an example lighting system 3000 to be implemented in connection with the pellet grill 100 of FIGS. 1-11 and 26, and/or to be implemented in connection with the pellet grill 2700 of FIGS. 27-29. The lighting system 3000 of FIG. 30 includes the lighting module 706 (e.g., including an example light source 3002), the switch 126, an example DC power supply 3004, an example controller 3006, the user interface 124 (e.g., including example input device(s) 3008 and example output device(s) 3010), an example network interface 3012 (e.g., including an example transmitter 3014 and an example receiver 3016), an example engine 3018 (e.g., including an example auger motor 3020, an example ignitor 3022, and an example fan 3024), an example lid position sensor 3026, an example temperature sensor 3028, an example tachometer 3030, an example current sensor 3032, and an example memory 3034. In other examples, one or more of the aforementioned components of the lighting system 3000 of FIG. 30 can be omitted. In still other examples, the lighting system 3000 of FIG. 30 can include one or more other component(s) in addition to, or in lieu of the aforementioned components of the lighting system 3000 of FIG. 30.

The lighting module 706 of FIG. 30 is configured to project light into and/or otherwise illuminate the interior of the cooking chamber 704 of the pellet grill 100. The lighting module 706 houses, carries, and/or contains the light source 3002 of the lighting system 3000. In some examples, the light source 3002 of FIG. 30 is implemented via one or more halogen bulb(s). In other examples, the light source 3002 of FIG. 30 can instead be implemented by an alternative light source, such as one or more fluorescent bulb(s), or one or more light-emitting diode(s) (LED(s)). In some examples, the light source 3002 of the lighting system 3000 is powered via AC power received from an example AC line power source 3036 (e.g., a wall outlet) to which the pellet grill 100 is connected. In other examples, the light source 3002 of the lighting system 3000 is instead powered via DC power supplied by the DC power supply 3004 of the pellet grill 100, as further described below.

The switch 126 of FIG. 30 is operable by a user of the pellet grill 100 to control the activation and deactivation of the light source 3002 of the lighting system 3000 of the pellet grill 100. As described above in connection with FIGS. 1-11, the switch 126 includes a button 128 that is actuatable by a user of the pellet grill 100 to selectively cause the switch 126 to close a circuit of the lighting system 3000 of the pellet grill 100. When the switch 126 closes the circuit (e.g., in response to a user actuating the button 128), power is transmitted (e.g., AC power from the AC line power source 3036, or DC power from the DC power supply 3004) to the light source 3002 of the lighting system 3000, thereby causing light to be generated by and/or projected from the light source 3002 and/or, more generally, from the lighting module 706 into the cooking chamber 704 of the pellet grill 100. When the switch 126 opens the circuit (e.g., in response to a user releasing the button 128, or actuating the button 128 a second time), power is no longer transmitted (e.g., AC power from the AC line power source 3036, or DC power from the DC power supply 3004) to the light source 3002 of the lighting system 3000, and light is therefore no longer generated by and/or projected from the light source 3002 and/or, more generally, from the lighting module 706 into the cooking chamber 704 of the pellet grill 100.

As described above in connection with FIGS. 1-11, the switch 126 can be configured as an on/off switch. In such examples, a user must press and/or actuate the button 128 of the switch 126 two successive times to cycle the switch 126 and/or the circuit from an OFF state (e.g., associated with a circuit of the switch 126 being open) to an ON state (e.g., associated with the circuit of the switch 126 being closed) and back to an OFF state. In other examples, the switch 126 of can instead be configured as a momentary switch. In such examples, a user must press and hold the button 128 of the switch 126 to transition the switch 126 and/or the circuit from an OFF state (e.g., associated with a circuit of the switch 126 being open) to an ON state (e.g., associated with the circuit of the switch 126 being closed). The user can thereafter release the button 128 of the switch 126 to transition the switch 126 and/or the circuit from the ON state back to the OFF state. Implementing the switch 126 as a momentary switch (e.g., as opposed to an on/off switch) can be advantageous with regard to preserving the remaining amount of energy associated with the power source, and/or preventing instances in which a user might otherwise inadvertently leave the switch 126 and/or, more generally, the lighting system 3000 of the pellet grill 100 in a powered (e.g., light generating) state.

The DC power supply 3004 of FIG. 30 receives AC power from the AC line power source 3036 (e.g., a wall outlet) to which the DC power supply 3004 and/or, more generally, the pellet grill 100 is electrically connected. The DC power supply 3004 converts AC power received from the AC line power source 3036 into DC power that can thereafter be supplied to one or more of the lighting module 706 (including the light source 3002), the switch 126, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, the current sensor 3032, and/or the memory 3034 of the lighting system 3000. In some examples, the distribution of DC power from the DC power supply 3004 to any of the aforementioned components of the lighting system 3000 can be controlled and/or managed by the switch 126, by the user interface 124, and/or by the controller 3006. In other examples, the DC power supply 3004 of FIG. 30 can alternatively be implemented by a battery (or a plurality of batteries) dedicated to powering the light source 3002 of the lighting module 706 of the lighting system 3000.

The controller 3006 of FIG. 30 can include any number of processors, microprocessors, controllers, microcontrollers, timers, counters, circuits, and/or other electrical components. Although the controller 3006 is shown in FIG. 30 as being a single controller (e.g., a single control board), in other examples the controller 3006 can be implemented as multiple, separate controllers (e.g., a first control board and a second control board) having configured to perform separate or redundant operations. In the illustrated example of FIG. 30, the controller 3006 is operatively coupled to (e.g., in electrical communication with) one or more of the lighting module 706 (including the light source 3002), the DC power supply 3004, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, the current sensor 3032, and/or the memory 3034 of the lighting system 3000.

In the illustrated example of FIG. 30, the controller 3006 controls and/or manages one or more operation(s) of the lighting module 706 (including the light source 3002), the switch 126, the user interface 124 (including the input device(s) 3008 and the output device(s) 3010), the network interface 3012 (including the transmitter 3014 and the receiver 3016), and/or the engine 3018 (including the auger motor 3020, the ignitor 3022, and the fan 3024). In some examples, the controller 3006 receives data, commands, and/or signals from, and/or transmits data, commands, and/or signals to, the switch 126, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, the current sensor 3032, and/or the memory 3034. Example operations performed by the controller 3006 are described below in connection with FIGS. 31-36.

The user interface 124 of FIG. 30 enables a user of the pellet grill 100 to interact with the controller 3006 of the lighting system 3000 of FIG. 30. The input device(s) 3008 of the user interface 124 permit(s) the user of the pellet grill 100 to enter data and/or commands into the controller 3006. For example, the input device(s) 3008 of the user interface 124 can permit the user of the pellet grill 100 to enter data and/or a command into the controller 3006 that causes the controller 3006 to activate (e.g., power on) or deactivate (e.g., power off) the light source 3002 of the lighting module 706 of FIG. 30. The input device(s) 3008 of the user interface 124 can be implemented, for example, by any number of buttons, switches, knobs, touchscreens, audio sensors, microphones, and/or cameras.

The output device(s) 3010 of the user interface 124 facilitate the presentation of data and/or information (e.g., data and/or information generated by the controller 3006) to the user of the pellet grill 100. For example, the output device(s) 3010 of the user interface 124 can facilitate the presentation of data and/or information notifying the user of the pellet grill 100 that the light source 3002 of the lighting module 706 of FIG. 30 is activated (e.g., powered on) or deactivated (e.g., powered off). The output device(s) 3010 of the user interface 124 can be implemented, for example, by any number of liquid crystal displays, touchscreens, light emitting diodes, speakers, and/or haptic output devices.

The network interface 3012 of FIG. 30 enables the controller 3006 and/or the memory 3034 of FIG. 30 to wirelessly receive data, commands, and/or signals from, and/or to wirelessly transmit data, commands, and/or signals to, one or more example computing device(s) 3038 (e.g., a cloud server, a smartphone, a tablet, a laptop computer, a personal computer, etc.) located remotely from the pellet grill 100. The transmitter 3014 of the network interface 3012 sends and/or transmits data, commands, and/or signals (e.g., data, commands, and/or signals generated by the controller 3006) to the remotely-located computing device(s) 3038. For example, the transmitter 3014 of the network interface 3012 can send and/or transmit data, commands, and/or signals to the remotely-located computing device(s) 3038, wherein the transmitted data, commands, and/or signals can be presented via the remotely-located computing device(s) 3038 to notify the user(s) of the remotely-located computing device(s) 3038 that the light source 3002 of the lighting module 706 of FIG. 30 is activated (e.g., powered on) or deactivated (e.g., powered off). The transmitter 3014 of the network interface 3012 can be implemented, for example, by any number of radio transmitters and/or radio transceivers. Data, commands, and/or signals transmitted by the transmitter 3014 of FIG. 30 may be of any quantity, type, form and/or format, and may be stored in a computer-readable storage medium such as the memory 3034 of FIG. 30.

The receiver 3016 of the network interface 3012 collects, acquires, and/or receives data, commands, and/or signals transmitted from the remotely-located computing device(s) 3038 to the pellet grill 100. In some examples, the data, commands, and/or signals received via the receiver 3016 of the network interface 3012 can thereafter be processed via the controller 3006 of FIG. 30, and/or be stored via the memory 3034 of FIG. 30. For example, the receiver 3016 of the network interface 3012 can collect, acquire, and/or receive data, commands, and/or signals transmitted from the remotely-located computing device(s) 3038, wherein the received data, commands, and/or signals cause(s) the controller 3006 to activate (e.g., power on) or deactivate (e.g., power off) the light source 3002 of the lighting module 706 of FIG. 30. The receiver 3016 of the network interface 3012 can be implemented, for example, by any number of radio receivers and/or radio transceivers. Data, commands, and/or signals received by the receiver 3016 of FIG. 30 may be of any quantity, type, form and/or format, and may be stored in a computer-readable storage medium such as the memory 3034 of FIG. 30.

The engine 3018 of FIG. 30 facilitates the performance of one or more cooking operations within the cooking chamber 704 of the pellet grill 100. The auger motor 3020 of the engine 3018 controls and/or facilitates the delivery of pellet fuel from the hopper 122 of the pellet grill 100 into a burn pot of the pellet grill 100. In some examples, the auger motor 3020 of the engine 3018 is implemented as a DC-powered, variable speed motor. The ignitor 3022 of the engine 3018 controls and/or facilitates the ignition of pellet fuel located within the burn pot of the pellet grill 100. In some examples, the ignitor 3022 of the engine 3018 is implemented as a DC-powered glow plug. The fan 3024 of the engine 3018 controls and/or facilitates delivery of an airflow to the pellet fuel located within the burn pot of the pellet grill 100 to control the rate of combustion of such pellet fuel. In some examples, the fan 3024 of the engine 3018 is implemented as a DC-powered, variable speed fan.

The lid position sensor 3026 of FIG. 30 senses, measures and/or detects a position (e.g., an open position and/or a closed position) of the lid 108 of the pellet grill 100. In some examples, the lid position sensor 3026 can be implemented by and/or as a proximity sensor (e.g., a proximity switch) having one or more component(s) coupled to the lid 108 and/or the main body 102 of the pellet grill 100. In other examples, the lid position sensor 3026 can alternatively be implemented by a limit sensor (e.g., a limit switch), by an optical sensor (e.g., an optical switch), or by a Bowden cable connected switch. Data and/or signals sensed, measured, and/or detected by the lid position sensor 3026 of FIG. 30 may be of any quantity, type, form and/or format, and may be stored in a computer-readable storage medium such as the memory 3034 of FIG. 30.

The temperature sensor 3028 of FIG. 30 senses, measures and/or detects the temperature of the cooking chamber 704 of the pellet grill 100. In some examples, the temperature sensor 3028 can be implemented by and/or as a thermocouple positioned in and/or extending into the cooking chamber 704 of the pellet grill 100. Data and/or signals sensed, measured, and/or detected by the temperature sensor 3028 of FIG. 30 may be of any quantity, type, form and/or format, and may be stored in a computer-readable storage medium such as the memory 3034 of FIG. 30.

The tachometer 3030 of FIG. 30 senses, measures and/or detects rotations and/or the rotational speed of the fan 3024 of the engine 3018 of the pellet grill 100. Data and/or signals sensed, measured, and/or detected by the tachometer 3030 of FIG. 30 may be of any quantity, type, form and/or format, and may be stored in a computer-readable storage medium such as the memory 3034 of FIG. 30.

The current sensor 3032 of FIG. 30 senses, measures and/or detects an electrical current delivered to and/or drawn by the auger motor, 3020, the ignitor 3022, and/or the fan 3024 of the engine 3018 of the pellet grill 100. Data and/or signals sensed, measured, and/or detected by the current sensor 3032 of FIG. 30 may be of any quantity, type, form and/or format, and may be stored in a computer-readable storage medium such as the memory 3034 of FIG. 30.

The memory 3034 of FIG. 30 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 3034 of FIG. 30 can be stored in any file and/or data structure format, organization scheme, and/or arrangement.

The memory 3034 stores data sensed, measured, detected, generated, transmitted, and/or received by the switch 126, the controller 3006, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, and/or the current sensor 3032 of the lighting system of FIG. 30. The memory 3034 also stores instructions (e.g., computer-readable instructions) and associated data corresponding to one or more lighting control protocol(s), process(es), program(s), sequence(s), and/or method(s) described below in connection with FIGS. 31-36. The memory 3034 of FIG. 30 is accessible to one or more of the controller 3006, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, and/or the current sensor 3032 of the lighting system of FIG. 30.

The lighting system 3000 of FIG. 30 implements, manages, and/or controls one or more lighting control protocol(s) and/or process(es). In this regard, the lighting system 3000 of FIG. 30 can implement, manage, and/or control a first lighting control protocol and/or process that is based on the operational state of the switch 126 of the lighting system 3000 of FIG. 30. For example, the switch 126 and/or the controller 3006 of the lighting system 3000 of FIG. 30 is/are configured to detect whether the switch 126 is in an ON state (e.g., associated with a circuit of the switch 126 being closed) or an OFF state (e.g., associated with the circuit of the switch 126 being open). In response to detecting that the switch 126 is in the ON state, the switch 126 and/or the controller 3006 cause(s) the light source 3002 of the lighting module 706 of FIG. 30 to be activated (e.g., powered on). In response to detecting that the switch 126 is in the OFF state, the switch 126 and/or the controller 3006 cause(s) the light source 3002 of the lighting module 706 of FIG. 30 to be deactivated (e.g., powered off).

The lighting system 3000 of FIG. 30 can additionally or alternatively implement, manage, and/or control a second lighting control protocol and/or process that is based on data, commands, and/or signals received (e.g., via the input device(s) 3008 of the user interface 124, and/or via the receiver 3016 of the network interface 3012) at the controller 3006 of the lighting system 3000 of FIG. 30. For example, the controller 3006 of the lighting system 3000 of FIG. 30 is configured to detect whether data, commands, and/or signals received (e.g., via the input device(s) 3008 of the user interface 124, and/or via the receiver 3016 of the network interface 3012) at the controller 3006 indicate a request for activation of the light source 3002 of the lighting module 706 of FIG. 30. In response to detecting that data, commands, and/or signals received at the controller 3006 indicate a request for activation of the light source 3002 of the lighting module 706, the controller 3006 generates one or more instruction(s) and or command(s) causing the light source 3002 of the lighting module 706 of FIG. 30 to be activated (e.g., powered on). The controller 3006 is further configured to detect whether data, commands, and/or signals received (e.g., via the input device(s) 3008 of the user interface 124, and/or via the receiver 3016 of the network interface 3012) at the controller 3006 indicate a request for deactivation of the light source 3002 of the lighting module 706 of FIG. 30. In response to detecting that data, commands, and/or signals received at the controller 3006 indicate a request for deactivation of the light source 3002 of the lighting module 706, the controller 3006 generates one or more instruction(s) and or command(s) causing the light source 3002 of the lighting module 706 of FIG. 30 to be deactivated (e.g., powered off).

The lighting system 3000 of FIG. 30 can additionally or alternatively implement, manage, and/or control a third lighting control protocol and/or process that is based on data and/or signals sensed, measured, and/or detected by the lid position sensor 3026 of the lighting system 3000 of FIG. 30. For example, the controller 3006 of the lighting system 3000 of FIG. 30 is configured to detect, based on data that is sensed and/or measured by the lid position sensor 3026, a lid opening movement (e.g., movement of the lid 108 of the pellet grill 100 from a closed position to an open position). In response to detecting the lid opening movement, the controller 3006 generates one or more instruction(s) and or command(s) causing the light source 3002 of the lighting module 706 of FIG. 30 to be activated (e.g., powered on). The controller 3006 is further configured to detect, based on data that is sensed and/or measured by the lid position sensor 3026, a lid closing movement (e.g., movement of the lid 108 of the pellet grill 100 from an open position to a closed position). In response to detecting the lid closing movement, the controller 3006 generates one or more instruction(s) and or command(s) causing the light source 3002 of the lighting module 706 of FIG. 30 to be deactivated (e.g., powered off).

The lighting system 3000 of FIG. 30 can additionally or alternatively implement, manage, and/or control a fourth lighting control protocol and/or process that is based on data and/or signals sensed, measured, and/or detected by the temperature sensor 3028 of the lighting system 3000 of FIG. 30. For example, the controller 3006 of the lighting system 3000 of FIG. 30 is configured to detect, based on data that is sensed and/or measured by the temperature sensor 3028, a threshold decrease (e.g., a rapid decline) in the temperature of the cooking chamber 704 of the pellet grill 100 relative to a temperature setpoint associated with the cooking chamber 704. In some examples, the threshold decrease in the temperature of the cooking chamber 704 is caused by and/or attributed to the lid 108 of the pellet grill being moved from a closed position into an open position. In response to detecting the threshold decrease in the temperature of the cooking chamber 704, the controller 3006 generates one or more instruction(s) and or command(s) causing the light source 3002 of the lighting module 706 of FIG. 30 to be activated (e.g., powered on). The controller 3006 is further configured to detect, based on data that is sensed and/or measured by the temperature sensor 3028, an initial recovery in the temperature of the cooking chamber 704 of the pellet grill 100 toward the temperature setpoint subsequent to the above-described detection of the threshold decrease in the temperature of the cooking chamber 704. In some examples, the initial recovery in the temperature of the cooking chamber 704 is caused by and/or attributed to the lid 108 of the pellet grill being moved from an open position into a closed position. In response to detecting the initial recovery in the temperature of the cooking chamber 704, the controller 3006 generates one or more instruction(s) and or command(s) causing the light source 3002 of the lighting module 706 of FIG. 30 to be deactivated (e.g., powered off).

The lighting system 3000 of FIG. 30 can additionally or alternatively implement, manage, and/or control a fifth lighting control protocol and/or process that is based on data and/or signals sensed, measured, and/or detected by the tachometer 3030 of the lighting system 3000 of FIG. 30. For example, the controller 3006 of the lighting system 3000 of FIG. 30 is configured to detect, based on data that is sensed and/or measured by the tachometer 3030, a threshold increase in the speed of the fan 3024 of the pellet grill 100.

In some examples, the threshold increase in the speed of the fan 3024 is caused by and/or attributed to the lid 108 of the pellet grill being moved from a closed position into an open position. In response to detecting the threshold increase in the speed of the fan 3024, the controller 3006 generates one or more instruction(s) and or command(s) causing the light source 3002 of the lighting module 706 of FIG. 30 to be activated (e.g., powered on). The controller 3006 is further configured to detect, based on data that is sensed and/or measured by the tachometer 3030, a threshold decrease in the speed of the fan 3024 of the pellet grill 100 subsequent to the above-described detection of the threshold increase of the speed of the fan 3024. In some examples, the threshold decrease in the speed of the fan 3024 is caused by and/or attributed to the lid 108 of the pellet grill being moved from an open position into a closed position. In response to detecting the threshold decrease in the speed of the fan 3024, the controller 3006 generates one or more instruction(s) and or command(s) causing the light source 3002 of the lighting module 706 of FIG. 30 to be deactivated (e.g., powered off).

The lighting system 3000 of FIG. 30 can additionally or alternatively implement, manage, and/or control a sixth lighting control protocol and/or process that is based on data and/or signals sensed, measured, and/or detected by the current sensor 3032 of FIG. 30. In some examples, the sixth lighting control process and/or protocol can be implemented as lighting activation subroutine of one or more of the first, second, third, fourth, and/or fifth lighting control protocols and/or processes described above. For example, the controller 3006 of the lighting system 3000 of FIG. 30 is configured to detect, based on data that is sensed and/or measured by the current sensor 3032, whether the ignitor 3022 of the pellet grill 100 is in an ON state (e.g., associated with current being delivered to and/or drawn by the ignitor 3022) or an OFF state (e.g., associated with current not being delivered to and/or drawn by the ignitor 3022). In response to detecting that the ignitor 3022 is in the ON state, the controller 3006 generates one or more instruction(s) and or command(s) that prevent(s) the light source 3002 of the lighting module 706 of FIG. 30 from being activated (e.g., from being powered on). In response to detecting that the ignitor 3022 is in the OFF state, the controller 3006 generates one or more instruction(s) and or command(s) that cause(s) the light source 3002 of the lighting module 706 of FIG. 30 to be activated (e.g., powered on). The lighting system 3000 of FIG. 30 accordingly prevents the light source 3002 of the lighting module 706 from being activated while the ignitor 3022 of the pellet grill 100 is activated, and enables the light source 3002 of the lighting module 706 to be activated while the ignitor 3022 of the pellet grill 100 is deactivated.

While an example manner of implementing the lighting system 3000 is illustrated in FIG. 30, one or more of the components, elements and/or devices illustrated in FIG. 30 may be combined, divided, re-arranged, omitted, eliminated and/or implemented in any other way. Further, the lighting module 706 (including the light source 3002), the switch 126, the DC power supply 3004, the controller 3006, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, the current sensor 3032, the memory 3034, and/or, more generally, the lighting system 3000 of FIG. 30 may be implemented by hardware, software, firmware and/or any combination of hardware, software and/or firmware. Thus, for example, any of the lighting module 706 (including the light source 3002), the switch 126, the DC power supply 3004, the controller 3006, the user interface 124 (including the input device(s) 3008 and the output device(s) 3010), the network interface 3012 (including the transmitter 3014 and the receiver 3016), the engine 3018 (including the auger motor 3020, the ignitor 3022, and the fan 3024), the lid position sensor 3026, the temperature sensor 3028, the tachometer 3030, the current sensor 3032, and/or the memory 3034 could be implemented by one or more analog or digital circuit(s), logic circuit(s), programmable processor(s), programmable controller(s), digital signal processor(s), application specific integrated circuit(s), programmable logic device(s), and/or field programmable logic device(s). When reading any of the apparatus or system claims of this patent to cover a purely software and/or firmware implementation, at least one of the controller 3006 and/or the memory 3034 is/are hereby expressly defined to include a non-transitory computer readable storage device or storage disk such as a memory, a digital versatile disk, a compact disk, a Blu-ray disk, etc. including software and/or firmware. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine-readable instructions, hardware implemented state machines, and/or any combination thereof for implementing the lighting system 3000 of FIG. 30 are shown in FIGS. 31-36. The machine-readable instructions may be one or more executable program(s) or portion(s) of executable program(s) for execution by one or more processor(s) and/or controller(s). The program(s) may be embodied in software stored on a non-transitory computer readable storage medium such as a hard drive, a flash drive, or a memory associated with the processor(s) and/or controller(s), but the entire program(s) and/or parts thereof could alternatively be executed by a device other than the processor(s) and/or controller(s) and/or embodied in firmware or dedicated hardware. Further, although the example program(s) is/are described with reference to the flowcharts illustrated in FIGS. 31-36, many other methods of implementing the lighting system 3000 of FIG. 30 may alternatively be used. For example, the order of execution of the blocks may be changed, and/or some of the blocks described may be changed, eliminated, or combined. Additionally, or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or another machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 31-36 may be implemented using executable instructions (e.g., computer and/or machine-readable instructions) stored on a non-transitory computer and/or machine-readable medium such as a hard disk drive, a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B.

Figure 31:
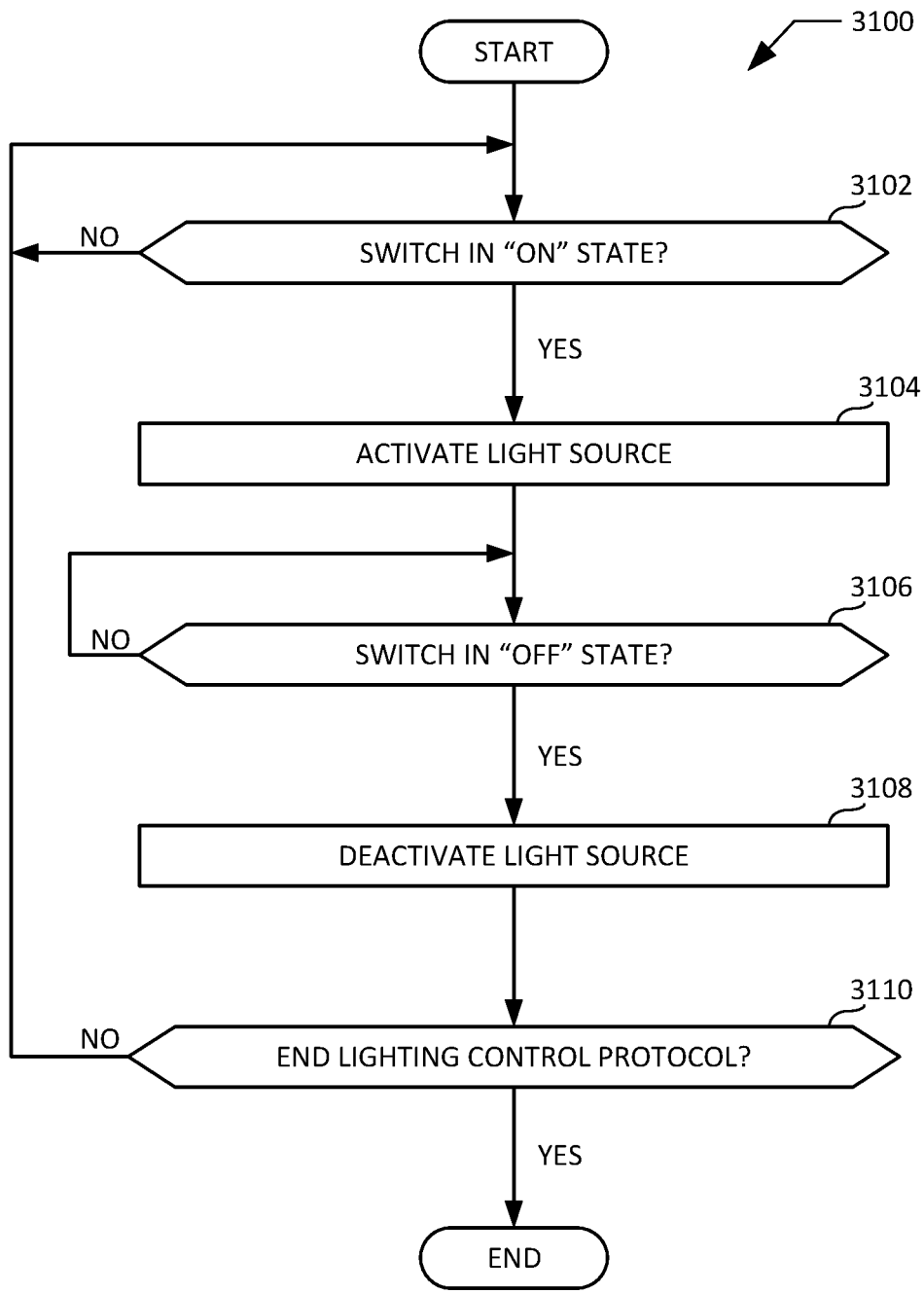
FIG. 31 is a flowchart representative of an example program for implementing a first lighting control protocol and/or process via the lighting system of FIG. 30.

FIG. 31 is a flowchart representative of an example program 3100 for implementing a first lighting control protocol and/or process via the lighting system 3000 of FIG. 30. The program 3100 of FIG. 31 begins at Block 3102 with the switch 126 and/or the controller 3006 of the lighting system 3000 of FIG. 30 determining whether the switch 126 is in an ON state (e.g., associated with a circuit of the switch 126 being closed). If the switch 126 and/or the controller 3006 determine(s) at Block 3102 that the switch 126 is not in an ON state, control of the program 3100 of FIG. 31 remains at Block 3102. If the switch 126 and/or the controller 3006 instead determine(s) at Block 3102 that the switch 126 is in an ON state, control of the program 3100 of FIG. 31 proceeds to Block 3104.

At Block 3104, the switch 126 and/or the controller 3006 cause(s) the light source 3002 of the lighting module 706 of FIG. 30 to be activated (e.g., powered on). Following Block 3104, control of the program 3100 of FIG. 31 proceeds to Block 3106.

At Block 3106, the switch 126 and/or the controller 3006 determine(s) whether the switch 126 is in an OFF state (e.g., associated with a circuit of the switch 126 being open). If the switch 126 and/or the controller 3006 determine(s) at Block 3106 that the switch 126 is not in an OFF state, control of the program 3100 of FIG. 31 remains at Block 3106. If the switch 126 and/or the controller 3006 instead determine(s) at Block 3106 that the switch 126 is in an OFF state, the control of program 3100 of FIG. 31 proceeds to Block 3108.

At Block 3108, the switch 126 and/or the controller 3006 cause(s) the light source 3002 of the lighting module 706 of FIG. 30 to be deactivated (e.g., powered off). Following Block 3108, control of the program 3100 of FIG. 31 proceeds to Block 3110.

At Block 3110, the controller 3006 determines (e.g., based on data, commands, and/or signals received via the input device(s) 3008 of the user interface 124, and/or received via the receiver 3016 of the network interface 3012) whether the lighting control protocol represented by the program 3100 of FIG. 31 is to end (e.g., cease performance, operation, and/or execution). If the controller 3006 determines at Block 3110 that the lighting control protocol represented by the program 3100 of FIG. 31 is not to end, control of the program 3100 of FIG. 31 returns to Block 3102. If the controller 3006 instead determines at Block 3110 that the lighting control protocol represented by the program 3100 of FIG. 31 is to end, the program 3100 of FIG. 31 ends.

Figure 32:
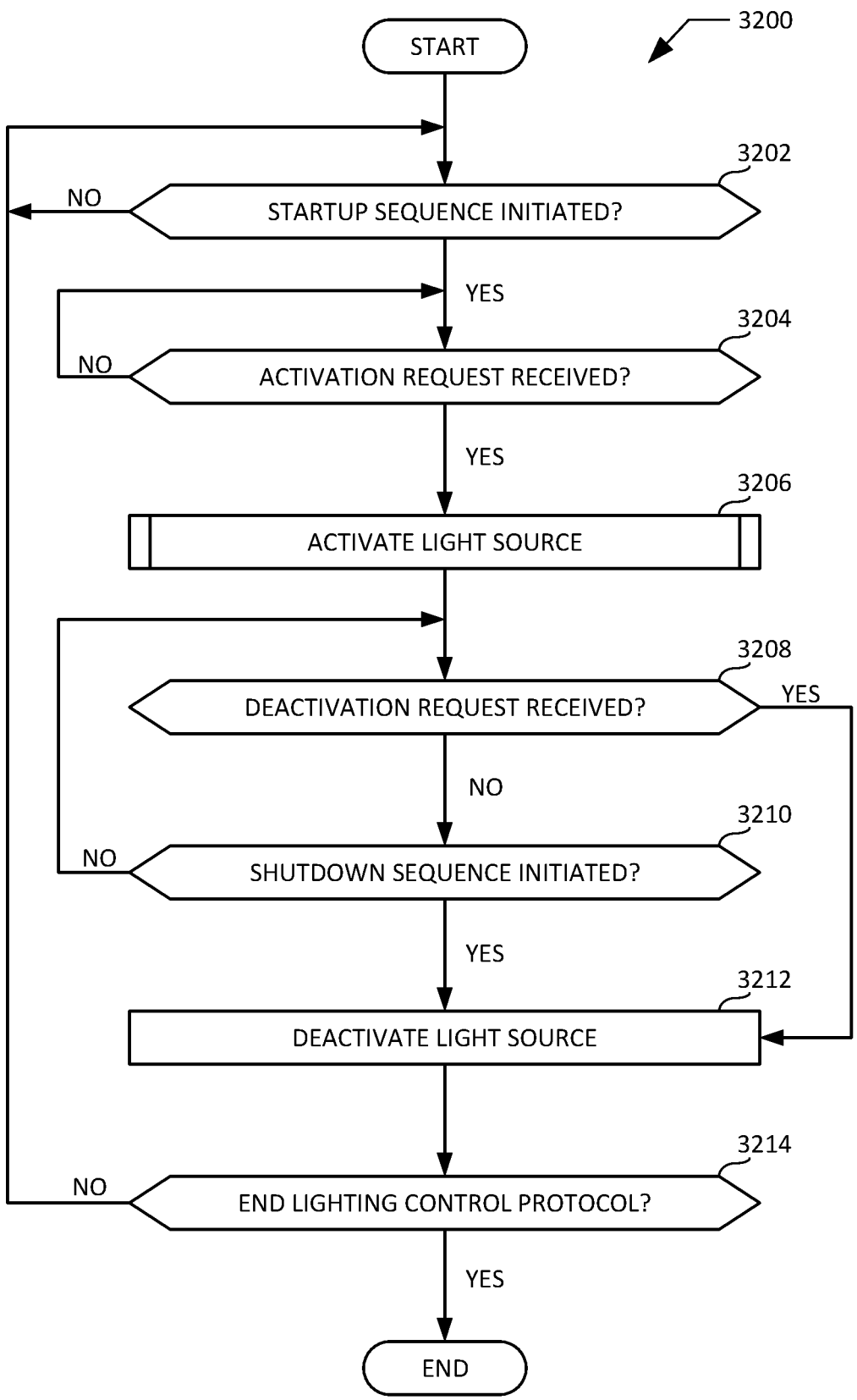
FIG. 32 is a flowchart representative of an example program for implementing a second lighting control protocol and/or process via the lighting system of FIG. 30.

FIG. 32 is a flowchart representative of an example program 3200 for implementing a second lighting control protocol and/or process via the lighting system 3000 of FIG. 30. The program 3200 of FIG. 32 begins at Block 3202 with the controller 3006 of the lighting system 3000 of FIG. 30 determining whether a startup sequence of the pellet grill 100 (e.g., a sequence that powers on the pellet grill 100 and/or that causes the ignitor 3022 of the pellet grill 100 to be in an ON state) has been initiated. If the controller 3006 determines at Block 3202 that a startup sequence of the pellet grill 100 has not been initiated, control of the program 3200 of FIG. 32 remains at Block 3202. If the controller 3006 instead determines at Block 3202 that a startup sequence of the pellet grill 100 has been initiated, control of the program 3200 of FIG. 32 proceeds to Block 3204.

At Block 3204, the controller 3006 determines whether data, commands, and/or signals received (e.g., via the input device(s) 3008 of the user interface 124, and/or via the receiver 3016 of the network interface 3012) at the controller 3006 indicate a request for activation of the light source 3002 of the lighting module 706 of FIG. 30. If the controller 3006 determines at Block 3204 that data, commands, and/or signals received at the controller 3006 do not indicate a request for activation of the light source 3002 of the lighting module 706, control of the program 3200 of FIG. 32 remains at Block 3204. If the controller 3006 instead determines at Block 3204 that data, commands, and/or signals received at the controller 3006 do indicate a request for activation of the light source 3002 of the lighting module 706, control of the program 3200 of FIG. 32 proceeds to Block 3206.

At Block 3206, the controller 3006 cause(s) the light source 3002 of the lighting module 706 of FIG. 30 to be activated (e.g., powered on). A subroutine that can optionally be performed in connection with the performance of Block 3206 of the program 3200 of FIG. 32 is described below in connection with FIG. 36. Following Block 3206, control of the program 3200 of FIG. 32 proceeds to Block 3208.

At Block 3208, the controller 3006 determines whether data, commands, and/or signals received (e.g., via the input device(s) 3008 of the user interface 124, and/or via the receiver 3016 of the network interface 3012) at the controller 3006 indicate a request for deactivation of the light source 3002 of the lighting module 706 of FIG. 30. If the controller 3006 determines at Block 3208 that data, commands, and/or signals received at the controller 3006 do not indicate a request for deactivation of the light source 3002 of the lighting module 706, control of the program 3200 of FIG. 32 proceeds to Block 3210. If the controller 3006 instead determines at Block 3208 that data, commands, and/or signals received at the controller 3006 do indicate a request for deactivation of the light source 3002 of the lighting module 706, control of the program 3200 of FIG. 32 proceeds to Block 3212.

At Block 3210, the controller 3006 determines whether a shutdown sequence of the pellet grill 100 (e.g., a sequence that causes the auger motor 3020, the ignitor 3022, the fan 3024, and/or, more generally, the pellet grill 100 to be shut down and/or powered off) has been initiated. If the controller 3006 determines at Block 3210 that a shutdown sequence of the pellet grill 100 has not been initiated, control of the program 3200 of FIG. 32 returns to Block 3208. If the controller 3006 instead determines at Block 3210 that a shutdown sequence of the pellet grill 100 has been initiated, control of the program 3200 of FIG. 32 proceeds to Block 3212.

At Block 3212, the controller 3006 cause(s) the light source 3002 of the lighting module 706 of FIG. 30 to be deactivated (e.g., powered off). Following Block 3212, control of the program 3200 of FIG. 32 proceeds to Block 3214.

At Block 3214, the controller 3006 determines (e.g., based on data, commands, and/or signals received via the input device(s) 3008 of the user interface 124, and/or received via the receiver 3016 of the network interface 3012) whether the lighting control protocol represented by the program 3200 of FIG. 32 is to end (e.g., cease performance, operation, and/or execution). If the controller 3006 determines at Block 3214 that the lighting control protocol represented by the program 3200 of FIG. 32 is not to end, control of the program 3200 of FIG. 32 returns to Block 3202. If the controller 3006 instead determines at Block 3214 that the lighting control protocol represented by the program 3200 of FIG. 32 is to end, the program 3200 of FIG. 32 ends.

In other examples, one or more of the above-described operations of the program 3200 of FIG. 32 can be omitted. For example, the program 3200 of FIG. 32 can alternatively be implemented in a manner that omits the above-described operations associated with Block 3202 and/or Block 3210 of the program 3200 of FIG. 32.

Figure 33:
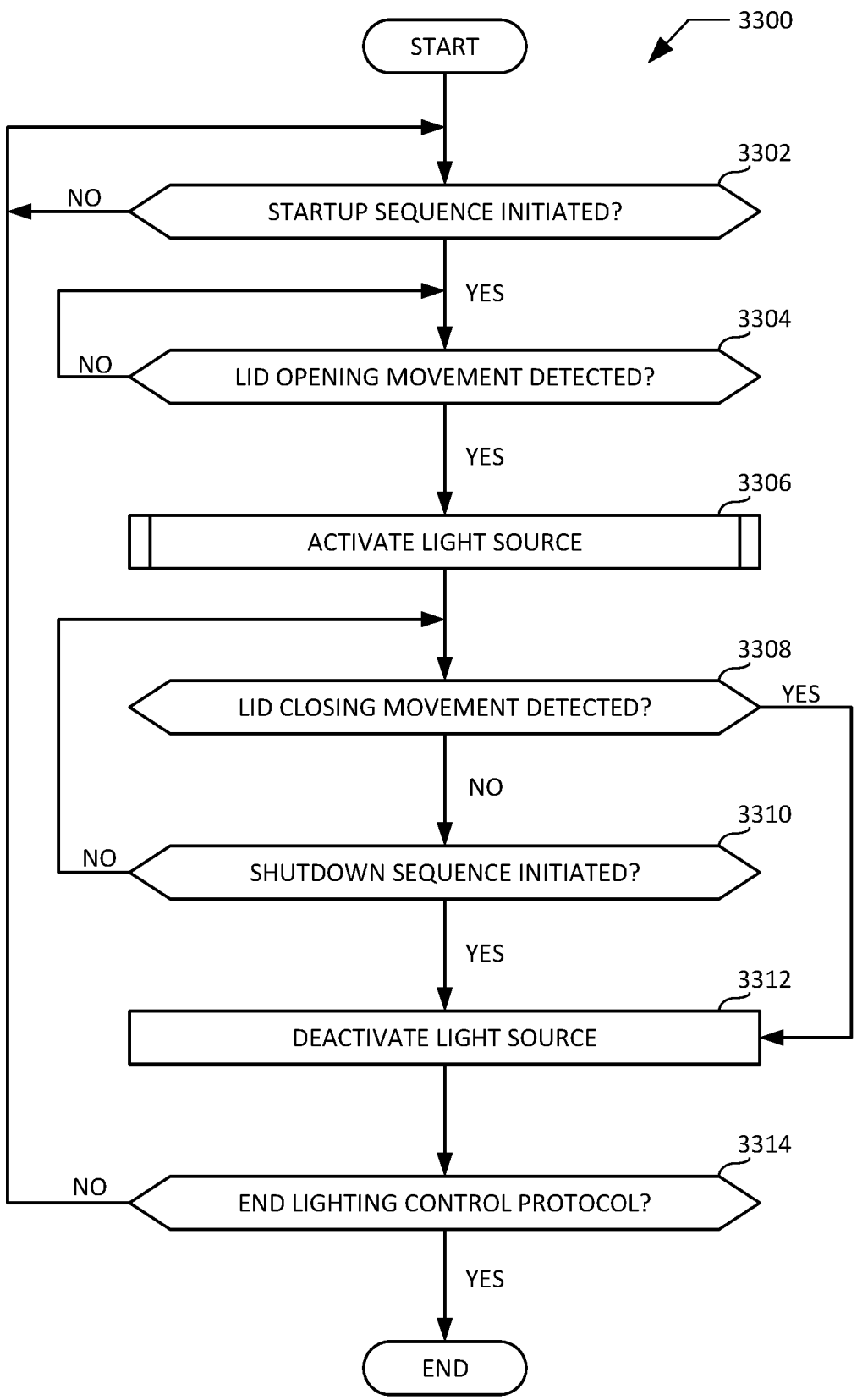
FIG. 33 is a flowchart representative of an example program for implementing a third lighting control protocol and/or process via the lighting system of FIG. 30.

FIG. 33 is a flowchart representative of an example program 3300 for implementing a third lighting control protocol and/or process via the lighting system 3000 of FIG. 30. The program 3300 of FIG. 33 begins at Block 3302 with the controller 3006 of the lighting system 3000 of FIG. 30 determining whether a startup sequence of the pellet grill 100 (e.g., a sequence that powers on the pellet grill 100 and/or that causes the ignitor 3022 of the pellet grill 100 to be in an ON state) has been initiated. If the controller 3006 determines at Block 3302 that a startup sequence of the pellet grill 100 has not been initiated, control of the program 3300 of FIG. 33 remains at Block 3302. If the controller 3006 instead determines at Block 3302 that a startup sequence of the pellet grill 100 has been initiated, control of the program 3300 of FIG. 33 proceeds to Block 3304.

At Block 3304, the controller 3006 determines, based on data that is sensed and/or measured by the lid position sensor 3026 of the lighting system 3000 of FIG. 30, whether a lid opening movement (e.g., movement of the lid 108 of the pellet grill 100 from a closed position to an open position) has occurred. If the controller 3006 determines at Block 3304 that a lid opening movement has not occurred, control of the program 3300 of FIG. 33 remains at Block 3304. If the controller 3006 instead determines at Block 3304 that a lid opening movement has occurred, control of the program 3300 of FIG. 33 proceeds to Block 3306.

At Block 3306, the controller 3006 cause(s) the light source 3002 of the lighting module 706 of FIG. 30 to be activated (e.g., powered on). A subroutine that can optionally be performed in connection with the performance of Block 3306 of the program 3300 of FIG. 33 is described below in connection with FIG. 36. Following Block 3306, control of the program 3300 of FIG. 33 proceeds to Block 3308.

At Block 3308, the controller 3006 determines, based on data that is sensed and/or measured by the lid position sensor 3026 of the lighting system 3000 of FIG. 30, whether a lid closing movement (e.g., movement of the lid 108 of the pellet grill 100 from an open position to a closed) has occurred. If the controller 3006 determines at Block 3308 that a lid closing movement has not occurred, control of the program 3300 of FIG. 33 proceeds to Block 3310. If the controller 3006 instead determines at Block 3308 that a lid closing movement has occurred, control of the program 3300 of FIG. 33 proceeds to Block 3312.

At Block 3310, the controller 3006 determines whether a shutdown sequence of the pellet grill 100 (e.g., a sequence that causes the auger motor 3020, the ignitor 3022, the fan 3024, and/or, more generally, the pellet grill 100 to be shut down and/or powered off) has been initiated. If the controller 3006 determines at Block 3310 that a shutdown sequence of the pellet grill 100 has not been initiated, control of the program 3300 of FIG. 33 returns to Block 3308. If the controller 3006 instead determines at Block 3310 that a shutdown sequence of the pellet grill 100 has been initiated, control of the program 3300 of FIG. 33 proceeds to Block 3312.

At Block 3312, the controller 3006 cause(s) the light source 3002 of the lighting module 706 of FIG. 30 to be deactivated (e.g., powered off). Following Block 3312, control of the program 3300 of FIG. 33 proceeds to Block 3314.

At Block 3314, the controller 3006 determines (e.g., based on data, commands, and/or signals received via the input device(s) 3008 of the user interface 124, and/or received via the receiver 3016 of the network interface 3012) whether the lighting control protocol represented by the program 3300 of FIG. 33 is to end (e.g., cease performance, operation, and/or execution). If the controller 3006 determine at Block 3314 that the lighting control protocol represented by the program 3300 of FIG. 33 is not to end, control of the program 3300 of FIG. 33 returns to Block 3302. If the controller 3006 instead determines at Block 3314 that the lighting control protocol represented by the program 3300 of FIG. 33 is to end, the program 3300 of FIG. 33 ends.

In other examples, one or more of the above-described operations of the program 3300 of FIG. 33 can be omitted. For example, the program 3300 of FIG. 33 can alternatively be implemented in a manner that omits the above-described operations associated with Block 3302 and/or Block 3310 of the program 3300 of FIG. 33.

Figure 34:
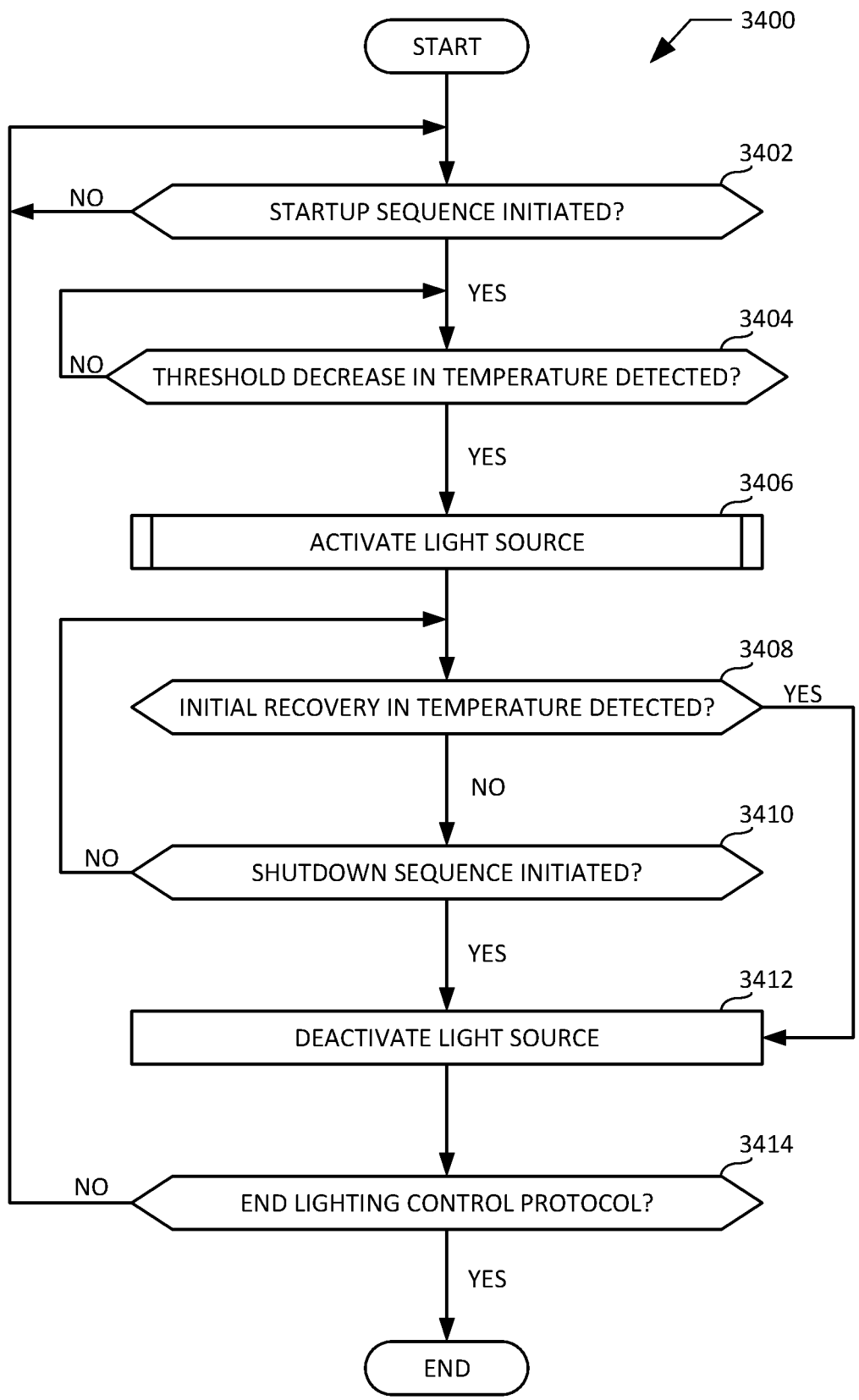
FIG. 34 is a flowchart representative of an example program for implementing a fourth lighting control protocol and/or process via the lighting system of FIG. 30.

FIG. 34 is a flowchart representative of an example program 3400 for implementing a fourth lighting control protocol and/or process via the lighting system 3000 of FIG. 30. The program 3400 of FIG. 34 begins at Block 3402 with the controller 3006 of the lighting system 3000 of FIG. 30 determining whether a startup sequence of the pellet grill 100 (e.g., a sequence that powers on the pellet grill 100 and/or that causes the ignitor 3022 of the pellet grill 100 to be in an ON state) has been initiated. If the controller 3006 determines at Block 3402 that a startup sequence of the pellet grill 100 has not been initiated, control of the program 3400 of FIG. 34 remains at Block 3402. If the controller 3006 instead determines at Block 3402 that a startup sequence of the pellet grill 100 has been initiated, control of the program 3400 of FIG. 34 proceeds to Block 3404.

At Block 3404, the controller 3006 determines, based on data that is sensed and/or measured by the temperature sensor 3028 of the lighting system 3000 of FIG. 30, whether a threshold decrease in the temperature of the cooking chamber 704 of the pellet grill 100 has occurred. In some examples, the threshold decrease in the temperature of the cooking chamber 704 is caused by and/or attributed to the lid 108 of the pellet grill being moved from a closed position into an open position. If the controller 3006 determines at Block 3404 that a threshold decrease in the temperature of the cooking chamber 704 has not occurred, control of the program 3400 of FIG. 34 remains at Block 3404. If the controller 3006 instead determines at Block 3404 that a threshold decrease in the temperature of the cooking chamber 704 has occurred, control of the program 3400 of FIG. 34 proceeds to Block 3406.

At Block 3406, the controller 3006 cause(s) the light source 3002 of the lighting module 706 of FIG. 30 to be activated (e.g., powered on). A subroutine that can optionally be performed in connection with the performance of Block 3406 of the program 3400 of FIG. 34 is described below in connection with FIG. 36. Following Block 3406, control of the program 3400 of FIG. 34 proceeds to Block 3408.

At Block 3408, the controller 3006 determines, based on data that is sensed and/or measured by the temperature sensor 3028 of the lighting system 3000 of FIG. 30, whether an initial recovery in the temperature of the cooking chamber 704 of the pellet grill 100 has occurred. In some examples, the initial recovery in the temperature of the cooking chamber 704 is caused by and/or attributed to the lid 108 of the pellet grill being moved from an open position into a closed position. If the controller 3006 determines at Block 3408 that an initial recovery in the temperature of the cooking chamber 704 has not occurred, control of the program 3400 of FIG. 34 proceeds to Block 3410. If the controller 3006 instead determines at Block 3408 that an initial recovery in the temperature of the cooking chamber 704 has occurred, control of the program 3400 of FIG. 34 proceeds to Block 3412.

At Block 3410, the controller 3006 determines whether a shutdown sequence of the pellet grill 100 (e.g., a sequence that causes the auger motor 3020, the ignitor 3022, the fan 3024, and/or, more generally, the pellet grill 100 to be shut down and/or powered off) has been initiated. If the controller 3006 determines at Block 3410 that a shutdown sequence of the pellet grill 100 has not been initiated, control of the program 3400 of FIG. 34 returns to Block 3408. If the controller 3006 instead determines at Block 3410 that a shutdown sequence of the pellet grill 100 has been initiated, control of the program 3400 of FIG. 34 proceeds to Block 3412.

At Block 3412, the controller 3006 cause(s) the light source 3002 of the lighting module 706 of FIG. 30 to be deactivated (e.g., powered off). Following Block 3412, control of the program 3400 of FIG. 34 proceeds to Block 3414.

At Block 3414, the controller 3006 determines (e.g., based on data, commands, and/or signals received via the input device(s) 3008 of the user interface 124, and/or received via the receiver 3016 of the network interface 3012) whether the lighting control protocol represented by the program 3400 of FIG. 34 is to end (e.g., cease performance, operation, and/or execution). If the controller 3006 determine at Block 3414 that the lighting control protocol represented by the program 3400 of FIG. 34 is not to end, control of the program 3400 of FIG. 34 returns to Block 3402. If the controller 3006 instead determines at Block 3414 that the lighting control protocol represented by the program 3400 of FIG. 34 is to end, the program 3400 of FIG. 34 ends.

In other examples, one or more of the above-described operations of the program 3400 of FIG. 34 can be omitted. For example, the program 3400 of FIG. 34 can alternatively be implemented in a manner that omits the above-described operations associated with Block 3402 and/or Block 3410 of the program 3400 of FIG. 34.

Figure 35:
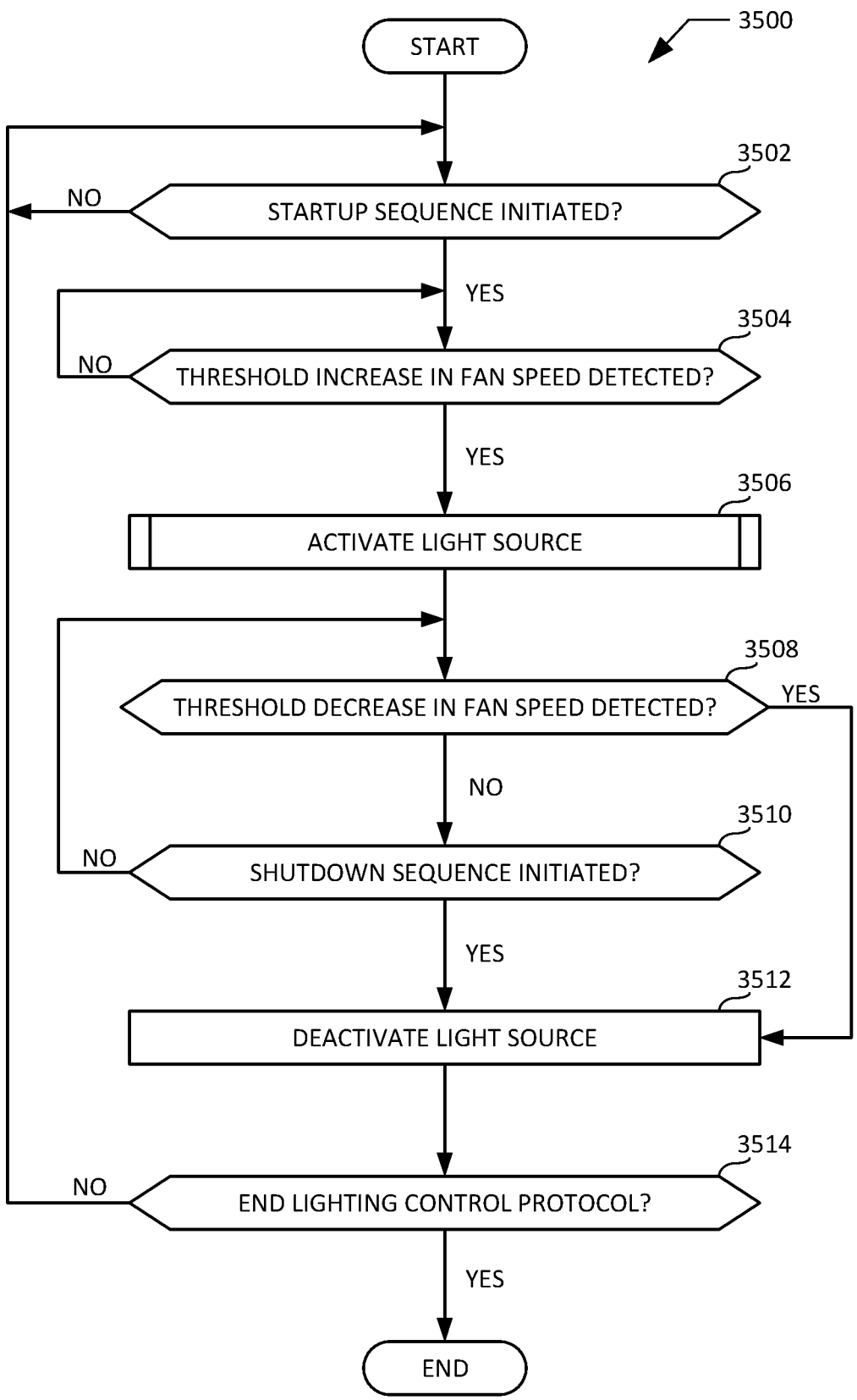
FIG. 35 is a flowchart representative of an example program for implementing a fifth lighting control protocol and/or process via the lighting system of FIG. 30.

FIG. 35 is a flowchart representative of an example program 3500 for implementing a fifth lighting control protocol and/or process via the lighting system 3000 of FIG. 30. The program 3500 of FIG. 35 begins at Block 3502 with the controller 3006 of the lighting system 3000 of FIG. 30 determining whether a startup sequence of the pellet grill 100 (e.g., a sequence that powers on the pellet grill 100 and/or that causes the ignitor 3022 of the pellet grill 100 to be in an ON state) has been initiated. If the controller 3006 determines at Block 3502 that a startup sequence of the pellet grill 100 has not been initiated, control of the program 3500 of FIG. 35 remains at Block 3502. If the controller 3006 instead determines at Block 3502 that a startup sequence of the pellet grill 100 has been initiated, control of the program 3500 of FIG. 35 proceeds to Block 3504.

At Block 3504, the controller 3006 determines, based on data that is sensed and/or measured by the tachometer 3030 of the lighting system 3000 of FIG. 30, whether a threshold increase in the speed of the fan 3024 of the pellet grill 100 has occurred. In some examples, the threshold increase in the speed of the fan 3024 is caused by and/or attributed to the lid 108 of the pellet grill being moved from a closed position into an open position. If the controller 3006 determines at Block 3504 that a threshold increase in the speed of the fan 3024 has not occurred, control of the program 3500 of FIG. 35 remains at Block 3504. If the controller 3006 instead determines at Block 3504 that a threshold increase in the speed of the fan 3024 has occurred, control of the program 3500 of FIG. 35 proceeds to Block 3506.

At Block 3506, the controller 3006 cause(s) the light source 3002 of the lighting module 706 of FIG. 30 to be activated (e.g., powered on). A subroutine that can optionally be performed in connection with the performance of Block 3506 of the program 3500 of FIG. 35 is described below in connection with FIG. 36. Following Block 3506, control of the program 3500 of FIG. 35 proceeds to Block 3508.

At Block 3508, the controller 3006 determines, based on data that is sensed and/or measured by the tachometer 3030 of the lighting system 3000 of FIG. 30, whether a threshold decrease in the speed of the fan 3024 of the pellet grill 100 has occurred. In some examples, the threshold decrease in the speed of the fan 3024 is caused by and/or attributed to the lid 108 of the pellet grill being moved from an open position into a closed position. If the controller 3006 determines at Block 3508 that a threshold decrease in the speed of the fan 3024 has not occurred, control of the program 3500 of FIG. 35 proceeds to Block 3510. If the controller 3006 instead determines at Block 3508 that a threshold decrease in the speed of the fan 3024 has occurred, control of the program 3500 of FIG. 35 proceeds to Block 3512.

At Block 3510, the controller 3006 determines whether a shutdown sequence of the pellet grill 100 (e.g., a sequence that causes the auger motor 3020, the ignitor 3022, the fan 3024, and/or, more generally, the pellet grill 100 to be shut down and/or powered off) has been initiated. If the controller 3006 determines at Block 3510 that a shutdown sequence of the pellet grill 100 has not been initiated, control of the program 3500 of FIG. 35 returns to Block 3508. If the controller 3006 instead determines at Block 3510 that a shutdown sequence of the pellet grill 100 has been initiated, control of the program 3500 of FIG. 35 proceeds to Block 3512.

At Block 3512, the controller 3006 cause(s) the light source 3002 of the lighting module 706 of FIG. 30 to be deactivated (e.g., powered off). Following Block 3512, control of the program 3500 of FIG. 35 proceeds to Block 3514.

At Block 3514, the controller 3006 determines (e.g., based on data, commands, and/or signals received via the input device(s) 3008 of the user interface 124, and/or received via the receiver 3016 of the network interface 3012) whether the lighting control protocol represented by the program 3500 of FIG. 35 is to end (e.g., cease performance, operation, and/or execution). If the controller 3006 determine at Block 3514 that the lighting control protocol represented by the program 3500 of FIG. 35 is not to end, control of the program 3500 of FIG. 35 returns to Block 3502. If the controller 3006 instead determines at Block 3514 that the lighting control protocol represented by the program 3500 of FIG. 35 is to end, the program 3500 of FIG. 35 ends.

In other examples, one or more of the above-described operations of the program 3500 of FIG. 35 can be omitted. For example, the program 3500 of FIG. 35 can alternatively be implemented in a manner that omits the above-described operations associated with Block 3502 and/or Block 3510 of the program 3500 of FIG. 35.

Figure 36:
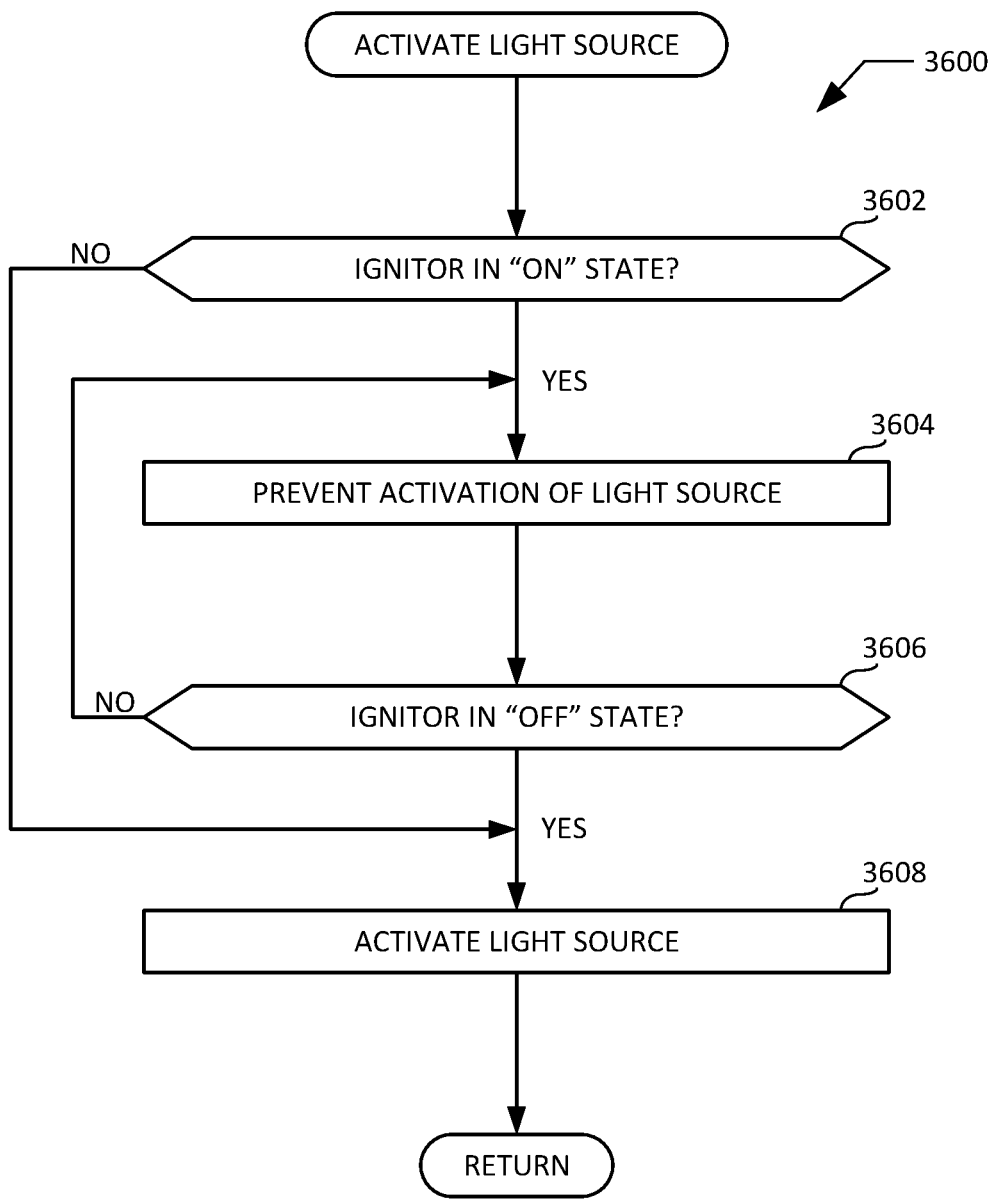
FIG. 36 is flowchart representative of an example program for implementing a lighting activation subroutine via the lighting system of FIG. 30.

FIG. 36 is flowchart representative of an example program 3600 for implementing a lighting activation subroutine via the lighting system 3000 of FIG. 30. The program 3600 of FIG. 36 can be invoked, for example in connection with Block 3206 of the program 3200 of FIG. 32, Block 3306 of the program 3300 of FIG. 33, Block 3406 of the program 3400 of FIG. 34, and/or Block 3506 of the program 3500 of FIG. 35. The program 3600 of FIG. 36 begins at Block 3602 with the controller 3006 of the lighting system 3000 of FIG. 30 determining, based on data that is sensed and/or measured by the current sensor 3032 of the lighting system 3000 of FIG. 30, whether the ignitor 3022 of the pellet grill 100 is in an ON state (e.g., associated with current being delivered to and/or drawn by the ignitor 3022). If the controller 3006 determines at Block 3602 that the ignitor 3022 is in an ON state, control of the program 3600 of FIG. 36 proceeds to Block 3604. If the controller 3006 instead determines at Block 3602 that the ignitor 3022 is not in an ON state, control of the program 3600 of FIG. 36 proceeds to Block 3608.

At Block 3604, the controller 3006 generates one or more instruction(s) and or command(s) that prevent(s) the light source 3002 of the lighting module 706 of FIG. 30 from being activated (e.g., from being powered on). Following Block 3604, control of the program 3600 of FIG. 36 proceeds to Block 3606.

At Block 3606, the controller 3006 determines, based on data that is sensed and/or measured by the current sensor 3032 of the lighting system 3000 of FIG. 30, whether the ignitor 3022 of the pellet grill 100 is in an OFF state (e.g., associated with current not being delivered to and/or drawn by the ignitor 3022). If the controller 3006 determines at Block 3606 that the ignitor 3022 is not in an OFF state, control of the program 3600 of FIG. 36 returns to Block 3604. If the controller 3006 instead determines at Block 3602 that the ignitor 3022 is in an OFF state, control of the program 3600 of FIG. 36 proceeds to Block 3608.

At Block 3608, the controller 3006 cause(s) the light source 3002 of the lighting module 706 of FIG. 30 to be activated (e.g., powered on). Following Block 3608, control of the program 3600 of FIG. 36 returns to the function call from which it was invoked, such as Block 3206 of the program 3200 of FIG. 32, Block 3306 of the program 3300 of FIG. 33, Block 3406 of the program 3400 of FIG. 34, and/or Block 3506 of the program 3500 of FIG. 35.

Example pellet grills disclosed herein include lighting systems configured to illuminate an interior of a cooking chamber of the pellet grill. In some disclosed examples, the pellet grill comprises an end cap, a liner coupled to the end cap, and a compartment formed between the end cap and the liner. In some disclosed examples, the pellet grill further comprises a lighting module having a light source. The light source is positioned within the compartment. The light source is configured to project light through an opening formed in the liner and into an interior of a cooking chamber of the pellet grill.

In some disclosed examples, the pellet grill further comprises a lid movable between a closed position to cover the interior of the cooking chamber and an open position to provide access to the interior of the cooking chamber. In some disclosed examples, the pellet grill further comprises a hinge including a hinge arm and a hinge bracket. The hinge arm is rigidly coupled to the lid and rotatably coupled to the hinge bracket. In some disclosed examples, the pellet grill further comprises a shield coupled to the hinge arm. The shield is configured to overlap a cover of the lighting module when the lid is in the closed position. The shield is further configured to not overlap the cover of the lighting module when the lid is in the open position.

In some disclosed examples, the pellet grill further comprises a switch configured to cause the light source to be powered on when the switch is in an ON state. The switch is further configured to cause the light source to be powered off when the switch is in an OFF state. In some disclosed examples, the switch includes an actuatable button configured to transition the switch between the ON state and the OFF state. In some disclosed examples, the switch is an on/off switch. In some disclosed examples, the switch is a momentary switch.

In some disclosed examples, the pellet grill further comprising a controller configured to cause the light source to be powered on in response to an activation request received at the controller. In some disclosed examples, the activation request is received at the controller via an input device of a user interface of the pellet grill or via a receiver of a network interface of the pellet grill. In some disclosed examples, the controller is further configured to cause the light source to be powered off in response to a deactivation request received at the controller. In some disclosed examples, the deactivation request is received at the controller via an input device of a user interface of the pellet grill or via a receiver of a network interface of the pellet grill.

In some disclosed examples, the pellet grill further comprises a lid movable between a closed position to cover the interior of the cooking chamber and an open position to provide access to the interior of the cooking chamber. In some disclosed examples, the pellet grill further comprises a lid position sensor configured to sense a position of the lid. In some disclosed examples, the pellet grill further comprises a controller configured to detect a lid opening movement based on lid position data obtained from the lid position sensor. In some disclosed examples, the controller is further configured to cause the light source to be powered on in response to detecting the lid opening movement. In some disclosed examples, the controller is further configured to detect a lid closing movement based on lid position data obtained from the lid position sensor. In some disclosed examples, the controller is further configured to cause the light source to be powered off in response to detecting the lid closing movement.

In some disclosed examples, the pellet grill further comprises a temperature sensor configured to sense a temperature of the interior of the cooking chamber. In some disclosed examples, the pellet grill further comprises a controller configured to detect a threshold decrease in the temperature of the interior of the cooking chamber based on temperature data obtained from the temperature sensor. In some disclosed examples, the controller is further configured to cause the light source to be powered on in response to detecting the threshold decrease in the temperature of the interior of the cooking chamber. In some disclosed examples, the controller is further configured to detect an initial recovery in the temperature of the interior of the cooking chamber based on temperature data obtained from the temperature sensor. In some disclosed examples, the controller is further configured to cause the light source to be powered off in response to detecting the initial recovery in the temperature of the interior of the cooking chamber.

In some disclosed examples, the pellet grill further includes a tachometer configured to sense a speed of a fan of the pellet grill. In some disclosed examples, the pellet grill further includes a controller configured to detect a threshold increase in the speed of the fan based on fan speed data obtained from the tachometer. In some disclosed examples, the controller is further configured to cause the light source to be powered on in response to detecting the threshold increase in the speed of the fan. In some disclosed examples, the controller is further configured to detect a threshold decrease in the speed of the fan based on fan speed data obtained from the tachometer. In some disclosed examples, the controller is further configured to cause the light source to be powered off in response to detecting the threshold decrease in the speed of the fan.

In some disclosed examples, the pellet grill further comprises a current sensor configured to detect an operational state of an ignitor of the pellet grill. In some disclosed examples, the pellet grill further comprises a controller configured to detect that the ignitor is powered on based on electrical current data obtained from the current sensor. In some disclosed examples, the controller is further configured to prevent the light source from being powered on in response to detecting that the ignitor is powered on. In some disclosed examples, the controller is further configured to detect that the ignitor is powered off based on electrical current data obtained from the current sensor. In some disclosed examples, the controller is further configured to enable the light source to be powered on in response to detecting that the ignitor is powered off.

In some disclosed examples, the light source is powered via AC power received at the pellet grill from an AC power source connected to the pellet grill. In some disclosed examples, the light source is powered via a DC power supply of the pellet grill. In some disclosed examples, the DC power supply produces DC power based on AC power received at the pellet grill from an AC line power source connected to the pellet grill. In some disclosed examples, the DC power supply is a battery.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pellet grill, comprising:
    an end cap;
    a liner coupled to the end cap;
    a compartment formed between the end cap and the liner;
    a lighting module having a light source, the light source positioned within the compartment, the light source configured to project light through an opening formed in the liner and into an interior of a cooking chamber of the pellet grill;
    a temperature sensor configured to sense a temperature of the interior of the cooking chamber; and
    a controller configured to:
        detect a threshold decrease in the temperature of the interior of the cooking chamber based on temperature data obtained from the temperature sensor;
        cause the light source to be powered on in response to detecting the threshold decrease in the temperature of the interior of the cooking chamber;
        detect an initial recovery in the temperature of the interior of the cooking chamber based on temperature data obtained from the temperature sensor; and
        cause the light source to be powered off in response to detecting the initial recovery in the temperature of the interior of the cooking chamber.

2. The pellet grill of claim 1, further comprising:
    a lid movable between a closed position to cover the interior of the cooking chamber and an open position to provide access to the interior of the cooking chamber;

a hinge including a hinge arm and a hinge bracket, the hinge arm rigidly coupled to the lid and rotatably coupled to the hinge bracket; and
a shield coupled to the hinge arm, the shield configured to overlap a cover of the lighting module when the lid is in the closed position, the shield further configured to not overlap the cover of the lighting module when the lid is in the open position.

3. The pellet grill of claim 1, wherein the light source is powered via an AC power source connected to the pellet grill.

4. The pellet grill of claim 1, wherein the light source is powered via a DC power supply of the pellet grill.

5. The pellet grill of claim 4, wherein the DC power supply produces DC power based on AC power received at the pellet grill from an AC line power source connected to the pellet grill.

6. The pellet grill of claim 4, wherein the DC power supply is a battery.

7. A pellet grill, comprising:
an end cap;
a liner coupled to the end cap;
a compartment formed between the end cap and the liner;
a lighting module having a light source, the light source positioned within the compartment, the light source configured to project light through an opening formed in the liner and into an interior of a cooking chamber of the pellet grill;
a tachometer configured to sense a speed of a fan of the pellet grill; and
a controller configured to:
detect a threshold increase in the speed of the fan based on fan speed data obtained from the tachometer;
cause the light source to be powered on in response to detecting the threshold increase in the speed of the fan;
detect a threshold decrease in the speed of the fan based on fan speed data obtained from the tachometer; and
cause the light source to be powered off in response to detecting the threshold decrease in the speed of the fan.

8. The pellet grill of claim 7, further comprising:
a lid movable between a closed position to cover the interior of the cooking chamber and an open position to provide access to the interior of the cooking chamber;
a hinge including a hinge arm and a hinge bracket, the hinge arm rigidly coupled to the lid and rotatably coupled to the hinge bracket; and
a shield coupled to the hinge arm, the shield configured to overlap a cover of the lighting module when the lid is in the closed position, the shield further configured to not overlap the cover of the lighting module when the lid is in the open position.

9. The pellet grill of claim 7, wherein the light source is powered via an AC power source connected to the pellet grill.

10. The pellet grill of claim 7, wherein the light source is powered via a DC power supply of the pellet grill.

11. The pellet grill of claim 10, wherein the DC power supply produces DC power based on AC power received at the pellet grill from an AC line power source connected to the pellet grill.

12. The pellet grill of claim 10, wherein the DC power supply is a battery.

13. A pellet grill, comprising:
an end cap;
a liner coupled to the end cap;
a compartment formed between the end cap and the liner;
a lighting module having a light source, the light source positioned within the compartment, the light source configured to project light through an opening formed in the liner and into an interior of a cooking chamber of the pellet grill;
a current sensor configured to detect an operational state of an ignitor of the pellet grill; and
a controller configured to:
detect whether the ignitor is powered on based on electrical current data obtained from the current sensor;
prevent the light source from being powered on in response to detecting that the ignitor is powered on; and
enable the light source to be powered on in response to detecting that the ignitor is not powered on.

14. The pellet grill of claim 13, further comprising:
a lid movable between a closed position to cover the interior of the cooking chamber and an open position to provide access to the interior of the cooking chamber;
a hinge including a hinge arm and a hinge bracket, the hinge arm rigidly coupled to the lid and rotatably coupled to the hinge bracket; and
a shield coupled to the hinge arm, the shield configured to overlap a cover of the lighting module when the lid is in the closed position, the shield further configured to not overlap the cover of the lighting module when the lid is in the open position.

15. The pellet grill of claim 13, wherein the light source is powered via an AC power source connected to the pellet grill.

16. The pellet grill of claim 13, wherein the light source is powered via a DC power supply of the pellet grill.

17. The pellet grill of claim 16, wherein the DC power supply produces DC power based on AC power received at the pellet grill from an AC line power source connected to the pellet grill.

18. The pellet grill of claim 16, wherein the DC power supply is a battery.

19. The pellet grill of claim 13, wherein the controller is further configured to:
cause the light source to be powered on in response to an activation request received at the controller, wherein the activation request is received at the controller via an input device of a user interface of the pellet grill or via a receiver of a network interface of the pellet grill; and
cause the light source to be powered off in response to a deactivation request received at the controller, wherein the deactivation request is received at the controller via the input device of the user interface of the pellet grill or via the receiver of the network interface of the pellet grill.

20. The pellet grill of claim 13, further comprising:
a lid movable between a closed position to cover the interior of the cooking chamber and an open position to provide access to the interior of the cooking chamber; and
a lid position sensor configured to sense a position of the lid, wherein the controller is further configured to:
detect a lid opening movement based on lid position data obtained from the lid position sensor;
cause the light source to be powered on in response to detecting the lid opening movement;
detect a lid closing movement based on lid position data obtained from the lid position sensor; and cause the light source to be powered off in response to detecting the lid closing movement.

21. The pellet grill of claim 13, further comprising a temperature sensor configured to sense a temperature of the interior of the cooking chamber, wherein the controller is further configured to:
  detect a threshold decrease in the temperature of the interior of the cooking chamber based on temperature data obtained from the temperature sensor;
  cause the light source to be powered on in response to detecting the threshold decrease in the temperature of the interior of the cooking chamber;
  detect an initial recovery in the temperature of the interior of the cooking chamber based on temperature data obtained from the temperature sensor; and
  cause the light source to be powered off in response to detecting the initial recovery in the temperature of the interior of the cooking chamber.

22. The pellet grill of claim 13, further comprising a tachometer configured to sense a speed of a fan of the pellet grill, wherein the controller is further configured to:
  detect a threshold increase in the speed of the fan based on fan speed data obtained from the tachometer;
  cause the light source to be powered on in response to detecting the threshold increase in the speed of the fan;
  detect a threshold decrease in the speed of the fan based on fan speed data obtained from the tachometer; and
  cause the light source to be powered off in response to detecting the threshold decrease in the speed of the fan.

* * * * *